US012600024B2

(12) United States Patent
Kawai

(10) Patent No.: US 12,600,024 B2
(45) Date of Patent: Apr. 14, 2026

(54) POWER TOOL

(71) Applicant: MAKITA CORPORATION, Anjo (JP)

(72) Inventor: Yasuhito Kawai, Anjo (JP)

(73) Assignee: MAKITA CORPORATION, Tokyo (JP)

( * ) Notice: Subject to any disclaimer, the term of this patent is extended or adjusted under 35 U.S.C. 154(b) by 0 days.

(21) Appl. No.: 19/067,261

(22) Filed: Feb. 28, 2025

(65) Prior Publication Data

US 2025/0289110 A1      Sep. 18, 2025

(30) Foreign Application Priority Data

Mar. 13, 2024    (JP) ................................. 2024-038816

(51) Int. Cl.
| | |
|---|---|
| *B25F 5/00* | (2006.01) |
| *B25F 5/02* | (2006.01) |
| *H02K 5/04* | (2006.01) |
| *H02K 7/14* | (2006.01) |
| *H02K 11/00* | (2016.01) |
| *B25B 21/02* | (2006.01) |

(52) U.S. Cl.
CPC ............... *B25F 5/001* (2013.01); *B25F 5/02* (2013.01); *H02K 5/04* (2013.01); *H02K 7/145* (2013.01); *H02K 11/0094* (2013.01); *B25B 21/02* (2013.01)

(58) Field of Classification Search
CPC . B25B 21/02; B25F 5/001; B25F 5/02; H02K 5/04; H02K 7/145; H02K 11/0094
See application file for complete search history.

(56) References Cited

U.S. PATENT DOCUMENTS

| | | | | |
|---|---|---|---|---|
| 2015/0197003 A1* | 7/2015 | Lin | ........................... | B25F 5/02 173/218 |
| 2022/0024018 A1* | 1/2022 | Benzing | ................. | H02K 7/116 |
| 2022/0305625 A1* | 9/2022 | Kawai | ................... | B25B 21/026 |
| 2022/0355460 A1* | 11/2022 | Carrier | ................... | B25C 1/047 |
| 2023/0043839 A1* | 2/2023 | Takahagi | ................. | H02P 6/08 |
| 2023/0191565 A1* | 6/2023 | Kamiya | ................. | B25B 21/02 173/93 |
| 2023/0302622 A1* | 9/2023 | Sasaki | .................... | H02K 3/522 |
| 2023/0415309 A1* | 12/2023 | Kawai | ...................... | B25F 5/02 |

FOREIGN PATENT DOCUMENTS

JP          6769115 B2     10/2020

* cited by examiner

*Primary Examiner* — Eyamindae C Jallow
(74) *Attorney, Agent, or Firm* — Oliff PLC

(57) ABSTRACT

A power tool includes: a motor; a rotation mechanism disposed forward of the motor and including an output portion that is rotated about a rotation axis by the motor; a rotation mechanism case that houses at least a part of the rotation mechanism; a case holder having a cylindrical shape and covering a circumference of the rotation mechanism case such that the output portion protrudes forward; and a grip portion to be gripped by an operator. The grip portion includes a left grip portion and a right grip portion that are divided in a left-right direction. The case holder is integrally formed with either the left grip portion or the right grip portion.

20 Claims, 31 Drawing Sheets

2B 21A 2
21 21H 24
21B 4
4S 85
21H
19 18
18A
4S 11
21H AX
20 10
15 17
2R 14
2S 2L
2S 22
16A
23 16
16A
13

UP
REAR LEFT
RIGHT FRONT
DOWN
25

UP

REAR ← → FRONT

DOWN

UP

FRONT          RIGHT

LEFT          REAR

DOWN

REAR ← → FRONT 21    2B

21H

21B

21A

21D

21H

21H

90R

90L

21H

UP

FRONT

RIGHT

LEFT

REAR

DOWN

UP

FRONT ← → RIGHT

LEFT ← → REAR

DOWN

POWER TOOL

CROSS-REFERENCE TO RELATED APPLICATION(S)

The present application claims priority to and incorporates by reference the entire contents of Japanese Patent Application No. 2024-038816 filed in Japan on Mar. 13, 2024.

TECHNICAL FIELD

The techniques disclosed in the present teachings relate to a power tool.

BACKGROUND

In a technical field related to power tools, a power tool as disclosed in Japanese Patent No. 6769115 is known. In Japanese Patent No. 6769115, a rotation mechanism including a motor, a speed reducer, a hammer unit, and an anvil are provided in an axial direction of the motor. A housing that houses the rotation mechanism is configured to be divided into two portions in the front and rear in the axial direction. The housing has a handle portion provided with a switch below the rotation mechanism.

At the time of assembling a power tool, owing to a housing divided into front and rear portions, it is possible to assemble a rotation mechanism such as a motor, a speed reducer, and a hammer unit in a manner to be stacked in a rotation axis. Meanwhile, in the housing divided into front and rear portions, assembling of a switch or wiring of the handle portion is complicated, which reduces workability.

SUMMARY

One non-limiting object of the present teachings is to improve the assembly workability of a power tool.

In one non-limiting aspect of the present teachings, a power tool includes: a motor; a rotation mechanism disposed forward of the motor and including an output portion that is rotated about a rotation axis by the motor; a rotation mechanism case that houses at least a part of the rotation mechanism; a case holder having a cylindrical shape and covering a circumference of the rotation mechanism case such that the output portion protrudes forward; and a grip portion connected to the case holder. The grip portion includes a left grip portion and a right grip portion that are divided in a left-right direction. The case holder is integrally formed with either the left grip portion or the right grip portion.

According to the present teachings, the assembly workability of a power tool can be improved.

DETAILED DESCRIPTION

Figure 1:
FIG. 1 is a perspective view illustrating a power tool according to an embodiment as viewed from the front.

In one or more embodiments, a power tool may include: a motor; a rotation mechanism disposed forward of the motor and including an output portion that is rotated about a rotation axis by the motor; a rotation mechanism case that houses at least a part of the rotation mechanism; a case holder having a cylindrical shape and covering a circumference of the rotation mechanism case such that the output portion protrudes forward; and a grip portion to be gripped by an operator. The grip portion may include a left grip portion and a right grip portion that are divided in a left-right direction. The case holder may be integrally formed with either the left grip portion or the right grip portion.

In the above structure, the cylindrical case holder covering the circumference of the rotation mechanism case such that the output portion protrudes forward is integrally formed with either the left grip portion or the right grip portion. Thus, in the assembly of the rotation mechanism, the motor and the rotation mechanism can be assembled in the front-rear direction along the rotation axis, which can be directly assembled to the case holder along the rotation axis. Further, since the grip portion is divided in the left-right direction, assembly work can be easily performed in the left-right direction by arranging switches and wiring on either the left grip portion or the right grip portion and covering them with the other. Therefore, since high workability can be ensured in both the assembly of the rotation mechanism and the assembly of the grip portion, the assembly workability of the power tool can be improved.

In one or more embodiments, the power tool may further include a battery holder connected to the grip portion, the battery holder to which the battery pack is detachably attached. The battery holder may include a left battery holder integrally formed with the left grip portion and a right battery holder integrally formed with the right grip portion.

In the above structure, since the left battery holder is integrally formed with the left grip portion and the right battery holder is integrally formed with the right grip portion, it is easy to perform wiring processing for connecting the switches of the grip portion to the battery or a circuit. In addition, the number of parts and assembly man-hours are reduced as compared with a case where the grip portion and the battery holder are separately provided and connected by screws or the like.

In one or more embodiments, the power tool may further include a motor housing that is disposed rearward of the rotation mechanism case and houses the motor. The motor housing may be connected to each of an upper end of the left grip portion and an upper end of the right grip portion by screws.

In the above structure, a portion that houses the motor and the rotation mechanism can be divided in the front-rear direction (axial direction) into the motor housing and the case holder. This facilitates the assembly work of the motor and the rotation mechanism. Since the motor housing is connected to each of the left grip portion and the right grip portion divided in the left-right direction, the motor housing is firmly fixed.

In one or more embodiments, the rotation mechanism case may be made of metal. The motor housing may be connected to a rear portion of the rotation mechanism case by a screw member extending in the axial direction along the rotation axis.

In the above structure, since the motor housing is connected to the rear portion of the rotation mechanism case made of metal, the motor housing that houses the motor is easily and firmly fixed.

In one or more embodiments, the rotation mechanism case may be connected to the left grip portion and the right grip portion via a connection member extending in the left-right direction.

In the above structure, since the rotation mechanism case is not only housed in the case holder but also connected to the left grip portion and the right grip portion, the rotation mechanism case, the case holder, and the grip portion can be fixed to each other.

In one or more embodiments, a connection boss portion, through which the connection member is inserted, may be provided on an outer circumference of the rotation mechanism case. A first end and a second end of the connection member inserted into the connection boss portion may be connected to the left grip portion and the right grip portion, respectively.

In the above structure, since the connection boss portion of the rotation mechanism case are fixed to the left grip portion and the right grip portion via the connection member, it is possible to stably support the axial force and the rotational force about the rotation axis acting on the rotation mechanism case when the power tool is in use.

In one or more embodiments, the connection boss portion includes a first connection boss portion and a second connection boss portion, and the connection member includes a first connection member and a second connection member. The first connection boss portion and the first connection member are arranged on a front portion of the rotation mechanism case, and the second connection boss portion and the second connection member are arranged on a rear portion of the rotation mechanism case.

In the above structure, since the front portion and the rear portion of the rotation mechanism case are fixed to the left grip portion and the right grip portion, the rotation mechanism case is more reliably held.

In one or more embodiments, the power tool may include a trigger lever provided on a front side of the grip portion and operated to activate the motor.

In the above structure, for example, as compared with a case where the grip portion has a front-rear split structure, an operator can easily assemble the trigger lever to the grip portion of the left-right split structure.

In one or more embodiments, the power tool may include a forward/reverse switching lever provided on the grip portion and operated to change the rotation direction of the motor.

In the above structure, for example, as compared with a case where the grip portion has a front-rear split structure, an operator can easily assemble the forward/reverse switching lever to the grip portion of the left-right split structure.

In one or more embodiments, the rotation mechanism may include a hammer rotated by the motor. The output portion may be an anvil that is impacted in the rotation direction by the hammer.

In the above structure, the power tool is configured as an impact tool that generates a stronger fastening force by an impact by the hammer. With the hammer provided, assembly workability is effectively improved in the impact tool in which the number of parts of the rotation mechanism is likely to be increased and assembly man-hours are likely to be increased.

In one or more embodiments, a power tool may include: a motor; a rotation mechanism disposed forward of the motor and including an output portion that is rotated about a rotation axis by the motor; a rotation mechanism case that houses at least a part of the rotation mechanism; and a housing to which the motor and the rotation mechanism case are assembled. The housing may include a left housing and a right housing divided in the left-right direction intersecting the rotation axis. A case holder may be integrally formed with either the left housing or the right housing, the case holder having cylindrical shape and covering the circumference of the rotation mechanism case such that the output portion protrudes forward.

In the above structure, the cylindrical case holder that covers the circumference of the rotation mechanism case such that the output portion protrudes forward is integrally formed with either the left housing or the right housing. Thus, in the assembly of the rotation mechanism, the motor and the rotation mechanism can be assembled in the front-rear direction along the rotation axis, which can be directly assembled to the case holder along the rotation axis. Further, since the housing is divided in the left-right direction in a portion other than the rotation mechanism, it is possible to easily perform assembly work in the left-right direction by arranging switches and wiring in either the left housing or the right housing and covering with the other. Therefore, since high workability can be ensured in both the assembly of the rotation mechanism and assembly of parts other than those of the rotation mechanism, the assembly workability of the power tool can be improved.

In one or more embodiments, the housing may include: a grip portion connected to the case holder; and a battery holder that is connected to the grip portion and to which a battery pack is detachably attached. The left housing may have a left-side portion of the grip portion and a left-side portion of the battery holder. The right housing may have a right-side portion of the grip portion and a right-side portion of the battery holder.

In the above structure, since the grip portion and the battery holder can have the left-right split structure, an operator can easily assemble switches and perform wiring processing.

In one or more embodiments, the housing may further include a rear case that houses the motor and that is disposed rearward of the left housing and the right housing. The rear case may be connected to each of the left housing and the right housing by screws.

In the above structure, the rear case housing the motor is provided separately from the left housing and the right housing that are divided into the left and right. Since the rear case and the cylindrical case holder can be disposed in the front-rear direction, an operator can easily arrange the motor and the rotation mechanism.

In one or more embodiments, the rear case may be connected to the left housing by a screw at an upper end of the left-side portion of the grip portion and be connected to the right housing by a screw at an upper end of the right-side portion of the grip portion.

In the above structure, since the rear case is connected to each of the left housing and the right housing, the rear case can be firmly fixed.

In one or more embodiments, the left housing and the right housing may be connected by screws extending in the left-right direction at the grip portion and the battery holder.

In the above structure, the left housing and the right housing can be easily fixed.

In one or more embodiments, the rotation mechanism case may be made of metal. The rear case may be connected to a rear portion of the rotation mechanism case by a screw member extending in the axial direction along the rotation axis.

In the above structure, since the motor housing is connected to the rear portion of the rotation mechanism case made of metal, the motor housing that houses the motor is easily and firmly fixed.

In one or more embodiments, the left housing and the right housing may be connected to the rotation mechanism case via a connection member extending in the left-right direction.

In the above structure, since the rotation mechanism case is not only housed in the case holder but also connected to the left housing and the right housing, the rotation mechanism case is firmly fixed to the housing.

In one or more embodiments, a connection boss portion, through which the connection member is inserted, may be provided on an outer circumference of the rotation mechanism case. The left housing may have a left-side support portion that supports a first end of the connection member inserted into the connection boss portion. The right housing may have a right-side support portion that supports a second end of the connection member inserted into the connection boss portion.

In the above structure, the connection boss portion of the rotation mechanism case is held from the left and right sides by the left housing and the right housing. It is possible to more effectively support, by the housing, the axial force and the rotational force about the rotation axis acting on the rotation mechanism case when the power tool is in use.

In one or more embodiments, the power tool may include a trigger lever provided on a front side of the grip portion and operated to activate the motor.

In the above structure, for example, as compared with a case where the housing has a front-rear split structure, an operator can easily assemble the trigger lever to the grip portion of the left-right split structure.

In one or more embodiments, the power tool may include a forward/reverse switching lever provided to the grip portion and operated to change the rotation direction of the motor.

In the above structure, for example, as compared with a case where the housing has a front-rear split structure, an operator can easily assemble the forward/reverse switching lever to the grip portion of the left-right split structure.

Hereinafter, embodiments will be described with reference to the drawings. In the embodiments, the positional relationship of parts will be described using terms of "left", "right", "front", "rear", "up", and "down". These terms indicate relative positions or directions with respect to the center of a power tool 1. The power tool 1 includes a motor 6 as a power source.

In the embodiments, a direction parallel to a rotation axis AX of the motor 6 is referred to as an axial direction as appropriate, a direction around the rotation axis AX is referred to as a circumferential direction or a rotation direction as appropriate, and a radiation direction of the rotation axis AX is referred to as a radial direction as appropriate.

The rotation axis AX extends in the front-rear direction. One side in the axial direction is a front side, and the other side in the axial direction is a rear side. In the radial direction, a position close to or a direction approaching the rotation axis AX is referred to as a radially inner side as appropriate, and a position far from or a direction away from the rotation axis AX is referred to as a radially outer side as appropriate.

Power Tool

Figure 2:
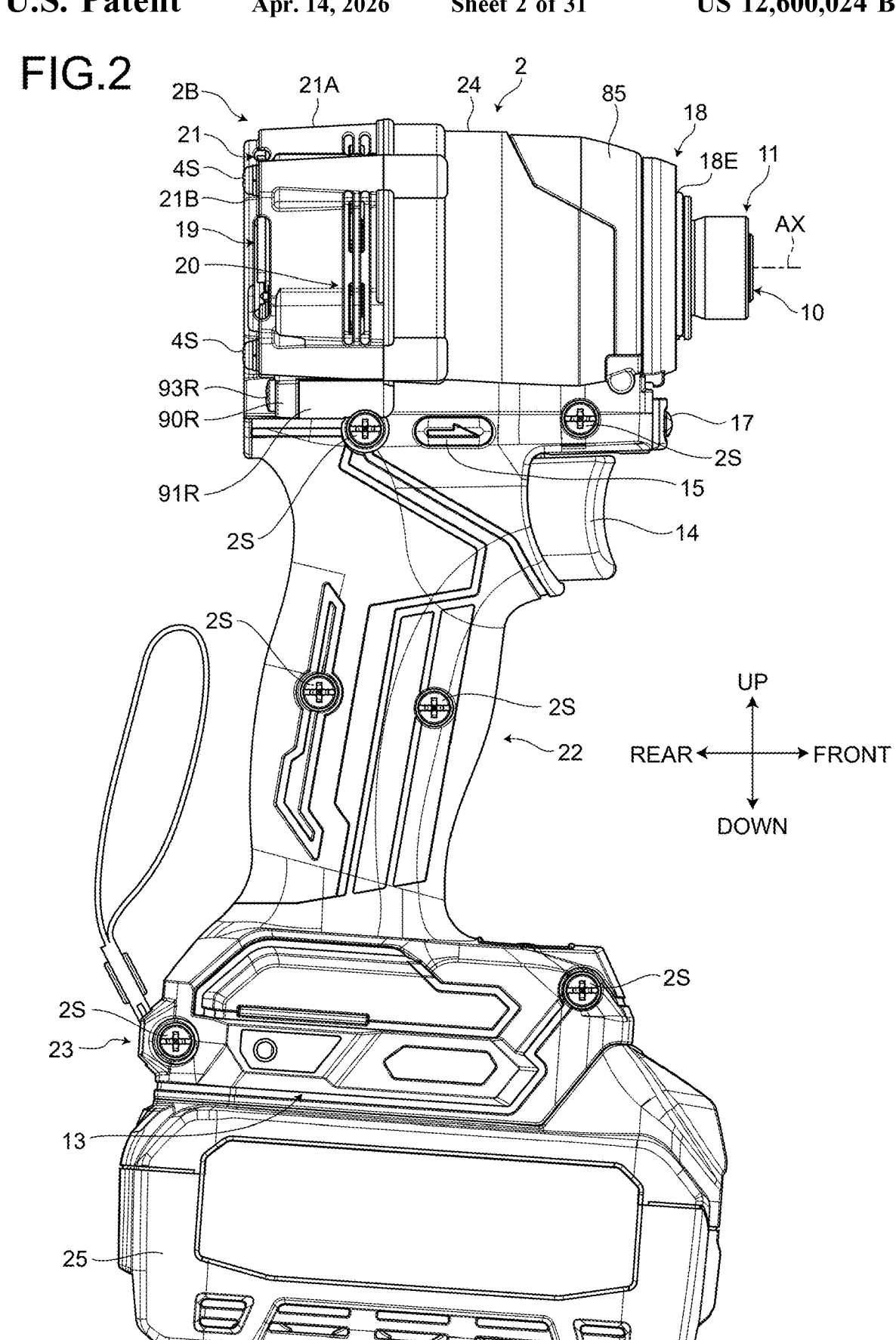
FIG. 2 is a side view illustrating the power tool of the embodiment.
Figure 3:
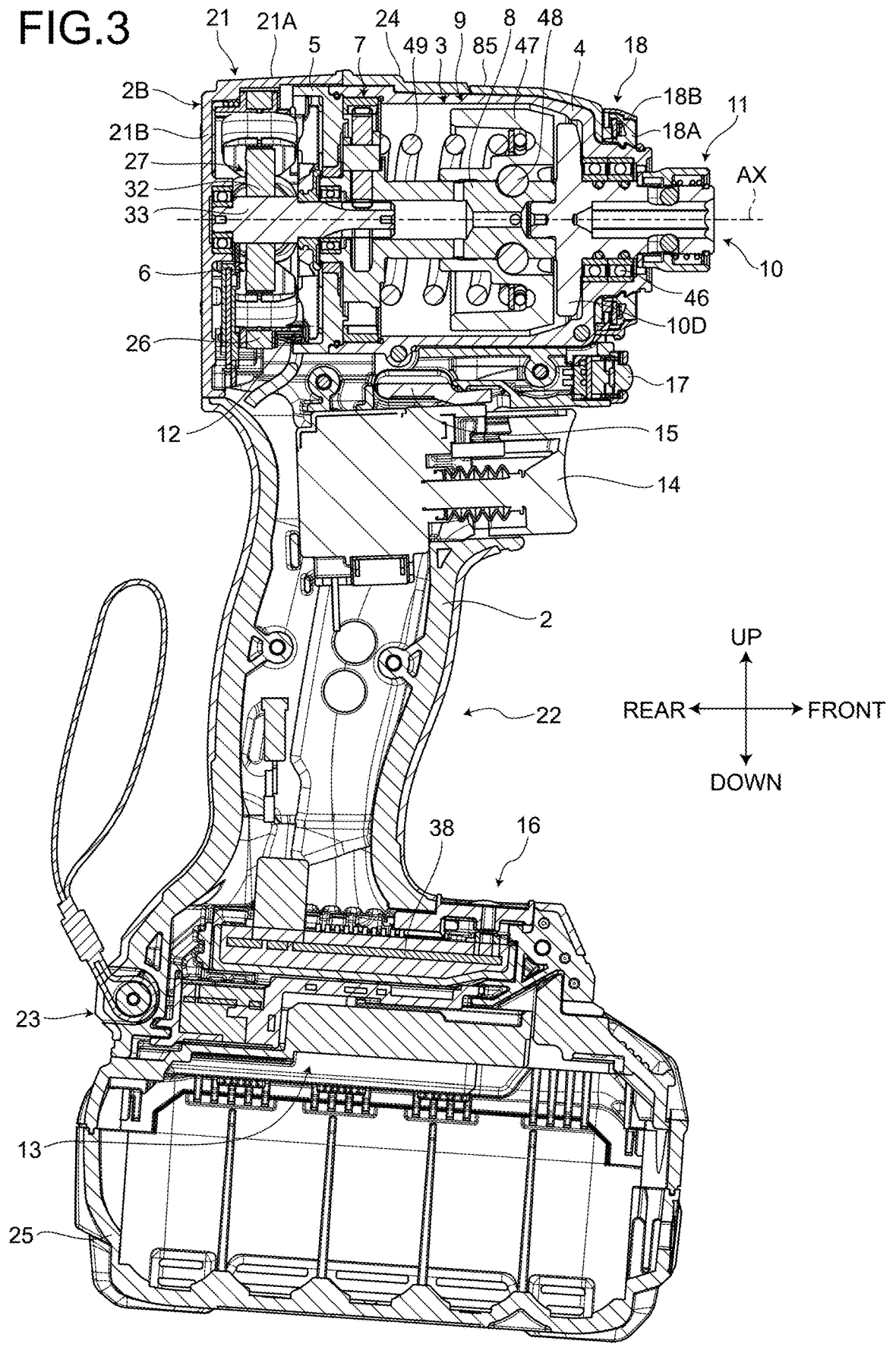
FIG. 3 is a cross-sectional view illustrating the power tool the embodiment.
Figure 4:
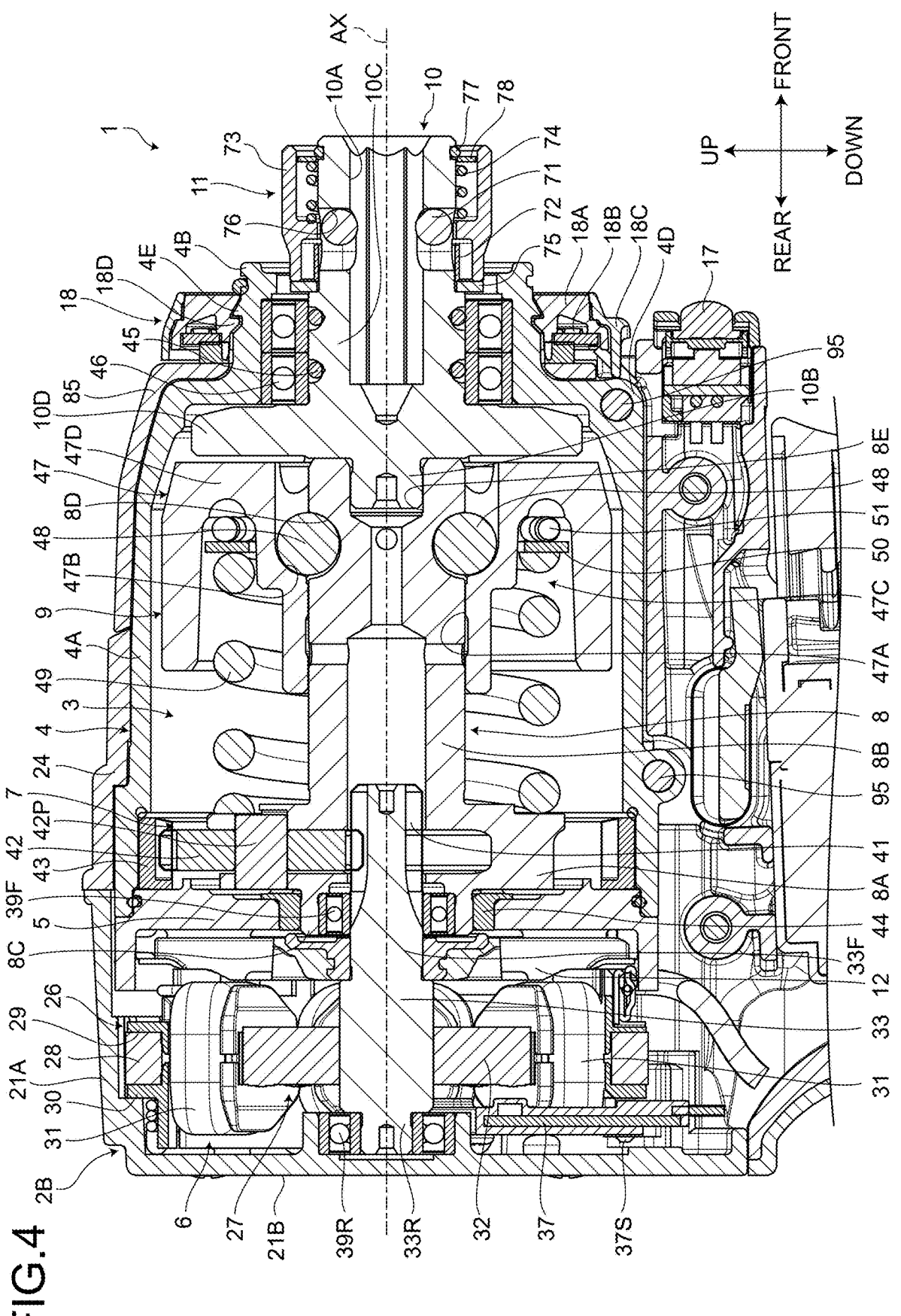
FIG. 4 is a longitudinal sectional view illustrating an upper portion of the power tool of the embodiment.
Figure 5:
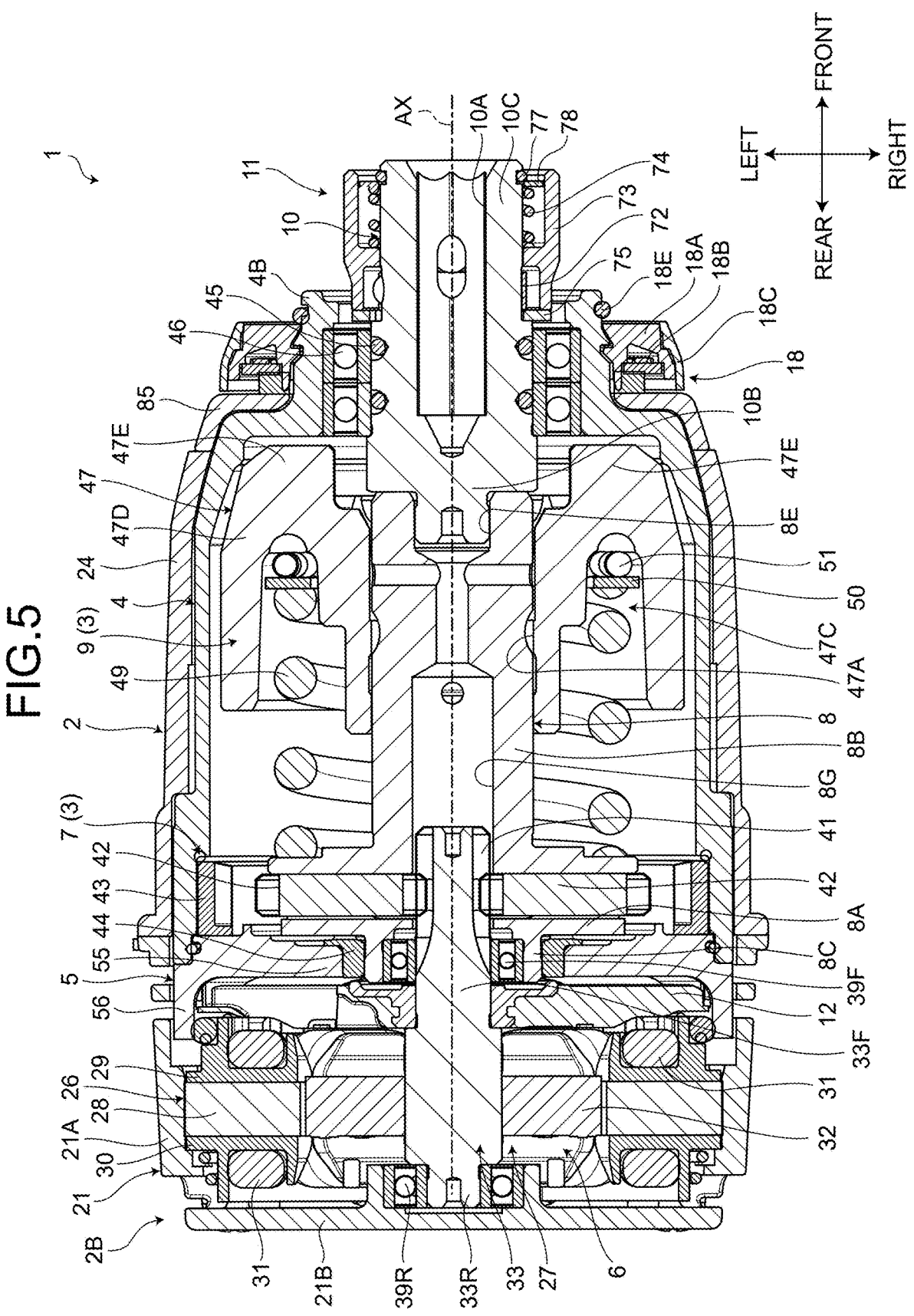
FIG. 5 is a lateral sectional view illustrating the upper portion of the power tool of the embodiment.
Figure 6:
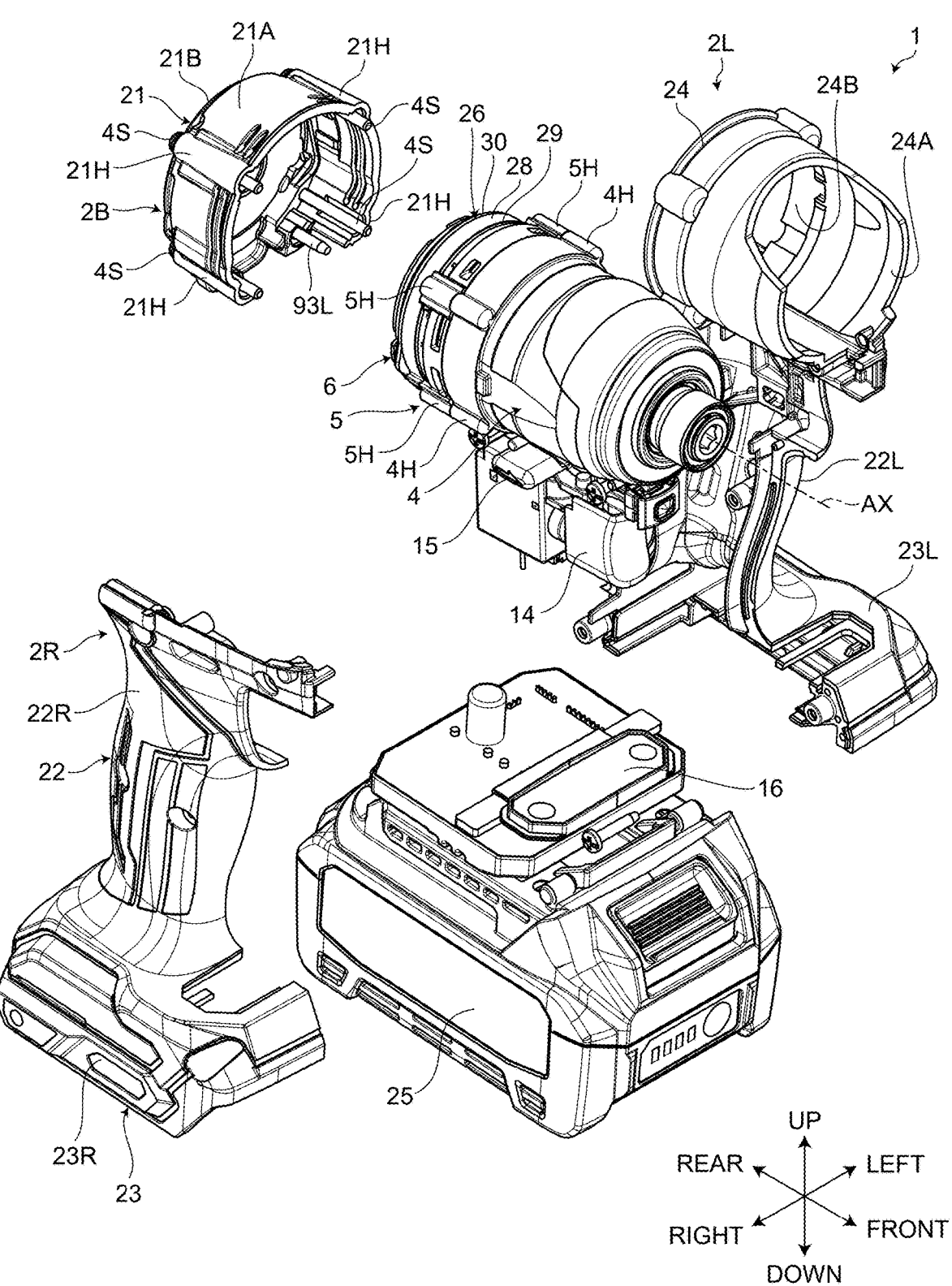
FIG. 6 is an exploded perspective view illustrating the power tool of the embodiment.

FIG. 1 is a perspective view illustrating the power tool 1 according to an embodiment as viewed from the front. FIG. 2 is a side view illustrating the power tool 1 of the embodiment. FIG. 3 is a cross-sectional view illustrating the power tool 1 the embodiment. FIG. 4 is a longitudinal sectional view illustrating an upper portion of the power tool 1 of the embodiment. FIG. 5 is a lateral sectional view illustrating the upper portion of the power tool 1 of the embodiment. FIG. 6 is an exploded perspective view illustrating the power tool 1 of the embodiment.

The power tool 1 is a rotary tool that rotates an output portion by the motor 6. In the embodiment, the power tool 1 is a screw fastening tool that fastens a fastening member such as a screw, a bolt, or a nut by rotation of the output portion. The power tool 1 may be an electric drill that performs drilling by rotation of the output portion. In the embodiment, the power tool 1 is an impact tool which is a type of screw fastening tools. As an example of the impact tool, the power tool 1 is an impact driver.

The power tool 1 includes a housing 2, a rotation mechanism 3, a hammer case (rotation mechanism case) 4, and the motor 6. The rotation mechanism 3 includes a speed reducing mechanism 7, a spindle 8, a impacting mechanism 9, and an anvil (output portion) 10. The power tool 1 includes a tool holding mechanism 11, a fan 12, a battery mounting unit 13, a trigger lever 14, a forward/reverse switching lever 15, an operation display unit 16, a mode selecting switch 17, and a light assembly 18.

The housing 2 is made of synthetic resin. In the embodiment, the housing 2 is made of nylon. The housing 2 includes a left housing 2L and a right housing 2R disposed on the right side of the left housing 2L. The left housing 2L and the right housing 2R are fixed by a plurality of screws 2S.

The housing 2 includes a rear case 2B disposed on the rear side of the left housing 2L and the right housing 2R. The rear case 2B is fixed to each of the hammer case 4, the left housing 2L, and the right housing 2R.

The housing 2 includes a motor housing 21, a grip portion 22, a battery holder 23, and a case holder 24.

The motor housing 21 houses the motor 6. The motor housing 21 has a circumferential surface portion 21A surrounding the outer circumference of the motor 6 and a rear surface portion 21B covering the rear of the motor 6. The motor housing 21 is provided in the rear case 2B. The circumferential surface portion 21A is constituted by an outer circumferential portion of the rear case 2B, and the rear surface portion 21B is constituted by a rear surface portion of the rear case 2B. The motor 6 is disposed on the inner circumferential surface side of the motor housing 21, namely, on the inner circumferential surface side of the rear case 2B. The motor housing 21 houses at least a part of the fan 12. The fan 12 is disposed on the inner circumferential surface side of the motor housing 21. The motor housing 21 houses at least a part of the bearing holding member 5. The bearing holding member 5 is disposed on the inner circumferential surface side of the motor housing 21. The bearing holding member 5 is disposed in an opening at the front end of the motor housing 21.

The case holder 24 has a cylindrical shape. The case holder 24 houses at least a part of the hammer case 4. The case holder 24 opens to the front and the rear. The case holder 24 covers the circumference of the hammer case 4 such that the anvil 10 protrudes forward. A part of the hammer case 4 protrudes forward from the front opening of the case holder 24.

The grip portion 22 is connected to the case holder 24. In the embodiment, the grip portion 22 extends downward from the case holder 24. The grip portion 22 is also connected to the motor housing 21. The grip portion 22 extends downward from the motor housing 21. The trigger lever 14 and the forward/reverse switching lever 15 are provided above the grip portion 22. The grip portion 22 is gripped by an operator.

The battery holder 23 is connected to the lower end of the grip portion 22. In each of the front-rear direction and the left-right direction, the outer dimensions of the battery holder 23 is larger than the outer dimensions of the grip portion 22. A battery pack 25 is detachable from the battery holder 23.

The grip portion 22 and the battery holder 23 each have a left-right, split-in-half structure in which a left half of each of the grip portion 22 and the battery holder 23 is provided in the left housing 2L, and a right half of each of the grip portion 22 and the battery holder 23 is provided in the right housing 2R.

The rear case 2B is made of synthetic resin. The rear case 2B is disposed on the rear side of the case holder 24. The rear case 2B is disposed on the rear side of the hammer case 4. The rear case 2B is disposed in a manner to cover the opening of the rear end of the cylindrical case holder 24. The front end surface of the rear case 2B and the rear end surface of the case holder 24 face each other in the front-rear direction. The rear case 2B is fixed to the rear end of the hammer case 4 by four screw members 4S.

The rear case 2B has an intake port 19. The rear case 2B has an exhaust port 20. The air in the external space of the housing 2 flows into the internal space of the housing 2 via the intake port 19. The air in the internal space of the housing 2 flows out to the external space of the housing 2 via the exhaust port 20.

The hammer case 4 is made of metal. In the embodiment, the hammer case 4 is made of aluminum. The hammer case 4 has a cylindrical shape. The hammer case 4 is disposed on the front side of the motor housing 21. The hammer case 4 is disposed on the inner circumferential surface side of the case holder 24. The hammer case 4 is disposed in a manner to be fitted in the opening at the front end of the rear case 2B. The hammer case 4 is connected to the rear case 2B. The hammer case 4 is fixed to the front end of the rear case 2B by the four screw members 4S. The hammer case 4 has four boss portions 4H in which screw holes are formed, the screw holes to which the screw members 4S are mounted.

The bearing holding member 5 is disposed on the rear side of the hammer case 4. The outer circumferential surface of the bearing holding member 5 is fitted into the opening at the rear end of the hammer case 4. The bearing holding member 5 is mutually fixed to the rear case 2B and the hammer case 4. The bearing holding member 5 is fixed between the rear case 2B and the hammer case 4 by the screw members 4S. The bearing holding member 5 holds a spindle bearing 44 that supports the spindle 8. The bearing holding member 5 holds a rotor bearing 39F that supports a rotor shaft 33 via the spindle 8. The bearing holding member 5 is made of metal or resin. In the embodiment, the bearing holding member 5 is made of metal, specifically, aluminum.

The hammer case 4 is a rotation mechanism case that houses at least a part of the rotation mechanism 3. The hammer case 4 houses at least a part of the speed reducing mechanism 7, the spindle 8, the impacting mechanism 9, and the anvil 10.

The hammer case 4 includes a first cylindrical portion 4A and a second cylindrical portion 4B. The first cylindrical portion 4A is disposed around the impacting mechanism 9. The second cylindrical portion 4B is disposed forward of the first cylindrical portion 4A. The outer diameter of the second cylindrical portion 4B is smaller than the outer diameter of the first cylindrical portion 4A.

At least a part of the surface of the hammer case 4 is covered with the case holder 24. At least a part of the surface of the hammer case 4 is covered with a hammer case cover 85. The case holder 24 and a hammer case cover 85 protect the hammer case 4. The case holder 24 and the hammer case cover 85 prevent contact between the hammer case 4 and an object around the hammer case 4. In the embodiment, substantially the entire surface of the hammer case 4 is covered with the case holder 24 and the hammer case cover 85.

The motor 6 is the power source of the power tool 1. The motor 6 is an inner-rotor-type brushless motor. The motor 6 includes a stator 26 and a rotor 27. The stator 26 is supported by the motor housing 21. The stator 26 is disposed around the rotor 27. The rotor 27 rotates with respect to the stator 26. The rotor 27 rotates about the rotation axis AX extending in the front-rear direction.

The stator 26 includes a stator core 28, an insulator, and coils 31. The insulator includes a front insulator 29 and a rear insulator 30. The stator 26 is connected to a power line 26L (see FIG. 11) that supplies power to the coils 31. The stator 26 is connected to a controller 38 (see FIG. 3) via the power line 26L.

The stator core 28 is disposed radially outside the rotor 27. The stator core 28 includes a plurality of laminated steel plates. The steel plates are metal plates containing iron as a main component. The stator core 28 has a tubular shape. The stator core 28 includes a plurality of teeth that respectively support the coils 31.

The insulator is interposed between the stator core 28 and the coils 31. The front insulator 29 is provided on the front portion of the stator core 28. The rear insulator 30 is provided on the rear portion of the stator core 28. Each of the front insulator 29 and the rear insulator 30 is an electric insulating member made of synthetic resin. The front insulator 29 is disposed in a manner to cover a part of the surface of the teeth. The rear insulator 30 is disposed in a manner to cover a part of the surface of the teeth.

The coils 31 are mounted (wound) on the stator core 28 via the front insulator 29 and the rear insulator 30. The coils 31 are respectively arranged around the teeth of the stator core 28 via the front insulator 29 and the rear insulator 30. The coils 31 and the stator core 28 are electrically insulated from each other by the front insulator 29 and the rear insulator 30.

The rotor 27 rotates about the rotation axis AX. The rotor 27 includes a rotor core portion 32 and a rotor shaft 33.

Each of the rotor core portion 32 and the rotor shaft 33 is made of steel. The rotor shaft 33 protrudes forward and rearward in the front-rear direction from the end surfaces of the rotor core portion 32. The rotor shaft 33 includes a front shaft 33F protruding forward from the front end surface of the rotor core portion 32 and a rear shaft 33R protruding rearward from the rear end surface of the rotor core portion 32.

The rotor core portion 32 includes a rotor magnet (not illustrated). The rotor magnet extends in the axial direction from the front surface to the rear surface of the rotor core portion 32. The rotor magnet is disposed inside the rotor core portion 32.

Figure 11:
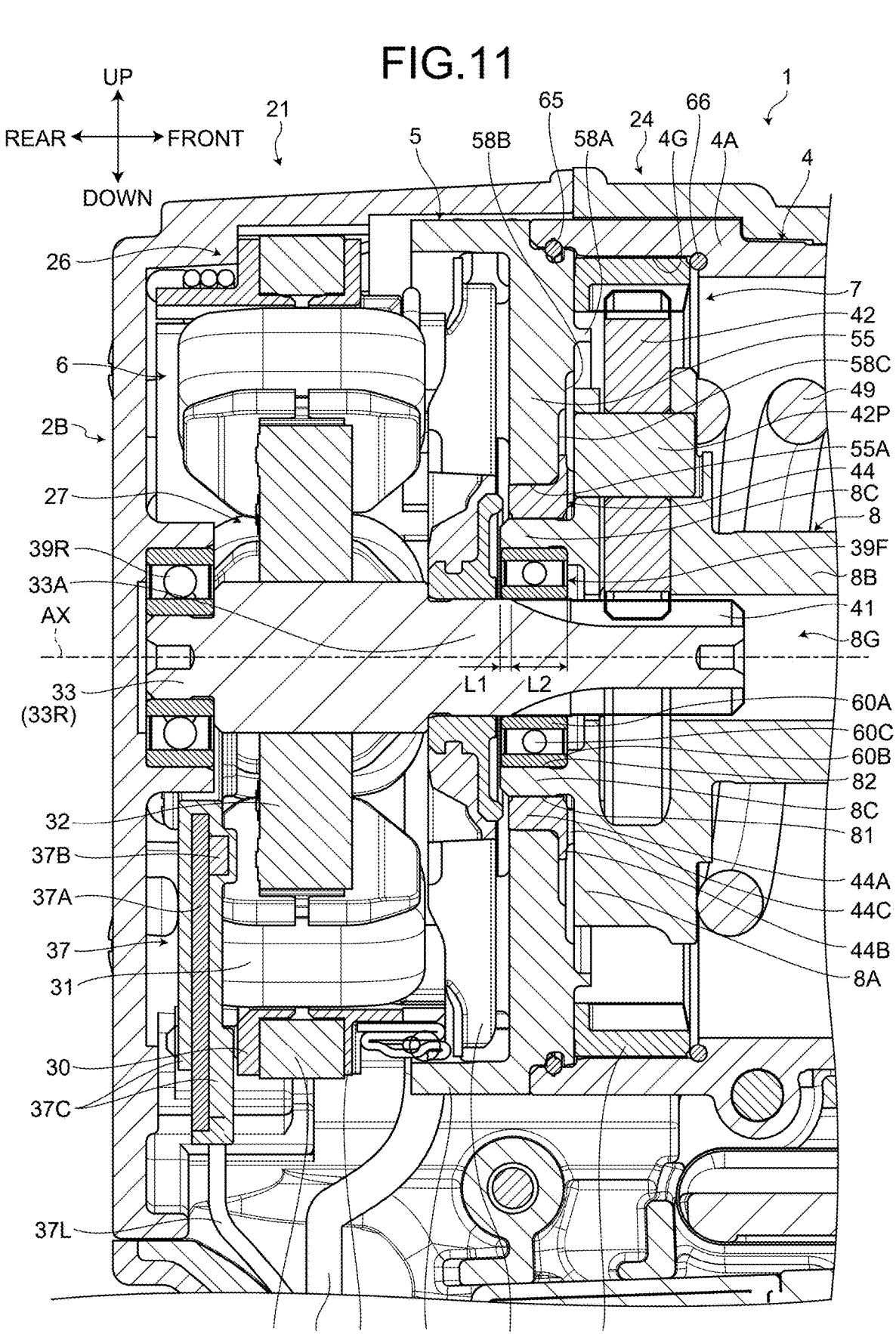
FIG. 11 is a longitudinal sectional view illustrating a peripheral structure of the bearing holding member of the embodiment.

A sensor board 37 is attached to the rear insulator 30. The sensor board 37 is fixed to the rear insulator 30 by a screw 37S. As illustrated in FIG. 11, the sensor board 37 includes a circuit board 37A and a rotation detection element 37B supported by the circuit board 37A. The circuit board 37A and the rotation detection element 37B are covered with mold resin 37C. The sensor board 37 is connected to a signal line 37L. The sensor board 37 is connected to the controller 38 (see FIG. 3) via the signal line 37L. At least a part of the sensor board 37 faces the rear end surface of the rotor core portion 32. The rotation detection element 37B detects the position of the rotor 27 in the rotation direction by detecting the position of the rotor magnet.

The rotor shaft 33 is supported by the rotor bearing. The rotor bearing includes a rotor bearing 39F on the front side that supports the front shaft 33F in a rotatable manner and a rotor bearing 39R on the rear side that supports the rear shaft 33R in a rotatable manner. The rotor bearing 39F and the rotor bearing 39R support the rotor 27 in a rotatable manner.

The rotor bearing 39R is held by the rear case 2B. The rotor bearing 39F is held by the spindle 8. The front end of the rotor shaft 33 passes through the rotor bearing 39F and is disposed in the internal space of the hammer case 4. The front end of the rotor shaft 33 is connected to the rotation mechanism 3 inside the hammer case 4.

As described above, the rotation mechanism 3 includes the speed reducing mechanism 7, the spindle 8, the impacting mechanism 9, and the anvil 10. The speed reducing mechanism 7 is disposed forward of the motor 6. A pinion gear 41 is formed at a front end of the rotor shaft 33. The pinion gear 41 is connected to at least a part of the speed reducing mechanism 7. The rotor shaft 33 is connected to the speed reducing mechanism 7 via the pinion gear 41.

The speed reducing mechanism 7 is disposed on the front surface side of the bearing holding member 5. The speed reducing mechanism 7 is disposed inside the hammer case 4. The speed reducing mechanism 7 connects the rotor shaft 33 and the spindle 8. The speed reducing mechanism 7 transmits the rotation of the rotor 27 to the spindle 8. The speed reducing mechanism 7 rotates the spindle 8 at a rotational speed lower than the rotational speed of the rotor shaft 33. The speed reducing mechanism 7 includes a planetary gear mechanism.

The speed reducing mechanism 7 includes a plurality of gears. The gears of the speed reducing mechanism 7 are driven by the rotor 27.

The speed reducing mechanism 7 includes a plurality of planetary gears 42 arranged around the pinion gear 41, and an internal gear 43 disposed around the plurality of planetary gears 42. Each of the pinion gear 41, the planetary gears 42, and the internal gear 43 is housed in the hammer case 4. All of the plurality of planetary gears 42 meshes with the pinion gear 41. The planetary gears 42 are rotatably supported by the spindle 8 via respective pins 42P. The spindle 8 is rotated by the planetary gears 42. The internal gear 43 has internal teeth that mesh with the planetary gears 42. The internal gear 43 is fixed to the hammer case 4. A stepped portion in which the internal gear 43 is disposed is provided in a rear portion of the inner circumferential surface of the hammer case 4. The internal gear 43 is disposed between the wall of the stepped portion and the bearing holding member 5. The internal gear 43 is always non-rotatable with respect to the hammer case 4.

When the rotor shaft 33 rotates in response to driving of the motor 6, the pinion gear 41 rotates while also revolving around the pinion gear 41. The planetary gears 42 revolve while meshing with the internal teeth of the internal gear 43. Due to the revolution of the planetary gears 42, the spindle 8 connected to the planetary gears 42 via the pins 42P rotates at a rotation speed lower than the rotation speed of the rotor shaft 33.

The spindle 8 is disposed forward of at least a part of the motor 6. The spindle 8 is disposed forward of the stator 26. At least a part of the spindle 8 is disposed forward of the rotor 27. At least a part of the spindle 8 is disposed forward of the speed reducing mechanism 7. The spindle 8 is disposed rearward of the anvil 10.

The spindle 8 is a rotating member rotated by the rotor 27. The spindle 8 is rotated by the rotational force of the rotor 27 transmitted by the speed reducing mechanism 7. The spindle 8 transmits the rotational force of the motor 6 to the anvil 10 via balls 48 and a hammer 47.

The spindle 8 includes a flange portion 8A, a shaft portion 8B protruding forward from the flange portion 8A, and a holding portion 8C. The flange portion 8A supports the planetary gears 42 in a rotatable manner via the respective pins 42P. The rotation axis of the spindle 8 coincides with the rotation axis AX of the motor 6. The spindle 8 rotates about the rotation axis AX. The holding portion 8C is provided at a rear end of the spindle 8. The holding portion 8C protrudes rearward from the flange portion 8A. The holding portion 8C has a cylindrical shape. The holding portion 8C is surrounded by the spindle bearing 44. The spindle 8 is rotatably supported by the spindle bearing 44.

The bearing holding member 5 is disposed at least partially around the spindle 8. The bearing holding member 5 has an annular shape. The bearing holding member 5 holds the spindle bearing 44. The spindle bearing 44 is held on the inner circumferential surface of the bearing holding member 5. The spindle bearing 44 has an annular shape. The inner circumferential surface of the spindle bearing 44 comes into contact with the spindle 8 to support the spindle 8.

The impacting mechanism 9 is driven by the motor 6. The rotational force of the motor 6 is transmitted to the impacting mechanism 9 via the speed reducing mechanism 7 and the spindle 8. The impacting mechanism 9 impacts (strikes) the anvil 10 in the rotation direction based on the rotational force of the spindle 8 rotated by the motor 6. The impacting mechanism 9 includes the hammer 47, the balls 48, a coil spring 49, and a washer 50. The impacting mechanism 9 including the hammer 47, the balls 48, the coil spring 49, and the washer 50 is housed in a first cylindrical portion 4A of the hammer case 4.

The hammer 47 is disposed forward of the speed reducing mechanism 7. The hammer 47 is disposed around the spindle 8. The hammer 47 is held by the spindle 8. The balls 48 are arranged between the spindle 8 and the hammer 47. The hammer 47 includes a cylindrical hammer body 47D and a hammer protrusion 47E provided on a front portion of the hammer body 47D. An annular recess 47C is provided on the rear surface of the hammer body 47D. The recess 47C is recessed forward from the rear surface of the hammer body 47D.

The hammer 47 is disposed around the shaft portion 8B of the spindle 8. The hammer 47 has a hole 47A in which the shaft portion 8B is disposed.

The hammer 47 is rotated by the motor 6. The rotational force of the motor 6 is transmitted to the hammer 47 via the speed reducing mechanism 7 and the spindle 8. The hammer 47 is rotated by the spindle 8. That is, the hammer 47 is rotatable together with the spindle 8 based on the rotational force of the spindle 8 rotated by the motor 6. The rotation axis of the hammer 47, the rotation axis of the spindle 8, and the rotation axis AX of the motor 6 coincide with each other. The hammer 47 rotates about the rotation axis AX.

The washer 50 is disposed in the recess 47C. The washer 50 is supported by the hammer 47 via a plurality of balls 51. The balls 51 are arranged forward of the washer 50. The washer 50 and the hammer 47 are relatively movable in the rotation direction by the balls 51.

The coil spring 49 is disposed around the shaft portion 8B. The rear end of the coil spring 49 is supported by the flange portion 8A. The front end of the coil spring 49 is disposed in the recess 47C and is supported by the washer 50. The coil spring 49 constantly generates a biasing force (elastic force), which causes the hammer 47 to move forward.

The balls 48 are made of metal such as steel. The balls 48 are arranged between the shaft portion 8B and the hammer 47. The spindle 8 has a spindle groove 8D in which at least a part of each of the balls 48 is disposed. The spindle groove 8D is provided on a part of the outer circumferential surface of the shaft portion 8B. The hammer 47 has a hammer groove 47B in which at least a part of each of the balls 48 is disposed. The hammer groove 47B is provided on a part of the inner surface of the hammer 47. The balls 48 are arranged between the spindle groove 8D and the hammer groove 47B. The balls 48 can roll inside the spindle groove 8D and the hammer groove 47B. The hammer 47 is capable of moving along with the balls 48. The spindle 8 and the hammer 47 are capable of relatively moving in both the axial direction and the rotation direction within a movable range defined by the spindle groove 8D and the hammer groove 47B.

The anvil 10 is disposed forward of the motor 6. The anvil 10 is the output portion of the power tool 1 that rotates due to the rotational force of the rotor 27. At least a part of the anvil 10 is disposed forward of the hammer 47. The anvil 10 has a tool hole 10A into which a tool accessory is insertable. The tool hole 10A is provided in the front end of the anvil 10. The tool accessory is thus mountable on (in) the anvil 10.

The anvil 10 has an anvil protrusion 10B. The anvil protrusion 10B is provided at the rear end of the anvil 10. The anvil protrusion 10B protrudes rearward from the rear end of the anvil 10. The spindle 8 is disposed rearward of the anvil 10. A spindle recess 8E is provided at the front end of the shaft portion 8B. The anvil protrusion 10B is disposed in the spindle recess 8E. The spindle recess 8E is recessed rearward from the front end surface of the shaft portion 8B and receives the anvil protrusion 10B.

The anvil 10 includes a rod-shaped anvil shaft portion 10C and anvil protruding portions 10D. The tool hole 10A is provided in the front end of the anvil shaft portion 10C. The tool accessory is mountable on (in) the anvil shaft portion 10C. The anvil protruding portions 10D are provided at the rear end of the anvil 10. The anvil protruding portions 10D protrude radially outward from the rear end of the anvil shaft portion 10C.

The anvil 10 is rotatably supported by bearings 46. The rotation axis of the anvil 10, the rotation axis of the hammer 47, the rotation axis of the spindle 8, and the rotation axis AX of the motor 6 coincide with each other. The anvil 10 rotates about the rotation axis AX. The bearings 46 are arranged around the anvil shaft portion 10C. The bearings 46 are arranged inside the second cylindrical portion 4B of the hammer case 4. The bearings 46 are held by the second cylindrical portion 4B of the hammer case 4. The bearings 46 support the anvil shaft portion 10C in a rotatable manner.

An O-ring 45 is disposed between the bearing 46 and the anvil shaft portion 10C. The O-ring 45 is in contact with each of the outer circumferential surface of the anvil shaft portion 10C and the inner circumferential surface of the bearing 46.

Two bearings 46 are arranged in the axial direction. Each of the bearings 46 is a ball bearing. Each of the bearings 46 has an inner ring, balls, and an outer ring. The inner ring of the bearing 46 is in contact with an O-ring 45. The balls of the bearing 46 are arranged between the inner ring and the outer ring in the radial direction. The balls of the bearing 46 are in contact with each of the inner ring and the outer ring. The balls of the bearing 46 is arranged in a circumferential direction. The outer ring is disposed on a radially outer side with respect to the inner ring and the balls. The outer ring of the bearing 46 is in contact with the inner circumferential surface of the second cylindrical portion 4B.

At least a part of the hammer 47 is capable of making contact with the anvil protruding portion 10D. The hammer protrusions 47E protruding forward are provided at a front portion of the hammer 47. The hammer protrusions 47E and the anvil protruding portions 10D are capable of making (configured to) contact with each other. When the hammer 47 and the anvil protruding portions 10D are respectively in contact with each other, the anvil 10 rotates together with the hammer 47 and the spindle 8 when the motor 6 is being driven (energized).

The anvil 10 is impacted (struck) in the rotation direction by the hammer 47. For example, during screw fastening work, there are situations in which, when the load acting on the anvil 10 becomes high, the anvil 10 can no longer be caused to rotate merely by the biasing force (elastic force) of the coil spring 49. When the anvil 10 can no longer be caused to rotate merely by the biasing force (elastic force) of the coil spring 49, the rotation of the anvil 10 and the hammer 47 will temporarily (momentarily) stop. The spindle 8 and the hammer 47 can relatively move in the axial direction and the circumferential direction via the balls 48. Even when the rotation of the hammer 47 temporarily stops, the rotation of the spindle 8 continues owing to the power generated by the motor 6. In a state where the rotation of the hammer 47 has temporarily stopped but the spindle 8 continues to rotate, the balls 48 move rearward while being guided by the spindle groove 8D and the hammer groove 47B. The hammer 47 receives a force from the balls 48 and moves rearward along with the balls 48. That is, while the rotation of the anvil 10 is temporarily stopped, the hammer 47 moves rearward owing to the rotation of the spindle 8. The contact between the hammer 47 and the anvil protruding portion 10D is released when the hammer 47 moves rearward.

As described above, the coil spring 49 constantly generates the biasing force, which causes the hammer 47 to move forward. The hammer 47, which has moved rearward, moves forward owing to the biasing force of the coil spring 49. When the hammer 47 moves forward, it receives a force in the rotation direction from the balls 48. That is, the hammer 47 moves forward while rotating. When the hammer 47 moves forward while rotating, the hammer 47 makes contact with the anvil protruding portion 10D while rotating. As a result, the anvil protruding portion 10D is impacted in the rotation direction by the hammer protrusion 47E of the hammer 47. Both the power of the motor 6 and the inertial force of the hammer 47 act on the anvil 10. Therefore, the anvil 10 can rotate about the rotation axis AX with a high torque.

The tool holding mechanism 11 is disposed around a front portion of the anvil 10. The tool holding mechanism 11 holds a tool accessory inserted into the tool hole 10A of the anvil 10. The tool holding mechanism 11 can attach and detach a tool accessory.

The tool holding mechanism 11 includes balls 71, a leaf spring 72, a sleeve 73, a coil spring 74, a positioning member 75, a ring spring 77, and a washer 78.

The anvil 10 has support recesses 76 that support the balls 71. The support recesses 76 are formed on the outer circumferential surface of the anvil shaft portion 10C. Two support recesses 76 are formed in the anvil shaft portion 10C.

The balls 71 are movably supported by the anvil 10. The balls 71 are arranged in the support recesses 76. One ball 71 is disposed in one support recess 76.

A through hole connecting the inner surfaces of the support recesses 76 and the inner surface of the tool hole 10A is formed in the anvil shaft portion 10C. The balls 71 are at least partially arranged in the tool hole 10A in a state of being supported by the support recesses 76. The balls 71 can fix the tool accessory inserted into the tool hole 10A. The balls 71 are movable to an engagement position for fixing the tool accessory and a release position for releasing the fixation of the tool accessory.

The leaf spring 72 generates an elastic force that causes the balls 71 to move to the engagement position. The leaf spring 72 is disposed around the anvil shaft portion 10C. The leaf spring 72 generates an elastic force that causes the balls 71 to move radially inward.

The sleeve 73 is a cylindrical member. The sleeve 73 is disposed around the anvil shaft portion 10C. The sleeve 73 is movable in the axial direction around the anvil shaft portion 10C. The sleeve 73 can prevent the balls 71 positioned at the engagement position from exiting the engagement position. The sleeve 73 can change the state of the balls 71 to be movable from the engagement position to the release position by being moved in the axial direction.

The sleeve 73 is movable, around the anvil shaft portion 10C, between a blocking position at which the movement of the balls radially outward is blocked and an allowing position at which the movement of the balls 71 radially outward is allowed.

With the sleeve 73 disposed at the blocking position, the balls 71 arranged at the engagement position are prevented from moving radially outward. That is, with the sleeve 73 disposed at the blocking position, the balls 71 arranged at the engagement position are prevented from exiting from the engagement position. With the sleeve 73 disposed at the blocking position, the state in which the tool accessory is fixed by the balls 71 is maintained.

With the sleeve 73 moved to the allowing position, the balls 71 arranged at the engagement position are allowed to move radially outward. The sleeve 73 changes the state of the balls 71 to be movable from the engagement position to the release position by being moved to the allowing position. That is, with the sleeve 73 disposed at the allowing position, the balls 71 arranged at the engagement position are allowed to exit from the engagement position. With the sleeve 73 disposed at the allowing position, the state in which the tool accessory is fixed by the balls 71 is made releasable.

The coil spring 74 generates an elastic force, which causes the sleeve 73 to move to the blocking position. The coil spring 74 is disposed around the anvil shaft portion 10C. The blocking position is defined rearward of the allowing position. The coil spring 74 generates an elastic force, which causes the sleeve 73 to move rearward. The front end of the coil spring 74 is in contact with the washer 78. The washer 78 is supported from the front by the ring spring 77 attached to the anvil shaft portion 10C. As a result, the coil spring 74 is supported by the ring spring 77 via the washer 78 and biases the sleeve 73 rearward.

The positioning member 75 is an annular member fixed to the outer circumferential surface of the anvil shaft portion 10C. The positioning member 75 is fixed at a position where the positioning member can face the rear end of the sleeve 73. The positioning member 75 positions the sleeve 73 at the blocking position. The sleeve 73, to which the elastic force for moving the sleeve 73 rearward is applied from the coil spring 74, is positioned at the blocking position by coming into contact with the positioning member 75.

The fan 12 is disposed forward of the stator 26 of the motor 6. The fan 12 generates an air flow for cooling the motor 6. The fan 12 is fixed to at least a part of the rotor 27. The fan 12 is fixed to the front shaft 33F. The fan 12 is disposed between the rotor bearing 39F and the stator 26.

The fan 12 rotates by the rotation of the rotor 27. When the rotor shaft 33 rotates, the fan 12 rotates together with the rotor shaft 33. When the fan 12 rotates, the air in the external space of the housing 2 flows into the internal space of the housing 2 via the intake port 19. The air flowed into the internal space of the housing 2 flows through the internal space of the housing 2 to cool the motor 6. The air flowed through the internal space of the housing 2 is sent out radially outward from the fan 12 as the fan 12 rotates. The air sent out by the fan 12 flows out to the external space of the housing 2 through the exhaust port 20 in the housing 2.

The battery mounting unit 13 is disposed below the battery holder 23. The battery mounting unit 13 is connected to the battery pack 25. The battery pack 25 is mounted on the battery mounting unit 13. In the embodiment, there is one battery mounting unit 13. One battery pack 25 is mounted to the battery mounting unit 13. The battery pack 25 is detachable from the battery mounting unit 13. The battery pack 25 is attached to the battery mounting unit 13 by being inserted into the battery mounting unit 13 from the front of the battery holder 23. The battery pack 25 is removed from the battery mounting unit 13 by being removed forward from the battery mounting unit 13. The battery pack 25 includes a rechargeable battery. In the embodiment, the battery pack 25 includes a rechargeable lithium-ion battery. By being mounted to the battery mounting unit 13, the battery pack 25 can supply power to the power tool 1. The motor 6 is driven based on electric power supplied from the battery pack 25. The operation display unit 16 is operated by the power supplied from the battery pack 25.

The rated voltage of the battery pack 25 is not particularly limited. For example, the rated voltage of the battery pack 25 is 18 V or greater. The rated voltage of the battery pack 25 may be 18 V, 36 V, or 72 V. In addition, the rated voltage of the battery pack 25 may be less than 18 V, for example, 10.8 V, 14.4 V, or others.

The trigger lever 14 is provided on the front side of the grip portion 22. The trigger lever 14 is operated (pressed) by an operator to activate the motor 6. The motor is changed between operation and stoppage by operating (pressing and releasing) the trigger lever 14.

The forward/reverse switching lever 15 is provided above the grip portion 22. The forward/reverse switching lever 15 is operated by an operator to change the rotation direction of the motor 6. When the forward/reverse switching lever 15 is operated, the rotation direction of the motor 6 is changed from one of the forward rotation direction and the reverse rotation direction to the other. When the rotation direction of the motor 6 is changed, the rotation direction of the spindle 8 is changed.

The operation display unit 16 is provided on the battery holder 23. The operation display unit 16 is provided on the upper surface of the battery holder 23 on the front side of the grip portion 22. The operation display unit 16 has a plurality of operation buttons 16A. When an operator operates (presses) the operation buttons 16A, the operation mode of the motor 6 is changed. The operation display unit 16 may be disposed on the rear side of the grip portion 22 and may be provided on the rear surface of the battery holder 23, for example.

The mode selecting switch 17 is provided above the trigger lever 14. The mode selecting switch 17 is operated by the operator to change the operation mode of the motor 6.

Figure 7:
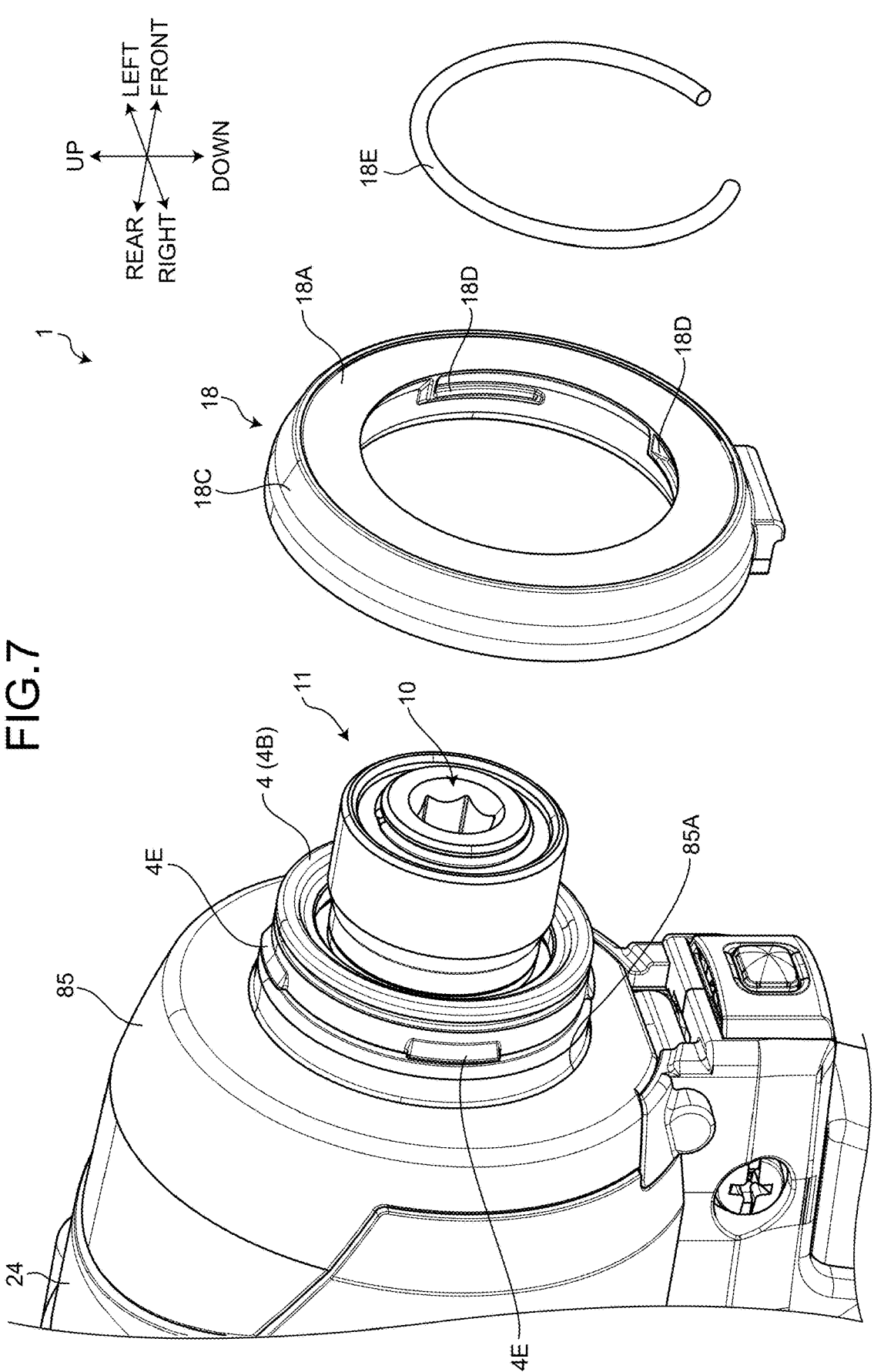
FIG. 7 is an exploded perspective view illustrating a light assembly of the embodiment.

FIG. 7 is an exploded perspective view illustrating the light assembly 18 according to the embodiment. The light assembly 18 emits illumination light. The light assembly 18 illuminates the anvil 10 and the periphery of the anvil 10 with illumination light. The light assembly 18 illuminates forward of the anvil 10 with illumination light. In addition, the light assembly 18 illuminates the tool accessary mounted on the anvil 10, and the periphery of the tool accessory with illumination light. In the embodiment, the light assembly 18 includes an annular light case 18A, a plurality of light emitting elements 18B (see FIG. 5) held by the light case 18A, and a light cover 18C covering the outer circumference of the light case 18A. The light case 18A is disposed around the second cylindrical portion 4B of the hammer case 4. A plurality of engagement ribs 18D is formed on the inner circumferential surface of the light case 18A. The engagement ribs 18D extend in the circumferential direction on the inner circumferential surface of the light case 18A. A plurality of engagement protrusions 4E to be engaged with engagement ribs 18D are formed on the outer circumference of the second cylindrical portion 4B. The engagement protrusions 4E extend in the circumferential direction on the outer circumferential surface of the second cylindrical portion 4B. The same number of engagement protrusions 4E as that of the engagement ribs 18D are provided.

When attaching the light assembly 18 to the power tool 1, the light assembly 18 is fitted to the outer circumference of the second cylindrical portion 4B from the front in a state where the angle in the rotation direction is adjusted such that the engagement ribs 18D and the engagement protrusions 4E are not in contact with each other, and then the light assembly 18 is rotated around the second cylindrical portion 4B such that the engagement ribs 18D are disposed on the rear side of the engagement protrusions 4E. As a result, the engagement ribs 18D and the engagement protrusions 4E are engaged to each other in the front-rear direction, and the light assembly 18 is held by the hammer case 4. In addition, the light assembly 18 includes a retaining member 18E that prevents the light case 18A from coming out forward from the second cylindrical portion 4B. The retaining member 18E is attached to the front surface side of the light case 18A in the second cylindrical portion 4B (see FIG. 5).

The hammer case cover 85 has an annular shape and has an opening 85A in the front portion. The hammer case cover 85 is attached to the front portion of the hammer case 4 from the front side of the hammer case 4. The front portion of the hammer case 4 protrudes forward from the opening 85A. The hammer case cover 85 is disposed rearward of the light assembly 18. The light assembly 18 also functions as a stopper that prevents the hammer case cover 85 from coming out of the hammer case 4 forward.

Support Structure of Rotor Shaft and Spindle

Figure 8:
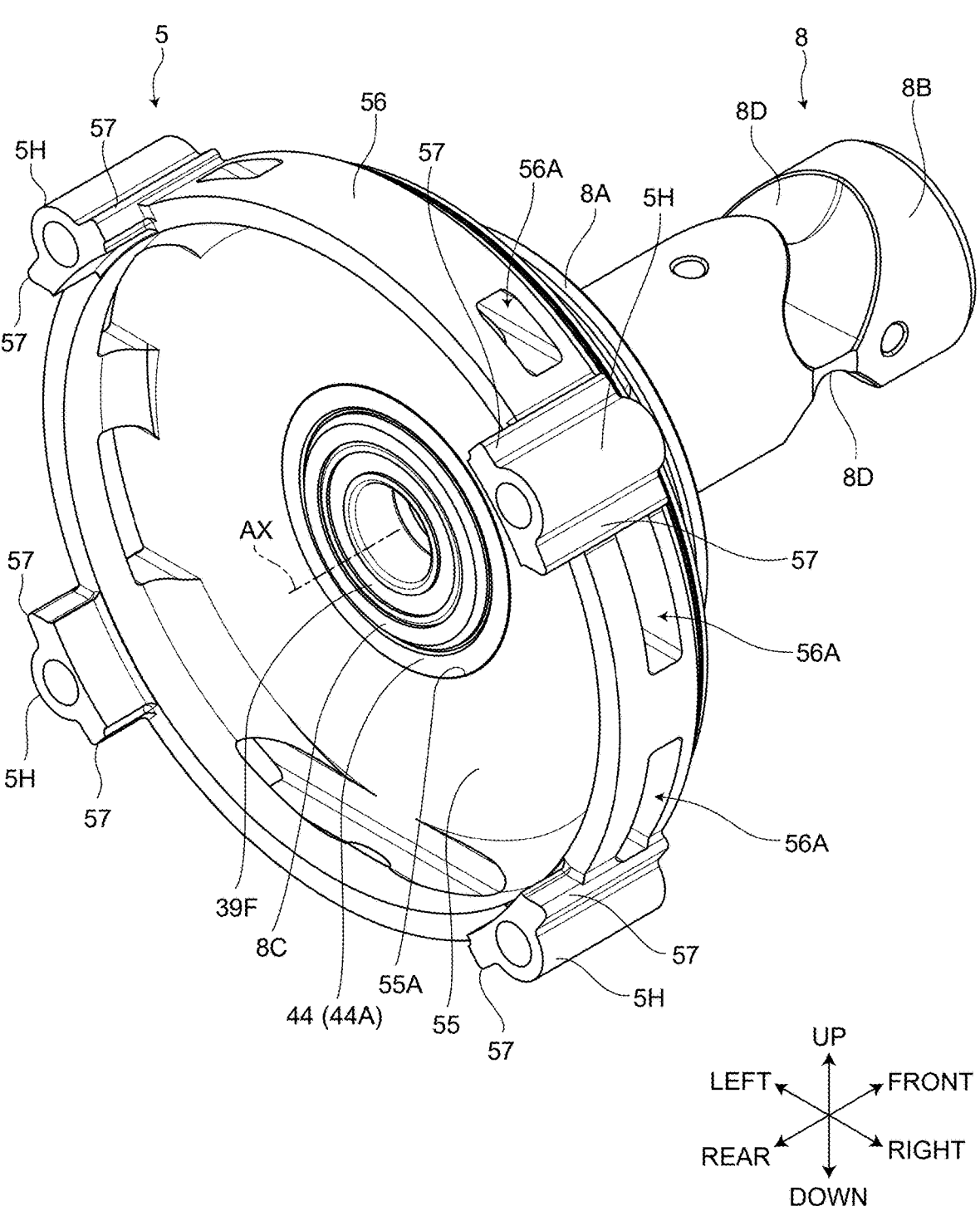
FIG. 8 is a perspective view illustrating a bearing holding member and a spindle of the embodiment as viewed from the rear.
Figure 9:
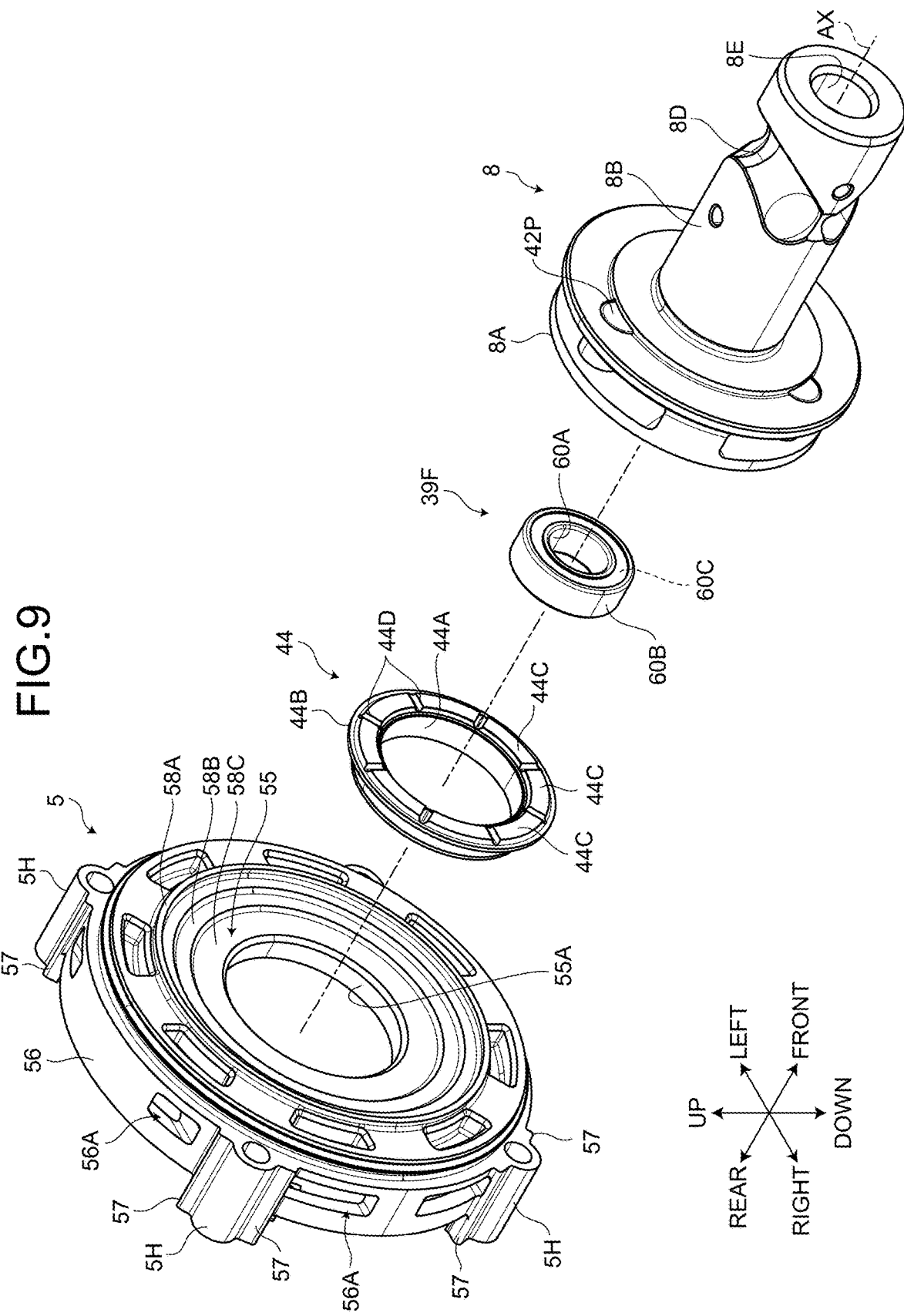
FIG. 9 is an exploded perspective view illustrating a support structure of a bearing and the spindle of the embodiment as viewed from the front.
Figure 10:
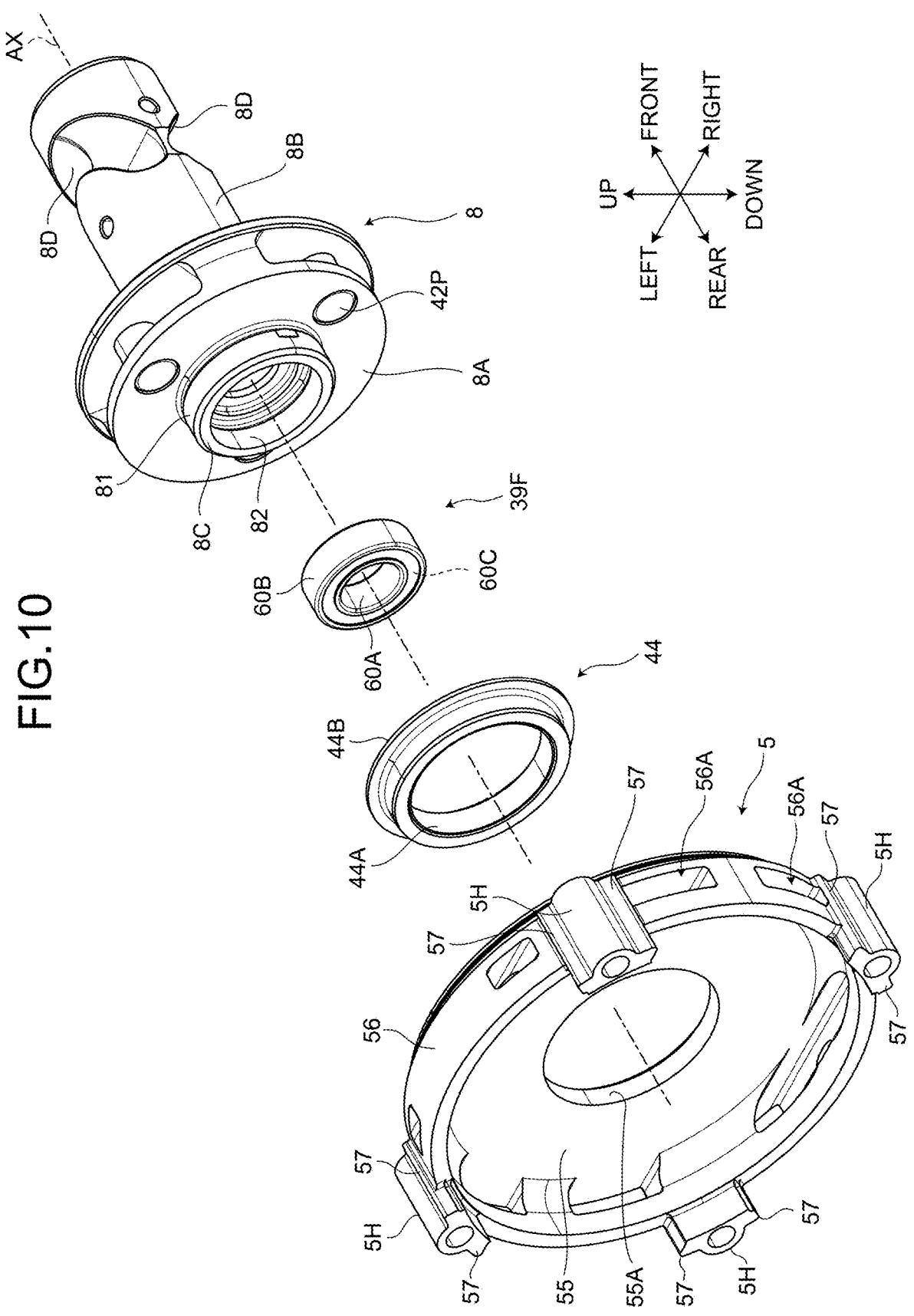
FIG. 10 is an exploded perspective view illustrating the support structure of the bearing and the spindle of the embodiment as viewed from the rear.
Figure 12:
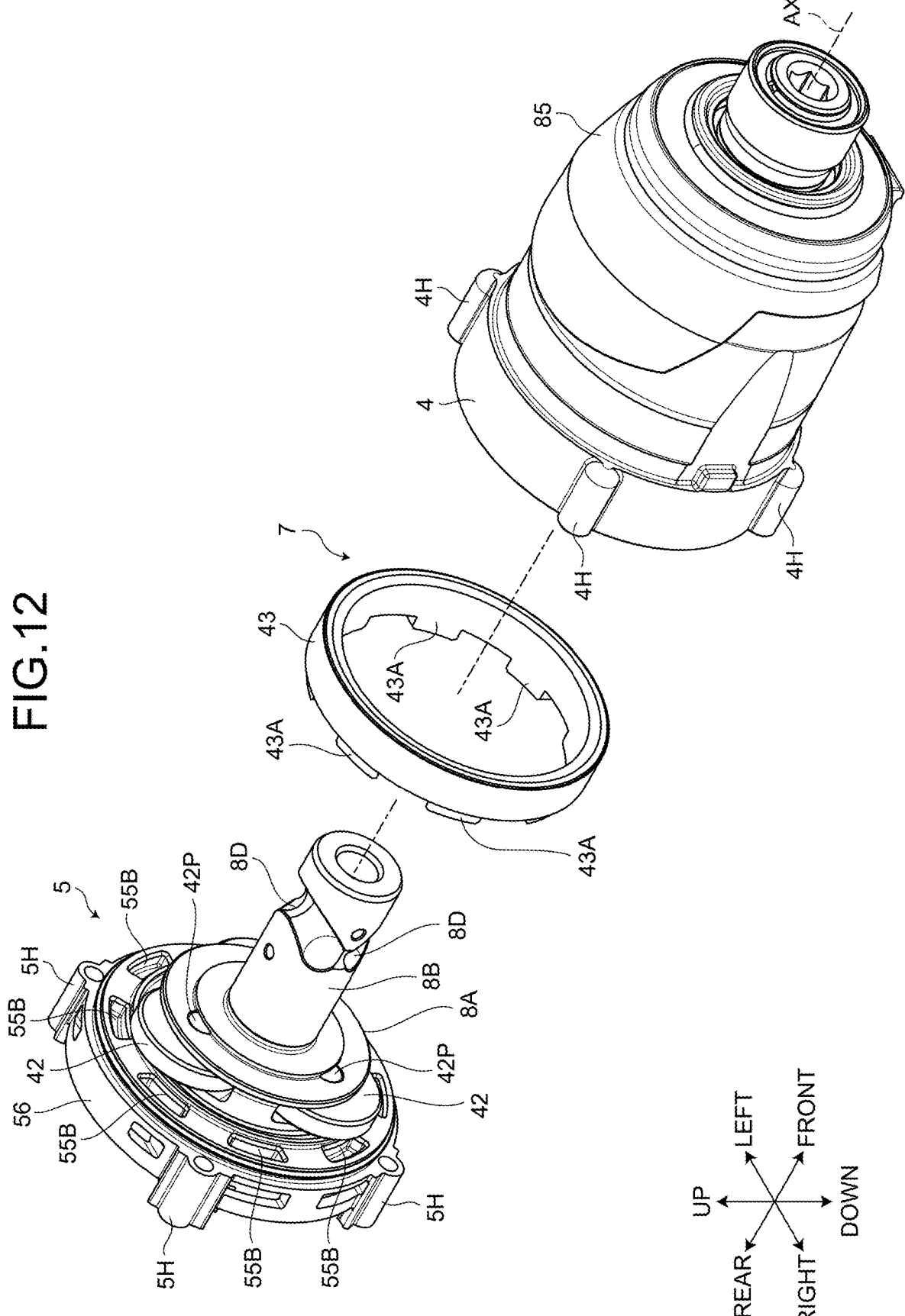
FIG. 12 is an exploded perspective view illustrating the bearing holding member and a hammer case of the embodiment as viewed from the front.
Figure 13:
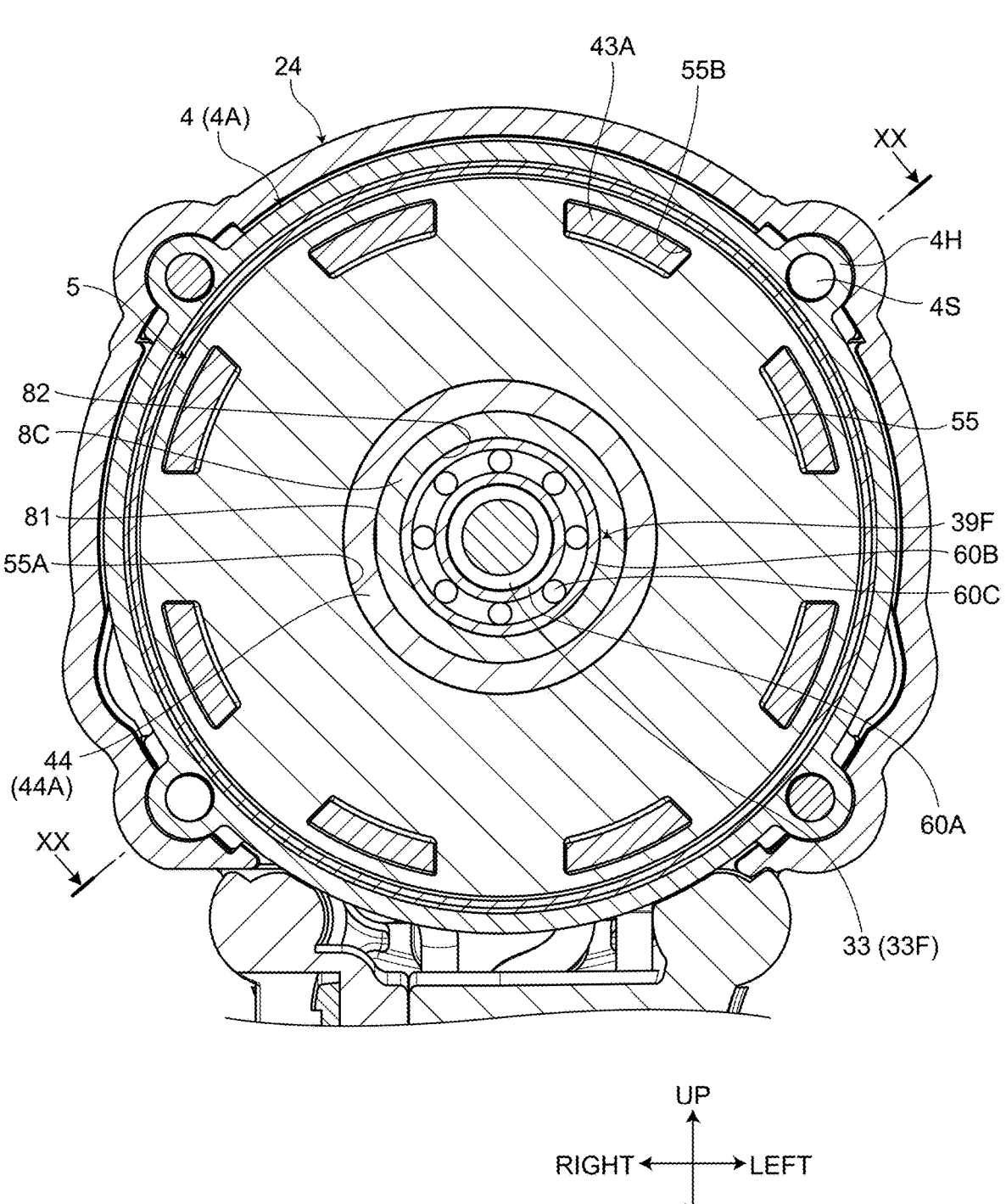
FIG. 13 is a cross-sectional view illustrating the bearing holding member of the embodiment as viewed from the front.

FIG. 8 is a perspective view illustrating the bearing holding member 5 and the spindle 8 of the embodiment as viewed from the rear. FIG. 9 is an exploded perspective view illustrating a support structure of the bearing and the spindle 8 of the embodiment as viewed from the front. FIG. 10 is an exploded rear perspective view illustrating the support structure of the bearing and the spindle 8 of the embodiment. FIG. 11 is a longitudinal sectional view illustrating a peripheral structure of the bearing holding member 5 of the embodiment. FIG. 12 is an exploded front perspective view illustrating the bearing holding member 5 and the hammer case 4 of the embodiment. FIG. 13 is a cross-sectional view illustrating the bearing holding member 5 of the embodiment as viewed from the front. Note that FIG. 13 is a diagram illustrating a cross section orthogonal to the rotation axis AX.

In the embodiment, the spindle bearing 44 holds the rotor bearing 39F via the spindle 8. The spindle bearing 44 is held by the bearing holding member 5.

The bearing holding member 5 has an annular shape. The bearing holding member 5 includes a holding plate portion 55 having a flat plate shape extending in the radial direction. The bearing holding member 5 also includes a circumferential wall 56 rising in the axial direction from the outer circumference of the holding plate portion 55.

The holding plate portion 55 has an annular shape having a holding opening 55A formed at the central portion thereof. The holding opening 55A has a circular shape and penetrates the holding plate portion 55 in the front-rear direction. The bearing holding member 5 holds the spindle bearing 44 in the holding opening 55A. The front surface of the holding plate portion 55 faces the spindle 8. The rear surface of the holding plate portion 55 faces the fan 12. A rib 58A, a first recesses 58B, and a second recess 58C are formed on the front surface of the holding plate portion 55. The rib 58 A, the first recess 58B, and the second recess 58C each have an annular shape surrounding the holding opening 55A. The rib 58A protrudes forward from the front surface of the holding plate portion 55. The first recess 58B is disposed on a radially inner side of the rib 58A and is recessed rearward from the front surface of the holding plate portion 55. The second recess 58C is disposed on a radially inner side of the first recess 58B and is recessed more rearward than the first recess 58B. An edge on the radially inner side of the second recess 58C is the edge of the holding opening 55A.

The circumferential wall 56 protrudes rearward from the outer circumference of the holding plate portion 55. The circumferential wall 56 extends along the outer circumference of the holding plate portion 55. The circumferential wall 56 has an annular shape. Boss portions 5H are provided on the outer circumferential surface of the circumferential wall 56. An insertion hole through which a screw member 4S is inserted is formed in each of the boss portions 5H.

As illustrated in FIG. 11, the bearing holding member 5 is fitted into an opening at the rear end of the first cylindrical portion 4A of the hammer case 4 from the rear side. A seal member 65 is provided between the outer circumferential surface of the bearing holding member 5 and the inner circumferential surface of the hammer case 4. The seal member 65 is an O-ring.

The spindle bearing 44 has an annular shape. The spindle bearing 44 is disposed on the inner circumferential surface of the holding opening 55A. The spindle bearing 44 is held in the holding opening 55A. The inner circumferential surface of the spindle bearing 44 is in contact with the spindle 8. The spindle bearing 44 supports the outer circumferential surface of the spindle 8. The spindle bearing 44 includes a sliding bearing. The type of sliding bearing is not particularly limited. In the embodiment, the spindle bearing 44 is a self-lubricating bearing (so-called oil-less bearing). The sliding bearing has a simple structure and high rigidity as compared with a rolling bearing such as a ball bearing. The spindle bearing 44 supports the spindle 8 in the radial direction. The spindle bearing 44 axially supports the spindle 8. The spindle bearing 44 includes a radial bearing portion 44A and a thrust bearing portion 44B.

The radial bearing portion 44A supports the outer circumferential surface of the spindle 8 in the radial direction. The radial bearing portion 44A is disposed on the inner circumferential surface of the holding opening 55A. The radial bearing portion 44A has an annular shape. The outer circumferential surface of the radial bearing portion 44A is in contact with the inner surface of the holding opening 55A. The inner circumferential surface of the radial bearing portion 44A is in contact with the outer circumferential surface of the spindle 8. Specifically, the radial bearing portion 44A is in contact with the outer circumferential surface 81 of the holding portion 8C of the spindle 8. As a result, the spindle bearing 44 supports the outer circumferential surface 81 of the holding portion 8C of the spindle 8.

The thrust bearing portion 44B supports the spindle 8 in the axial direction. The thrust bearing portion 44B extends in a flange shape in the radial direction from an axial end surface of the radial bearing portion 44A. The thrust bearing portion 44B extends radially outward from the front end surface of the radial bearing portion 44A. The thrust bearing portion 44B extends along the front surface of the holding plate portion 55. The rear surface of the thrust bearing portion 44B is in contact with the front surface of the holding plate portion 55. The thrust bearing portion 44B functions as a positioning unit in the front-rear direction of the spindle bearing 44. The front surface of the thrust bearing portion 44B faces the flange portion 8A of the spindle 8 in the axial direction. The front surface of the thrust bearing portion 44B includes sliding surfaces 44C that support the rear surface of the flange portion 8A in the axial direction. The sliding surfaces 44C are formed at equal intervals along the circumferential direction of the thrust bearing portion 44B. Each of the sliding surfaces 44C has a pad shape and extends in the circumferential direction on the front surface of the thrust bearing portion 44B. The adjacent sliding surfaces 44C are partitioned by grooves 44D. The grooves 44D function as lubricant storages.

The spindle 8 is disposed on a radially inner side of the spindle bearing 44. The spindle 8 is rotatably supported by a spindle bearing 44.

The spindle 8 includes a holding portion 8C that holds the rotor bearing 39F. The holding portion 8C has a cylindrical shape. The rotor bearing 39F and the rotor shaft 33 are arranged inside the holding portion 8C. The holding portion 8C protrudes rearward from the rear surface of the flange portion 8A. The central axis of the holding portion 8C coincides with the rotation axis of the spindle 8, namely, the rotation axis AX of the motor 6.

The holding portion 8C is disposed in the holding opening 55A of the bearing holding member 5. The holding portion 8C is disposed on a radially inner side of the spindle bearing 44. The holding portion 8C has an annular outer circumferential surface 81. The outer circumferential surface 81 of the holding portion 8C is a sliding surface that is in contact with the spindle bearing 44. The outer circumferential surface 81 of the holding portion 8C is in contact with the inner circumferential surface of the radial bearing portion 44A.

The rear surface of the flange portion 8A is a sliding surface that is in contact with the spindle bearing 44. The rear surface of the flange portion 8A is configured to come into contact with the sliding surfaces 44C of the thrust bearing portion 44B. The spindle bearing 44 supports the outer circumferential surface 81 of the holding portion 8C in the radial direction and supports the rear surface of the flange portion 8A in the axial direction.

The spindle 8 is supported by the spindle bearing 44 at the holding portion 8C disposed at the rear portion and is supported by the anvil 10 at the spindle recess 8E disposed at the front portion. The anvil 10 is supported by the bearing 46. The front portion of the spindle 8 is rotatably supported by the bearing 46 via the anvil 10.

The holding portion 8C has an annular inner circumferential surface 82. The holding portion 8C holds the rotor bearing 39F on the inner circumferential surface 82.

The rotor bearing 39F has an annular shape. The rotor bearing 39F is disposed on the inner circumferential surface of the spindle 8. The rotor bearing 39F is disposed on the inner circumferential surface 82 of the holding portion 8C. The rotor bearing 39F supports the outer circumferential surface of the rotor shaft 33. The rotor bearing 39F includes a rolling bearing. The rotor bearing 39F includes an inner ring 60A, an outer ring 60B, and rolling elements. The type of rolling bearing is not particularly limited. In the embodiment, the rotor bearing 39F is a ball bearing. The rolling elements of the rotor bearing 39F are balls 60C. The rolling elements may be rollers or needles. The outer ring 60B of the rotor bearing 39F is in contact with the inner circumferential surface 82 of the holding portion 8C. The inner ring 60A of the rotor bearing 39F is in contact with the outer circumferential surface of the rotor shaft 33. In the rotor bearing 39F, the outer ring 60B is fixed to the inner circumferential surface 82 of the holding portion 8C, and the inner ring 60A rotates together with the rotor shaft 33. The balls 60C of the rotor bearing 39F are disposed between the inner ring 60A and the outer ring 60B in the radial direction. The balls 60C of the rotor bearing 39F are in contact with each of the inner ring 60A and the outer ring 60B. The balls 60C of the rotor bearing 39F is arranged in the circumferential direction.

As illustrated in FIG. 11, the spindle 8 has an insertion hole 8G extending forward from a radially inner side of the holding portion 8C. The insertion hole 8G extends in the axial direction at the center positions of the flange portion 8A and the shaft portion 8B. The inside of the holding portion 8C communicates with the insertion hole 8G. The pinion gear 41 at the front end of the rotor shaft 33 passes through the inside of the holding portion 8C and is disposed in the insertion hole 8G. The pinion gear 41 meshes with the planetary gears 42 inside the insertion hole 8G. The inner diameter of the holding portion 8C is larger than the inner diameter of the insertion hole 8G. That is, the inner circumferential surface of the flange portion 8A is disposed on a radially inner side of the inner circumferential surface 82 of the holding portion 8C. The rotor bearing 39F is in contact with the rear surface of the flange portion 8A in the axial direction inside the holding portion 8C. The flange portion 8A functions as a positioning unit in the front-rear direction of the rotor bearing 39F.

A rear portion of the pinion gear 41 and non-gear portion 33A on the rear side of the pinion gear 41 in the rotor shaft 33 are arranged inside the holding portion 8C. The inner ring 60A of the rotor bearing 39F is in contact with the outer circumferential surface of the non-gear portion 33A of the rotor shaft 33. The inner ring 60A of the rotor bearing 39F is in contact with the outer circumferential surface of the pinion gear 41. That is, the rotor bearing 39F is disposed over the non-gear portion 33A and the rear portion of the pinion gear 41. In the rotor bearing 39F, a length L2 of the contact region with the pinion gear 41 is longer than a length L1 of the contact region with the non-gear portion 33A in the axial direction. As a result, as compared with a case where the rotor bearing 39F is disposed only in the non-gear portion 33A (disposed rearward of the pinion gear 41), a distance in the front-rear direction between the rotor bearing 39F and the planetary gears 42 is reduced, and thus the overall length of the rotor shaft 33 can be shortened.

In the embodiment, the holding plate portion 55 of the bearing holding member 5, the holding portion 8C of the spindle 8, the spindle bearing 44, and the rotor bearing 39F are arranged on the same plane in the radial direction. That is, the spindle bearing 44 is disposed on the inner circumferential surface of the holding opening 55A of the holding plate portion 55, the holding portion 8C is disposed on the inner circumferential surface of the spindle bearing 44 (radial bearing portion 44A), and the rotor bearing 39F is disposed on the inner circumferential surface of the holding portion 8C. In this manner, the holding plate portion 55 of the bearing holding member 5, the holding portion 8C of the spindle 8, the spindle bearing 44, and the rotor bearing 39F are arranged in a nested manner on the same plane. As a result, the dimension in the front-rear direction of the support structure of the spindle 8 and the rotor 27 is shortened as compared with a case where the members are arranged in a shifted manner in the front-rear direction.

The bearing holding member 5 holds the spindle bearing 44 in a state where an end surface (front surface) of the spindle bearing 44 facing toward the spindle 8 and an end surface (rear surface) of the spindle bearing 44 facing toward the opposite side to the spindle 8 are both opened without being covered. The front surface of the spindle bearing 44 includes the sliding surfaces 44C of the thrust bearing portion 44B and faces the flange portion 8A without being covered with the bearing holding member 5. As can be seen from FIG. 11, the rear surface of the spindle bearing 44 is the rear end surface of the radial bearing portion 44A and faces the fan 12 without being covered by the bearing holding member 5. Although not illustrated, for example, in a case where an annular recess that is recessed rearward from the front surface is formed in the bearing holding member 5 and the spindle bearing 44 is disposed in the recess, the rear surface of the spindle bearing 44 is covered by the bearing holding member 5. In this case, a space corresponding to the sum of the thickness of the spindle bearing 44 and the thickness of the bearing holding member 5 covering the rear surface of the spindle bearing 44 is required. In contrast, in the embodiment, since neither the front surface side nor the rear surface side of the spindle bearing 44 is covered, the space in the front-rear direction required for holding the spindle bearing 44 is reduced.

By providing the circumferential wall 56 on the outer circumference of the holding plate portion 55, the rigidity in the front-rear direction of the bearing holding member 5 is improved. In the embodiment, the bearing holding member 5 forms a recessed space recessed forward from the rear end surface by the holding plate portion 55 and the circumferential wall 56. The fan 12 is disposed in the space surrounded by the holding plate portion 55 and the circumferential wall 56 of the bearing holding member 5. The fan 12 faces the holding plate portion 55 of the bearing holding member 5 in the front-rear direction. The radially outer side of the fan 12 is surrounded by the circumferential wall 56. The circumferential wall 56 has a plurality of ventilation ports 56A. The ventilation ports 56A penetrate the circumferential wall 56 in the radial direction. At least a part of the ventilation ports 56A faces the exhaust port 20 of the housing 2 in the radial direction. The space can be saved by disposing the fan 12 in the space surrounded by the holding plate portion 55 and the circumferential wall 56 while ensuring the rigidity of the bearing holding member 5 by providing the circumferential wall 56.

In the front-rear direction, the formation positions of the ventilation ports 56A and the formation position of the exhaust port 20 do not completely coincide with each other in the front-rear direction but are shifted. The exhaust port 20 has a structure in which two through holes extending in the circumferential direction are arranged in the front-rear direction, and a portion partitioning between the two through holes faces a ventilation port 56A in the radial direction. Therefore, at least a part of the ventilation port 56A faces a portion of the rear case 2B other than the exhaust port 20 in the radial direction. As a result, entry of a foreign matter through the exhaust port 20 is reduced by the circumferential wall 56 while the exhaust path is secured by the ventilation ports 56A.

As illustrated in FIG. 12, the holding plate portion 55 is formed with engagement recesses 55B recessed rearward from the front surface of the holding plate portion 55. The engagement recesses 55B are provided at intervals in the circumferential direction in the vicinity of the outer circumference of the holding plate portion 55. Each of the engagement recesses 55B extends in an arc shape along the outer circumference of the holding plate portion 55. Engagement protrusions 43A of the internal gear 43 are respectively disposed in the engagement recesses 55B. Each of the engagement protrusions 43A protrudes rearward from the rear end surface of the internal gear 43. The engagement protrusions 43A are provided at intervals in the circumferential direction of the internal gear 43 corresponding to the engagement recesses 55B of the holding plate portion 55. With the engagement protrusions 43A fitted to the respective engagement recesses 55B, the internal gear 43 is positioned and fixed in the rotation direction.

As illustrated in FIG. 11, the internal gear 43 is fitted to the first cylindrical portion 4A of the hammer case 4 from the rear. A stepped portion 4G in which the internal gear 43 is disposed is provided at a rear portion of the inner circumferential surface of the first cylindrical portion 4A. In the front-rear direction, the internal gear 43 is disposed between a wall at the front end of the stepped portion 4G and the bearing holding member 5. An O-ring 66 is disposed at the front end of the stepped portion 4G. The O-ring 66 seals between the internal gear 43 and the hammer case 4. The O-ring 66 also functions as a damper that eliminates backlash in the front-rear direction between the internal gear 43 and the hammer case 4 by elastic deformation and alleviates impact.

Modification of Spindle Bearing

Figure 14:
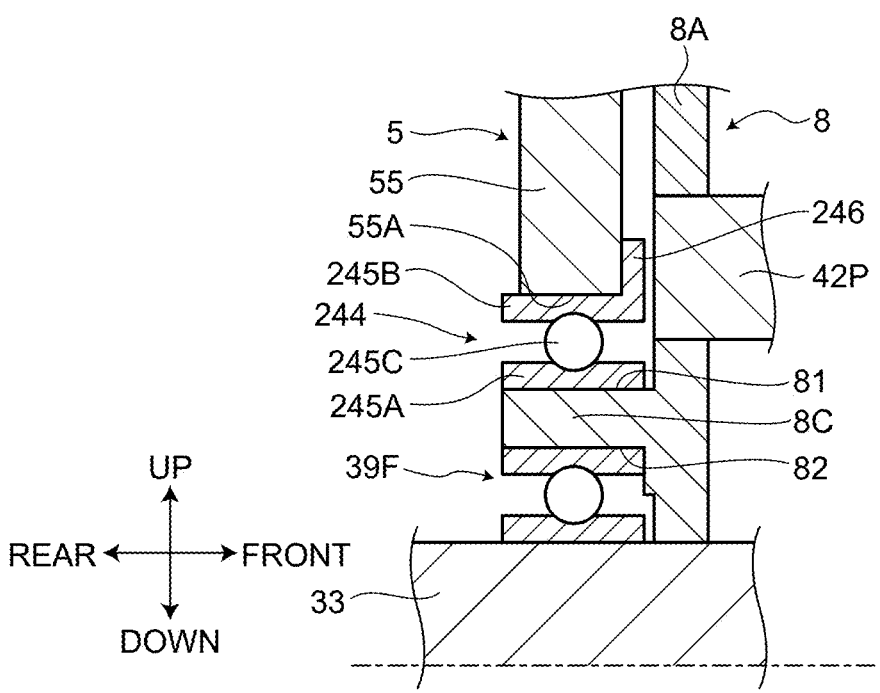
FIG. 14 is a schematic longitudinal sectional view illustrating a modification of a spindle bearing.

FIG. 14 is a schematic longitudinal sectional view illustrating a modification of the spindle bearing 44. The spindle bearing 44 may be a rolling bearing instead of the sliding bearing. In FIG. 14, the spindle bearing 244 is a ball bearing. The spindle bearing 244 includes an inner ring 245A, an outer ring 245B, and rolling elements (balls 245C). The outer ring 245B of the spindle bearing 244 is in contact with the inner circumferential surface of the holding opening 55A of the bearing holding member 5. The inner ring 245A of the spindle bearing 244 is in contact with the outer circumferential surface 81 of the holding portion 8C of the spindle 8. The balls 245C are arranged between the inner ring 245A and the outer ring 245B in the radial direction. The balls 245C are in contact with each of the inner ring 245A and the outer ring 245B. The spindle bearing 244 has a flange portion 246 extending radially outward from the front end surface of the outer ring 245B. The flange portion 246 extends radially outward from the front end surface of the outer ring 245B. The flange portion 246 extends along the front surface of the holding plate portion 55. The rear surface of the flange portion 246 is in contact with the front surface of the holding plate portion 55. The flange portion 246 functions as a positioning unit in the front-rear direction of the spindle bearing 244.

Modification of Rotor Bearing

Figure 15:
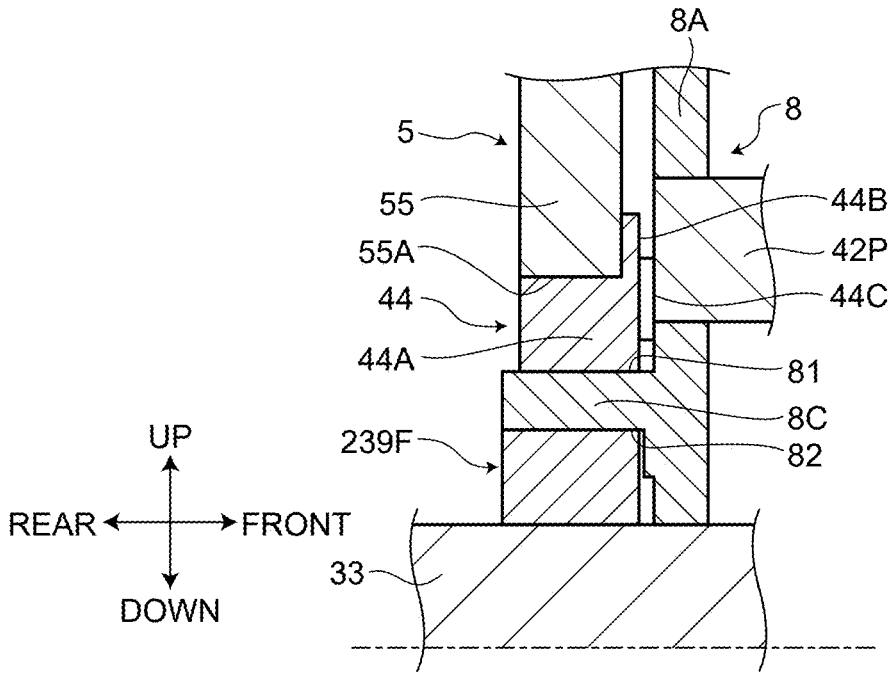
FIG. 15 is a schematic longitudinal sectional view illustrating a modification of a rotor bearing.

FIG. 15 is a schematic longitudinal sectional view illustrating a modification of the rotor bearing 39F. The rotor bearing 39F may be a sliding bearing instead of the rolling bearing. In FIG. 15, a rotor bearing 239F includes a sliding bearing. The type of sliding bearing is not particularly limited. The rotor bearing 239F is, for example, a self-lubricating bearing (so-called oil-less bearing). The outer circumferential surface of the rotor bearing 239F is fixed to the inner circumferential surface 82 of the holding portion 8C of the spindle 8. The rotor bearing 239F supports the outer circumferential surface of the rotor shaft 33. The inner circumferential surface of the rotor bearing 239F is a sliding surface with respect to the rotor shaft 33.

Modification of Support Portion of Rotor Bearing

Figure 16:
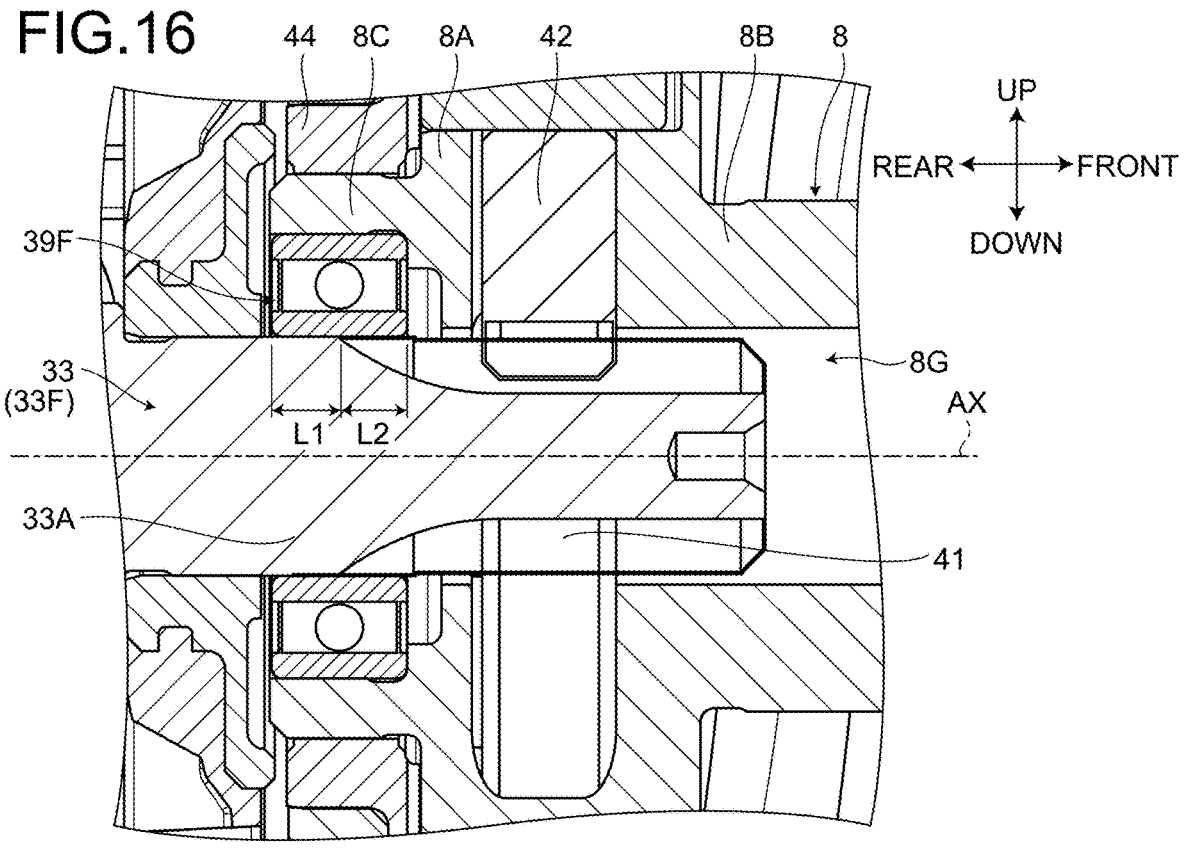
FIG. 16 is a schematic longitudinal sectional view illustrating a first modification of a support portion of the rotor bearing.
Figure 17:
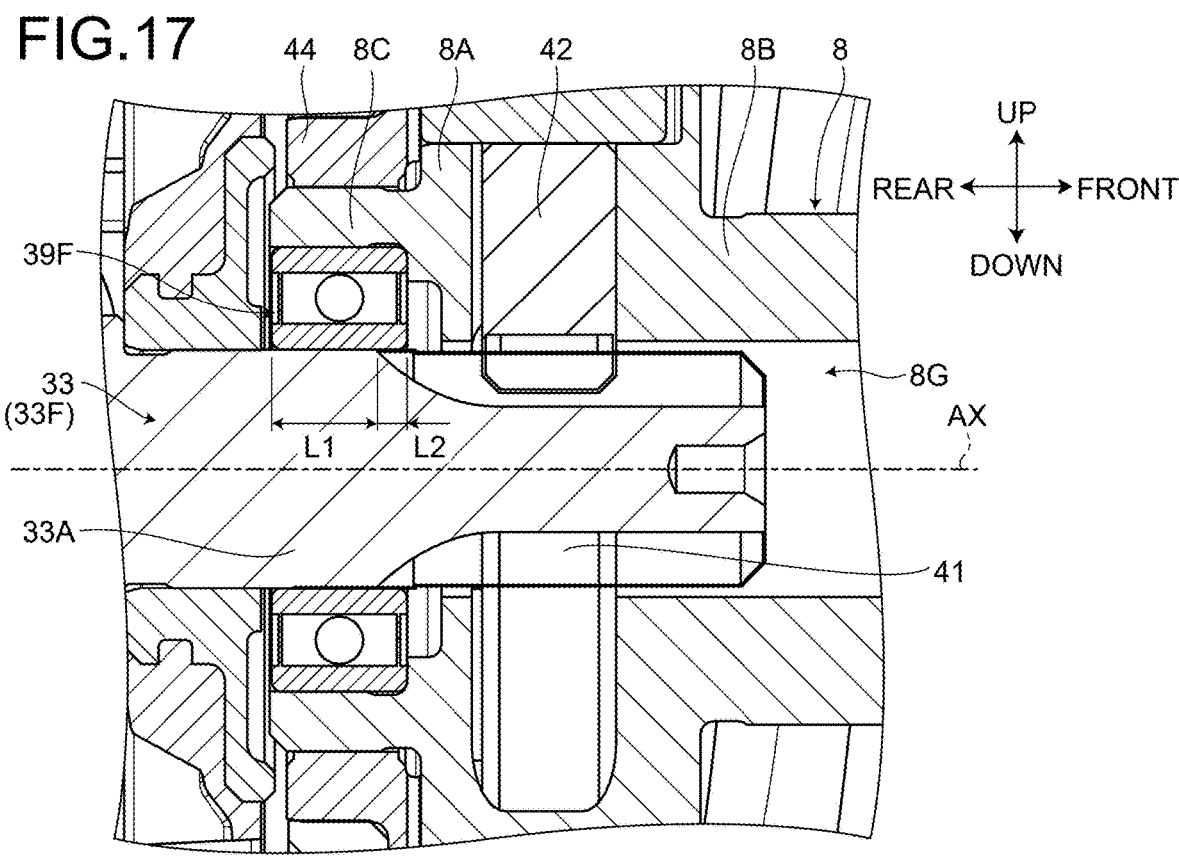
FIG. 17 is a schematic longitudinal sectional view illustrating a second modification of the support portion of the rotor bearing.

As described above, the rotor bearing 39F is disposed over the non-gear portion 33A and the rear portion of the pinion gear 41. In the example illustrated in FIG. 11, the length L2 of the contact region of the rotor bearing 39F with the pinion gear 41 is longer than the length L1 of the contact region of the rotor bearing 39F with the non-gear portion 33A; however, it is not limited thereto. FIG. 16 is a schematic longitudinal sectional view illustrating a first modification of the support portion of the rotor bearing 39F. FIG. 17 is a schematic longitudinal sectional view illustrating a second modification of the support portion of the rotor bearing 39F.

In FIG. 16, a length L1 of the contact region of the rotor bearing 39F with the non-gear portion 33A is equivalent to a length L2 of the contact region of the rotor bearing 39F with the pinion gear 41. In FIG. 17, the length L1 of the contact region of the rotor bearing 39F with the non-gear portion 33A is longer than the length L2 of the contact region of the rotor bearing 39F with the pinion gear 41. In addition, the rotor bearing 39F may be in contact with only the non-gear portion 33A of the rotor shaft 33 without being in contact with the pinion gear 41. The rotor bearing 39F may be in contact with only the pinion gear 41 of the rotor shaft 33 without being in contact with the non-gear portion 33A of the rotor shaft 33.

Fixing Structure of Housing and Motor

Figure 18:
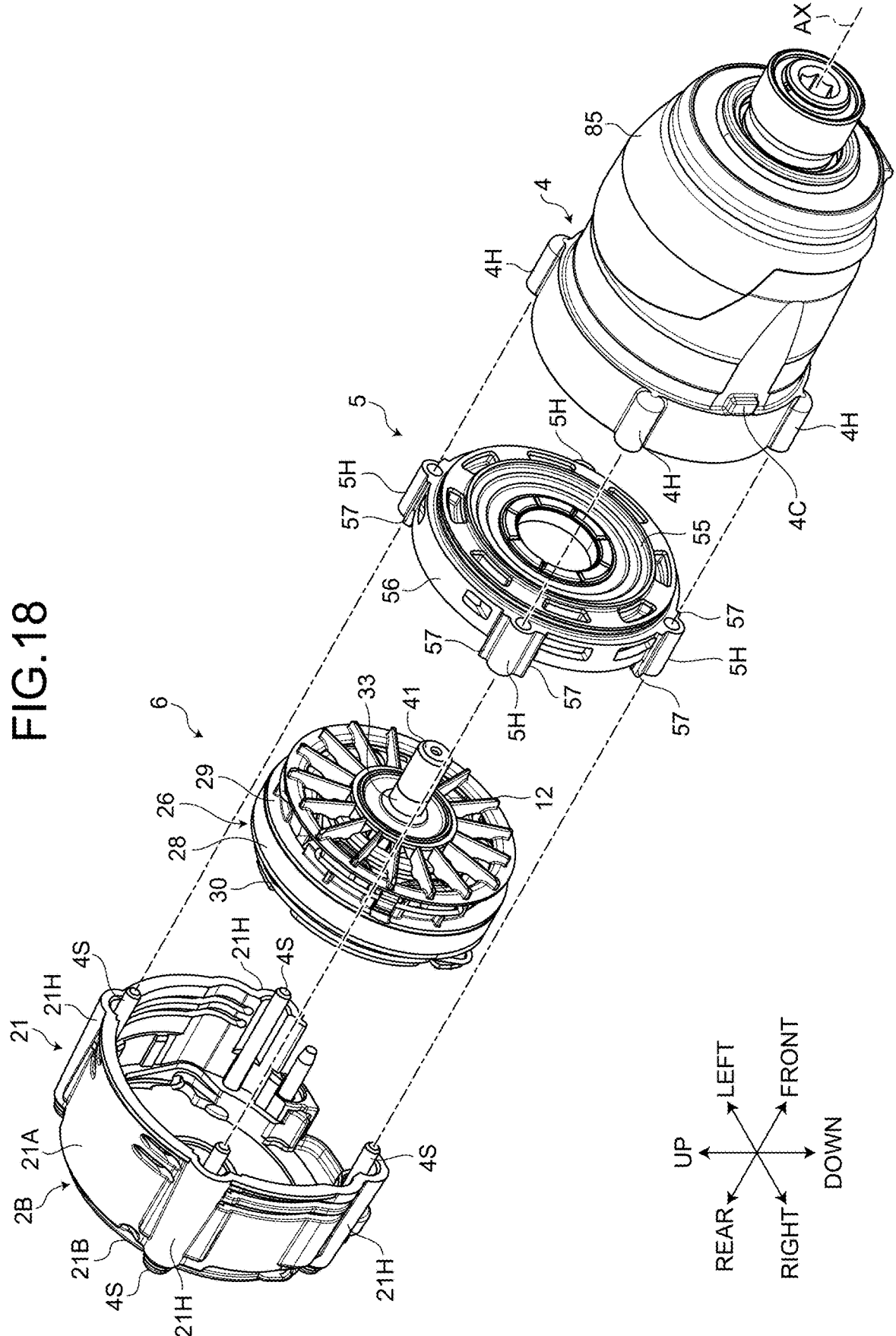
FIG. 18 is an exploded front perspective view illustrating the hammer case and a rear case of the embodiment as viewed from the front.
Figure 19:
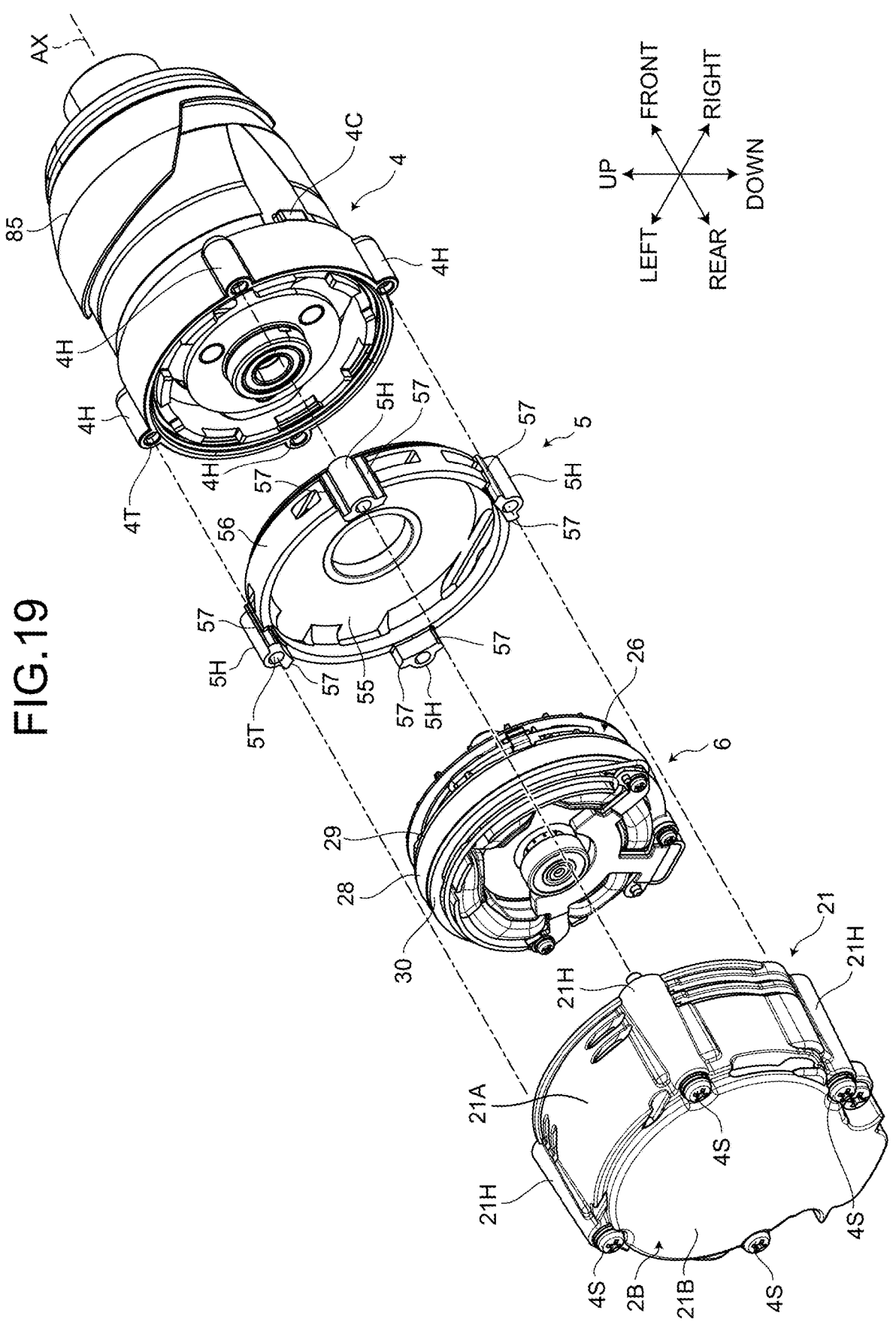
FIG. 19 is an exploded perspective view illustrating the hammer case and the rear case of the embodiment as viewed from the rear.
Figure 20:
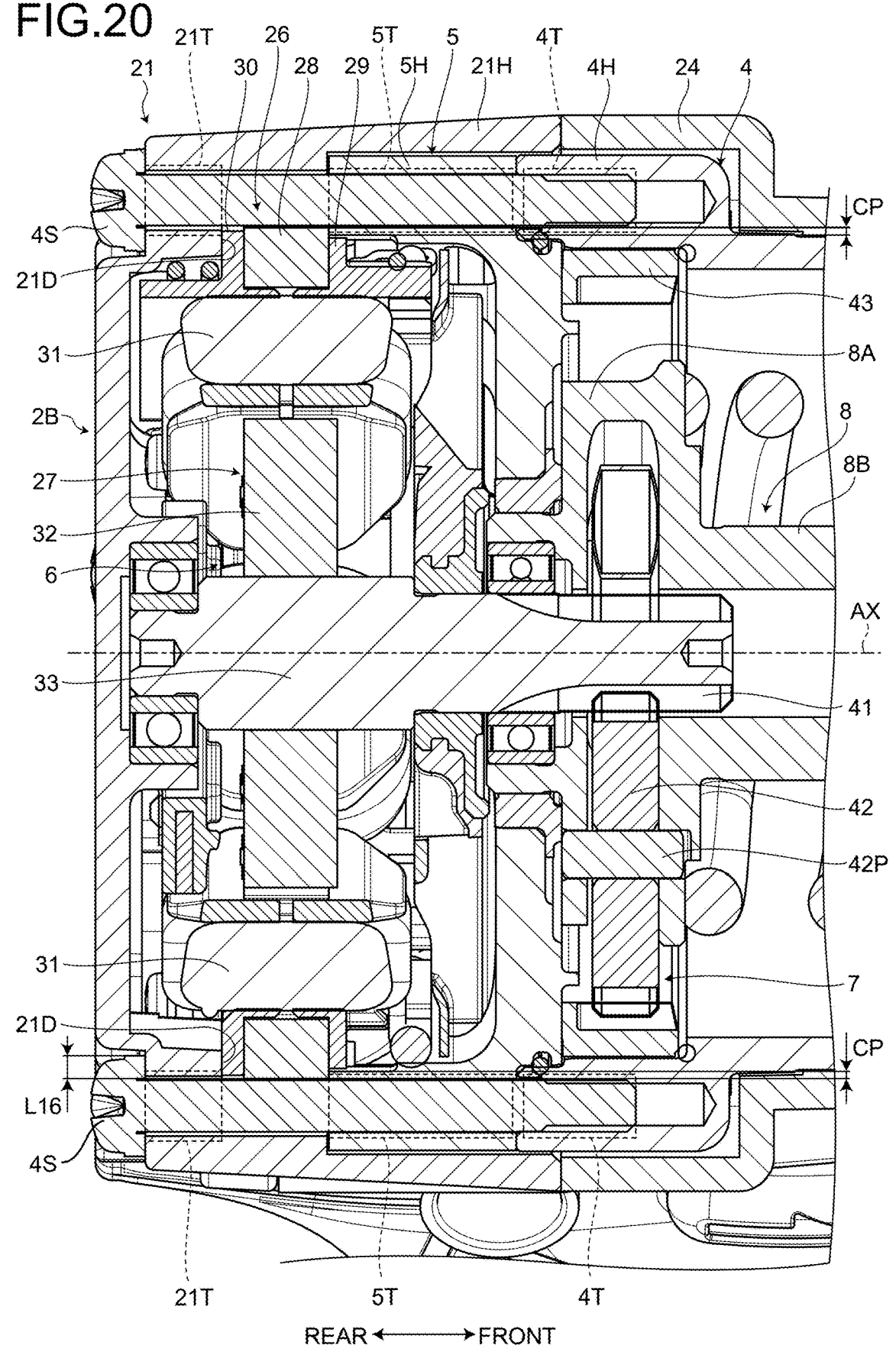
FIG. 20 is a cross-sectional view illustrating a cross section passing through a screw member connecting the hammer case and the rear case.
Figure 21:
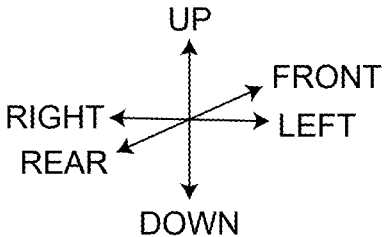
FIG. 21 is a perspective view illustrating the rear case of the embodiment as viewed from the front.
Figure 22:
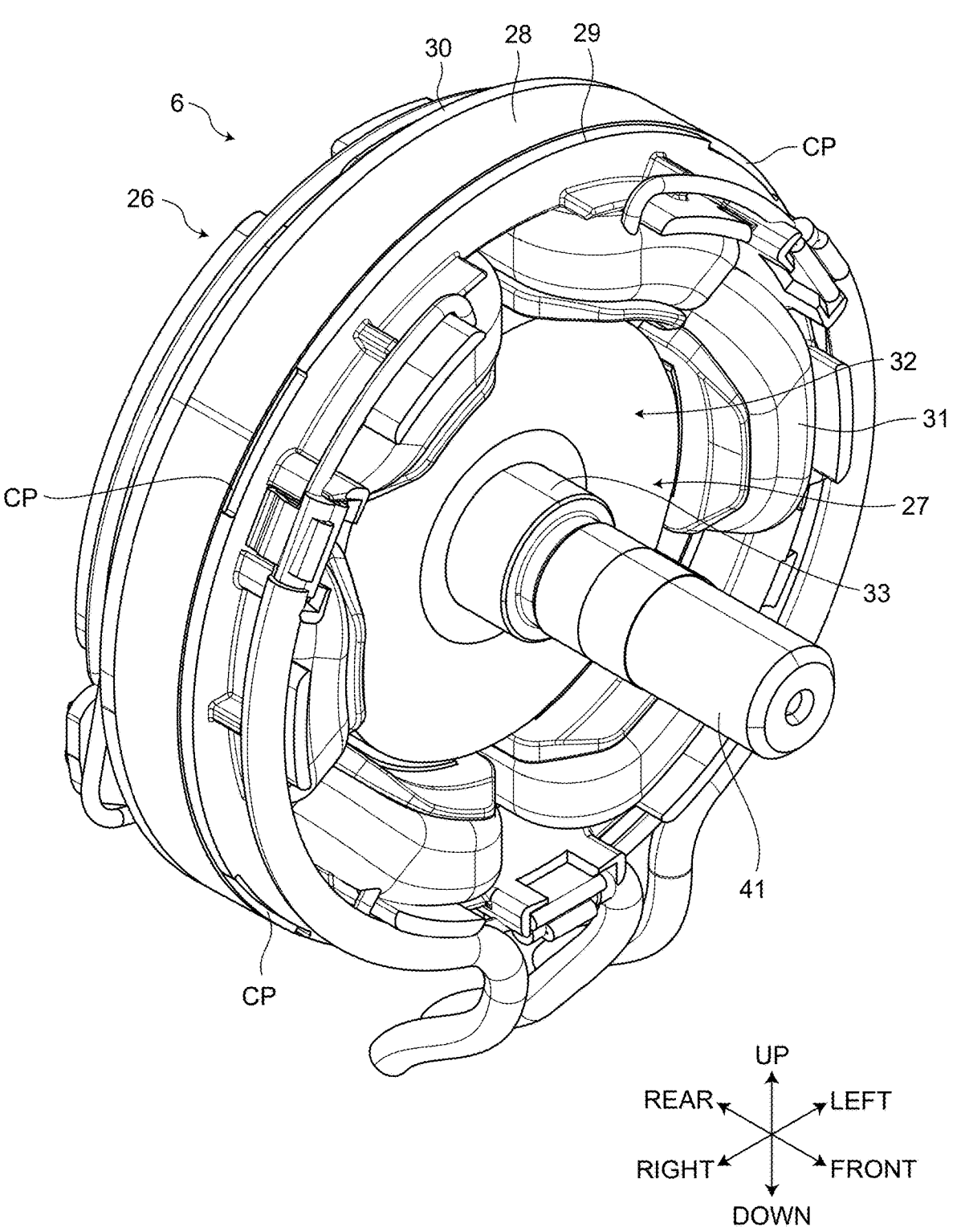
FIG. 22 is a perspective view illustrating a motor of the embodiment as viewed from the front.
Figure 23:
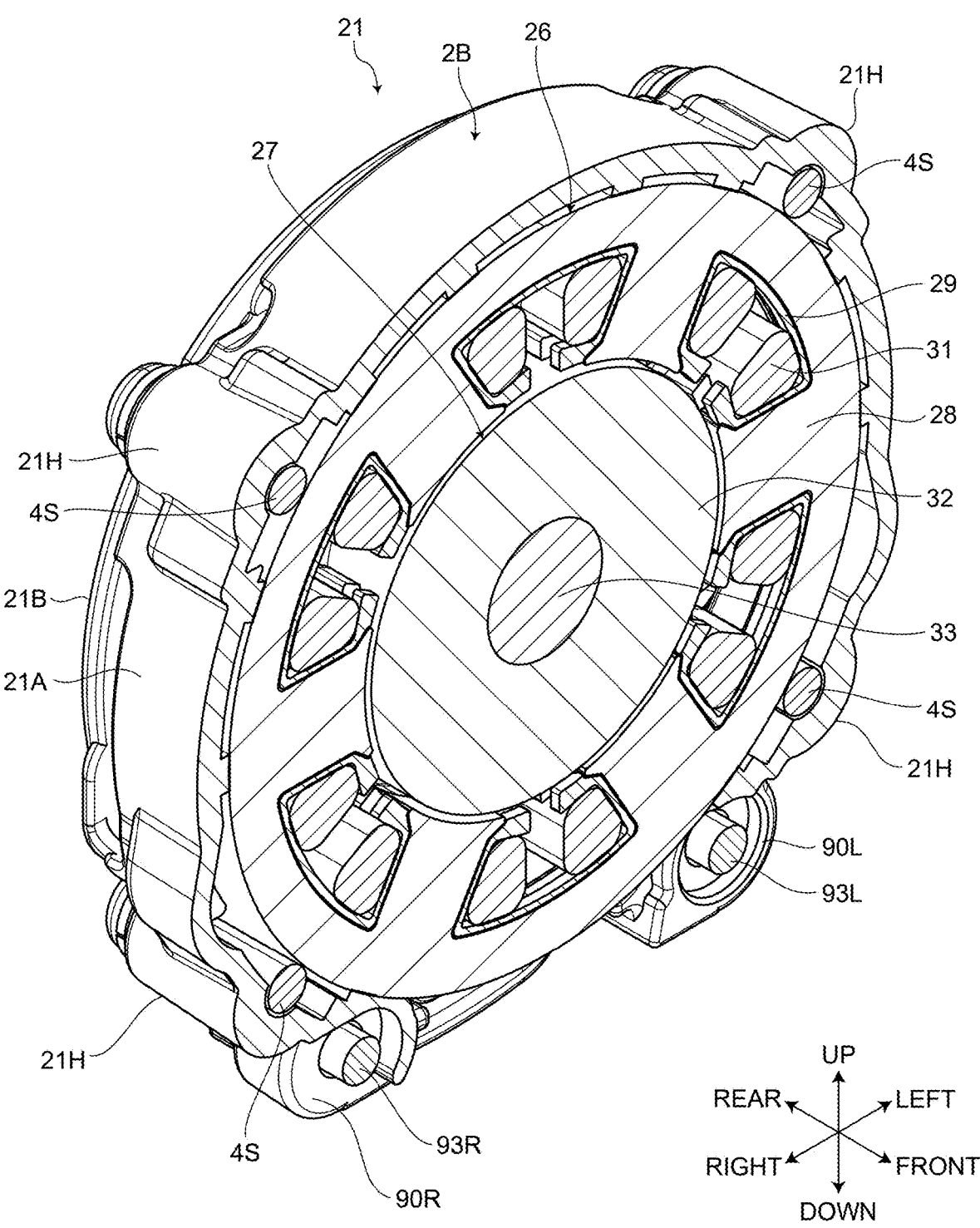
FIG. 23 is a perspective cross-sectional view illustrating a cross section passing through a stator core.

FIG. 18 is an exploded front perspective view illustrating the hammer case 4 and the rear case 2B of the embodiment as viewed from the front. FIG. 19 is an exploded rear perspective view illustrating the hammer case 4 and the rear case 2B of the embodiment as viewed from the rear. FIG. 20 is a cross-sectional view illustrating a cross section passing through screw members 4S connecting the hammer case 4 and the rear case 2B. Note that FIG. 20 is a cross-sectional view taken along line XX-XX of FIG. 13. FIG. 21 is a front perspective view illustrating the rear case 2B of the embodiment. FIG. 22 is a perspective view illustrating the motor 6 of the embodiment as viewed from the front. FIG. 23 is a perspective cross-sectional view illustrating a cross section passing through the stator core 28.

In the embodiment, at least a part of the motor 6 is fixed to the motor housing 21 and the hammer case 4 by the screw members 4S. In the embodiment, the motor housing 21 includes the rear case 2B. Therefore, at least a part of the motor 6 is fixed to the rear case 2B and the hammer case 4.

The screw members 4S extend in the axial direction along the rotation axis AX. That is, the screwing direction of each of the screw members 4S is a direction parallel to the rotation axis AX. The screw members 4S reach the hammer case 4 from the rear side of the motor housing 21. The screw members 4S fix the motor housing 21 and the hammer case 4 to each other. The plurality of screw members 4S is arranged in a manner to surround the motor 6 in the rotation direction. In the embodiment, four screw members 4S are provided at intervals in the rotation direction. Such four screw members 4S are respectively arranged at four positions corresponding to four corners of an upper right part, an upper left part, a lower right part, and a lower left part of the motor 6.

Screw insertion holes 21T (see FIG. 20) are formed on the outer circumference of the rear surface portion 21B of the motor housing 21. The motor housing 21 has the boss portions 21H in which the screw insertion holes 21T, through which the screw members 4S are inserted, are formed. Four boss portions 21H and four screw insertion holes 21T are formed at intervals in the rotation direction. The boss portions 21H are formed on the circumferential surface portion 21A of the motor housing 21 in a manner to cover the outer side of the screw member 4S. Each of the boss portions 21H has a semi-cylindrical shape obtained by dividing a cylinder in half.

In the motor 6, the stator 26 is fixed together with the motor housing 21 and the hammer case 4 by the screw members 4S. The outer circumferential portion of the stator 26 is clamped between the motor housing 21 and the hammer case 4 by the screw members 4S. In the embodiment, the stator core 28 is clamped between the motor housing 21 and the hammer case 4 by the screw members 4S. Furthermore, the insulator is clamped between the motor housing 21 and the hammer case 4 by the screw members 4S. Specifically, either the front insulator 29 or the rear insulator 30 is clamped between the motor housing 21 and the hammer case 4 by the screw members 4S. In the embodiment, the stator core 28 and the rear insulator 30 are fixed to the motor housing 21 and the hammer case 4 by the screw members 4S. The front insulator 29 is not fixed by the screw members 4S.

The outer circumferential surface of the stator core 28 and the outer circumferential surface of the rear insulator 30 are disposed at substantially the same position in the radial direction. At least a part of an outer circumferential portion of the rear surface of the stator core 28 is covered with an outer circumferential portion of the rear insulator 30. The outer circumferential surface of the front insulator 29 is disposed at a position on a radially inner side with respect to the outer circumferential surface of the stator core 28. At least a part of an outer circumferential portion of the front surface of the stator core 28 is located on an outer side of the outer circumferential surface of the front insulator 29 and is exposed from the front insulator 29.

The bearing holding member 5 has boss portions 5H through which the screw members 4S are inserted. The hammer case 4 has the boss portions 4H, in which screw holes to which the screw members 4S are attached, are formed. The screw members 4S respectively pass through the screw insertion holes 21T (see FIG. 20) of the motor housing 21 and the screw insertion holes 5T of the boss portions 5H of the bearing holding member 5 and respectively mesh with the screw holes 4T formed in the boss portions 4H of the hammer case 4. The bearing holding member 5 is fastened between the motor housing 21 and the hammer case 4 by the screw members 4S.

The boss portions 5H of the bearing holding member 5 extend in the axial direction. Each of the boss portions 5H has a cylindrical shape in which the corresponding screw insertion hole 5T is formed. As described above, the bearing holding member 5 includes the holding plate portion 55 that holds the rotor bearing 39F and the circumferential wall 56 rising from the outer circumference of the holding plate portion 55. The boss portions 5H are formed on the circumferential wall 56. The boss portions 5H protrude more rearward than the rear end surface of the circumferential wall 56 toward the stator core 28. Four boss portions 5H are provided at intervals in the rotation direction. Such four boss portions 5H are respectively arranged at four positions corresponding to four corners of an upper right part, an upper left part, a lower right part, and a lower left part of the bearing holding member 5. The axial dimension of the boss portions 5H is larger than the axial dimension of the circumferential wall 56. The bearing holding member 5 has ribs 57 protruding from each of the boss portions 5H in the circumferential direction of the stator 26 (namely, the circumferential direction of the circumferential wall 56). A pair of ribs 57 is formed in a manner to protrude from each of the boss portions 5H outward from both sides along the circumferential direction of the circumferential wall 56. The outer circumferential portion of the stator 26 is in contact with the end surfaces of the boss portions 5H and the end surfaces of the ribs 57. Specifically, the outer circumferential portion of the front surface of the stator core 28, which is on the outer side with respect to the front insulator 29, comes into contact with the rear end surfaces of the boss portions 5H and the ribs 57.

Four boss portions 4H of the hammer case 4 are provided at intervals in the rotation direction. Such four boss portions 4H are respectively arranged at four positions corresponding to four corners of an upper right part, an upper left part, a lower right part, and a lower left part of the hammer case 4. The boss portions 4H are provided at the rear end of the hammer case 4. As a result, the screw holes 4T to which the screw members 4S are respectively attached are formed at the rear end of the hammer case 4.

The inner diameter of the screw insertion holes 21T of the rear case 2B and the inner diameter of the screw insertion holes 5T of the boss portion 5H are larger than the outer diameter of screw portions of the screw members 4S. That is, the screw insertion holes 21T of the rear case 2B and the screw insertion holes 5T of the boss portion 5H do not mesh with the screw portions of the screw members 4S. The rear end surface of the hammer case 4 is in contact with the front end surface of the bearing holding member 5 in the front-rear direction. The rear end surface of the bearing holding member 5 is in contact with the front surface of the stator core 28. That is, the rear end surfaces of the boss portions 5H and the ribs 57 are in contact with the outer circumferential portion of the front surface of the stator core 28. The stator core 28 is in contact with the rear end surfaces of the boss portions 5H and the ribs 57 at a contact portion CP in FIG. 20. The outer circumferential portion of the rear surface of the stator core 28 is in contact with the outer circumferential portion of the front surface of the rear insulator 30. The outer circumferential portion of the rear surface of the rear insulator 30 is in contact with an inner surface of the motor housing 21 in the axial direction. The motor housing 21 has a support surface 21D that comes into contact with the rear insulator 30. The stator core 28, the rear insulator 30, and the bearing holding member 5 are clamped between the rear case 2B and the hammer case 4 by the fastening force of the screw members 4S. The outer circumferential portion of the stator 26 and the bearing holding member 5 are fixed by being clamped between the motor housing 21 and the hammer case 4.

As a result, the rear case 2B, the stator 26, and the bearing holding member 5 are fixed to the hammer case 4. As described above, in the embodiment, the rear case 2B, the motor 6, the hammer case 4, and the bearing holding member 5 are collectively fixed by the screw members 4S extending in the axial direction from the rear side of the rear case 2B. The outer circumferential portion of the stator 26 and the bearing holding member 5 are fixed by being clamped between the motor housing 21 and the hammer case 4. The outer circumferential portion of the stator 26 (the stator core 28 and the rear insulator 30) is clamped between the motor housing 21, the end surfaces of the boss portions 5H, and the end surfaces of the ribs 57.

The boss portions 5H also function as spacers that forms a space between the holding plate portion 55 and the motor 6. The motor 6 and the holding plate portion 55 are separated at a distance corresponding to the length of the boss portions 5H, and there is formed a space surrounded by the motor 6 and the bearing holding member 5. The fan 12 that rotates together with the rotor 27 is disposed in the space surrounded by the motor 6, the holding plate portion 55, and the circumferential wall 56. In addition, at least a part of the front insulator 29 is disposed in the space surrounded by the motor 6, the holding plate portion 55, and the circumferential wall 56.

The screw members 4S pass on a radially outer side of the outer circumferential surface of the stator core 28. The screw members 4S and the outer circumferential surface of the stator core 28 are not in contact with each other. The screw members 4S and the inner surfaces of the boss portions 21H of the motor housing 21 are not in contact with each other. When the screw member 4S is assembled to be inserted into the corresponding screw insertion hole 21T of the motor housing 21, the shaft portion of the screw member 4S can be easily inserted without being caught by the stator core 28 or a boss portion 21H.

Divided Structure of Housing

Figure 24:
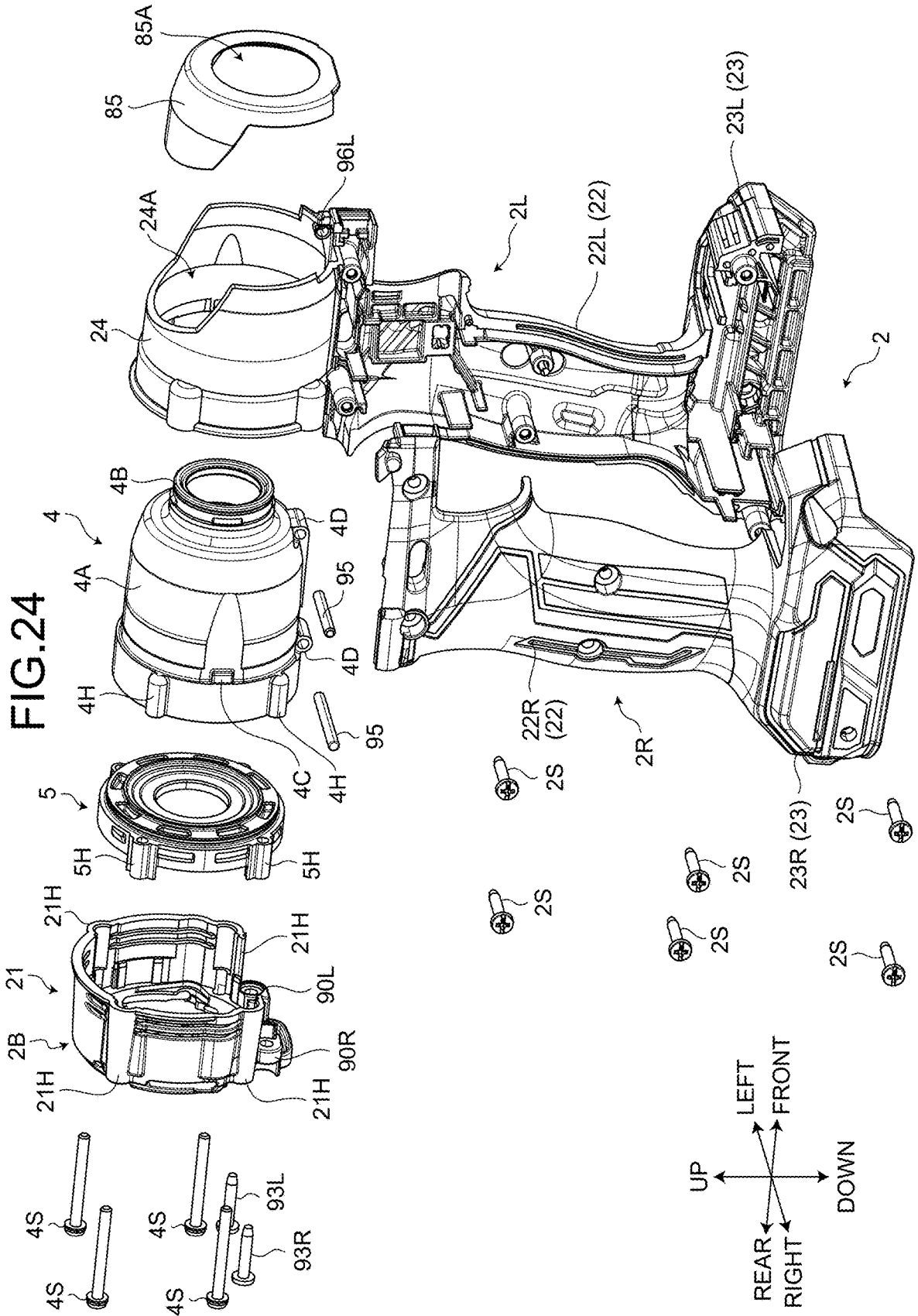
FIG. 24 is an exploded perspective view illustrating a housing of the embodiment.
Figure 25:
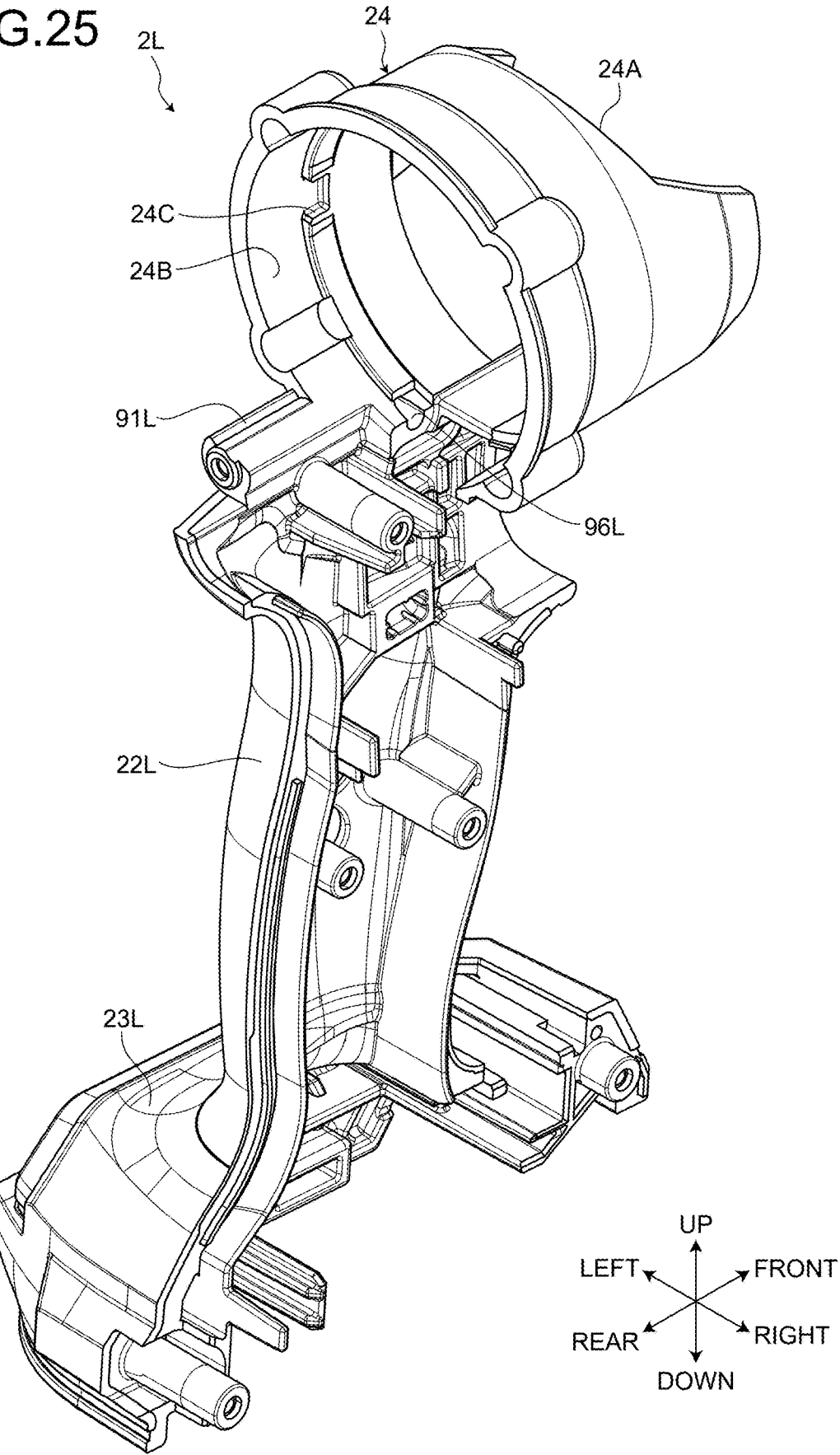
FIG. 25 is a perspective view illustrating a left housing of the embodiment.
Figure 26:
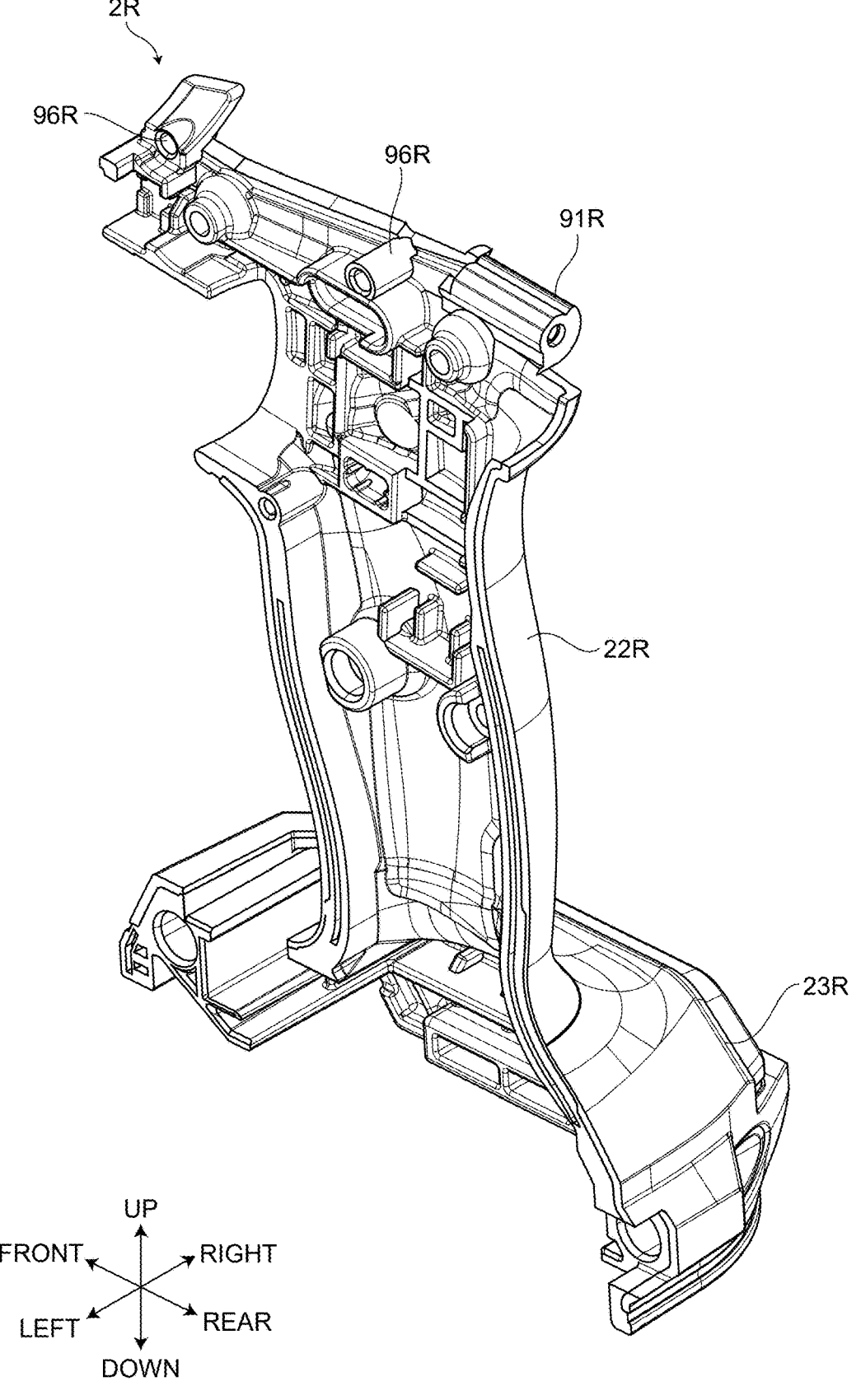
FIG. 26 is a perspective view illustrating a right housing of the embodiment.
Figure 27:
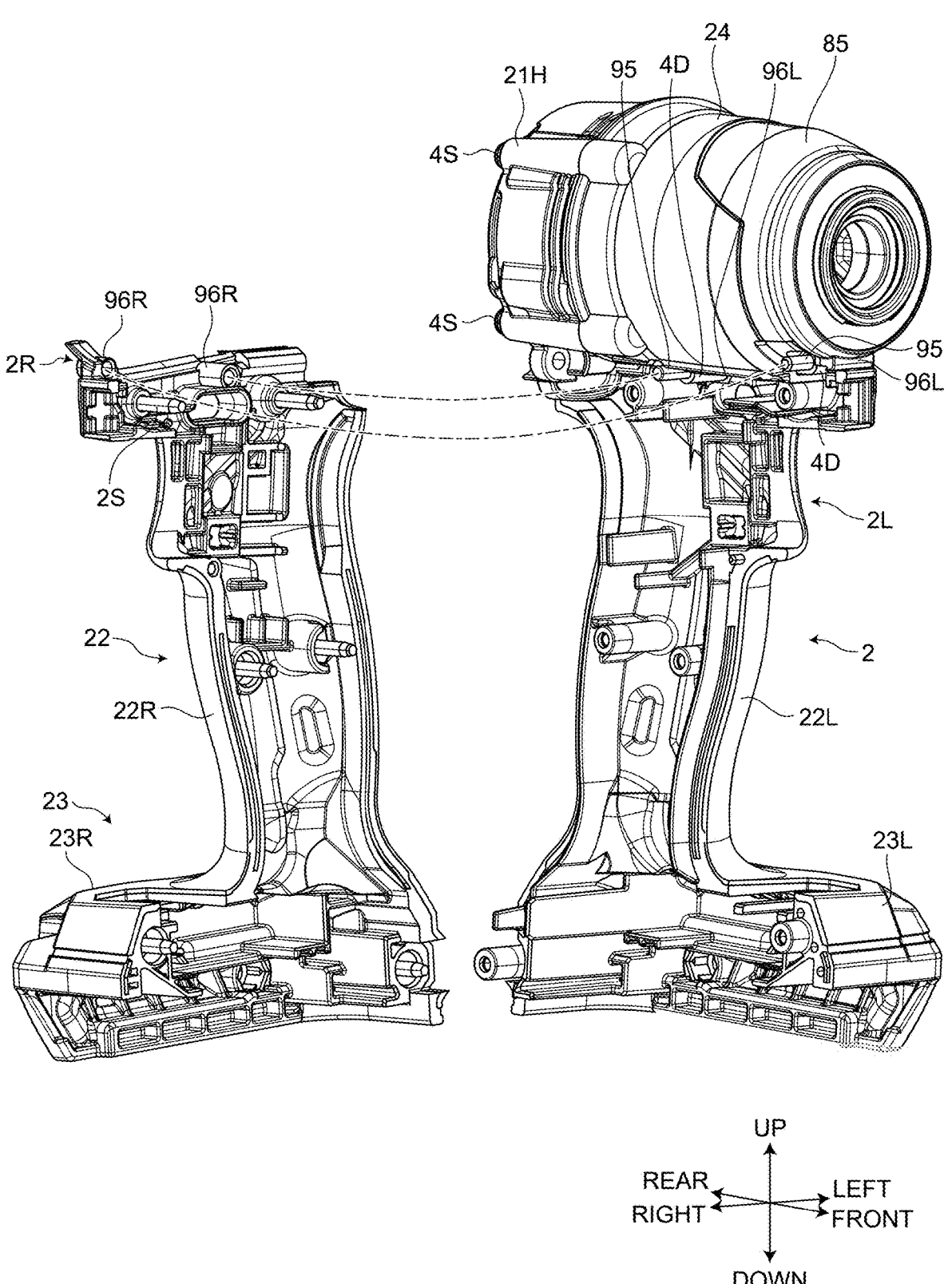
FIG. 27 is an exploded perspective view illustrating a connection portion between the left housing and the right housing.
Figure 28:
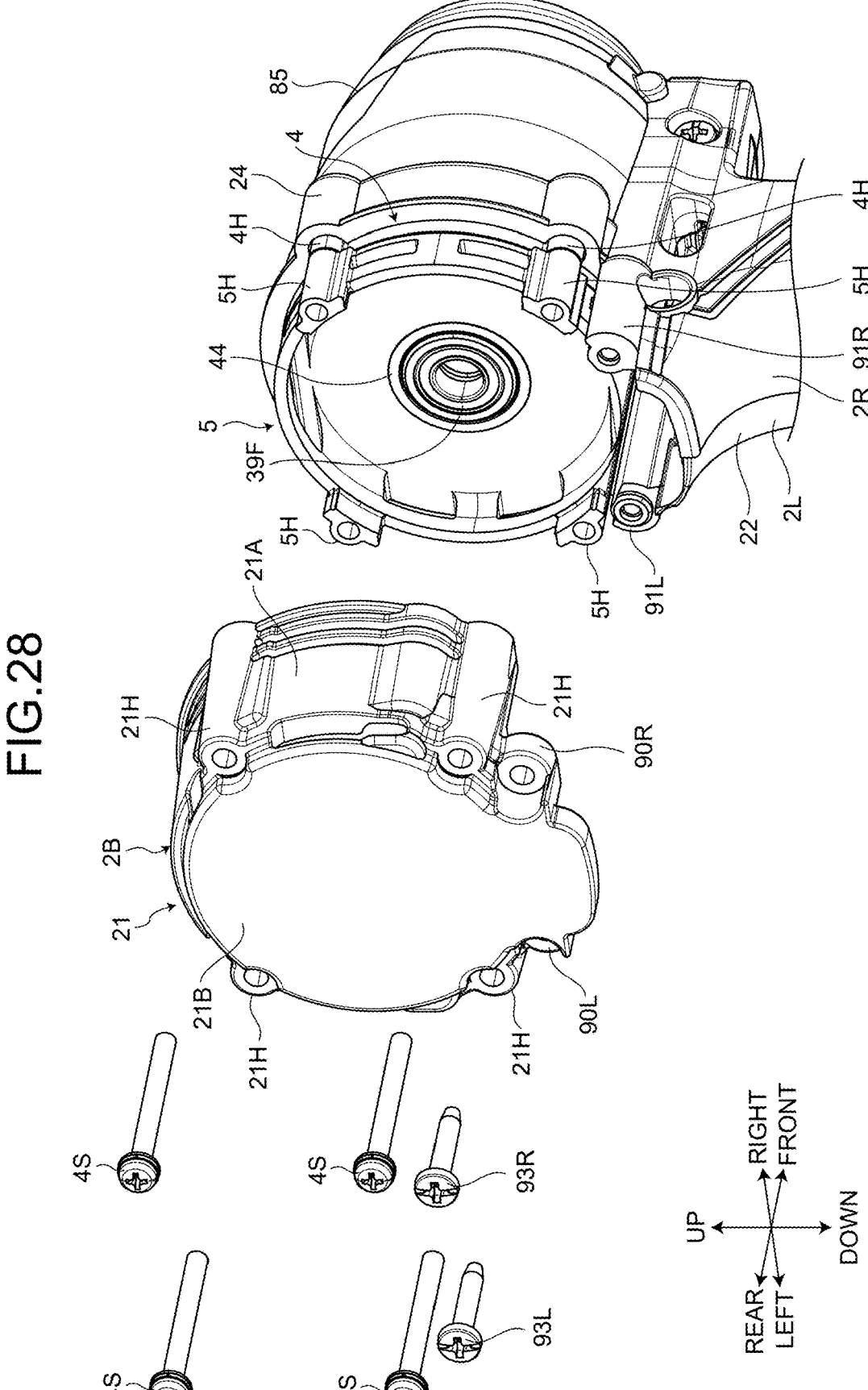
FIG. 28 is an exploded perspective view illustrating the rear case, the left housing, and the right housing of the embodiment.

FIG. 24 is an exploded perspective view illustrating the housing 2 of the embodiment. FIG. 25 is a perspective view illustrating the left housing 2L of the embodiment. FIG. 26 is a perspective view illustrating the right housing 2R of the embodiment. FIG. 27 is an exploded perspective view illustrating the connection portion between the left housing 2L and the right housing 2R. FIG. 28 is an exploded perspective view illustrating the rear case 2B, the left housing 2L, and the right housing 2R of the embodiment.

As described above, the housing 2 includes the left housing 2L and the right housing 2R that are divided (split) in the left-right direction intersecting the rotation axis AX. The grip portion 22 and the battery holder 23 are each divided (split) into left and right portions, which are respectively included in the left housing 2L and the right housing 2R. The left housing 2L has a left-side portion of the grip portion 22 and a left-side portion of the battery holder 23. The right housing 2R has a right-side portion of the grip portion 22 and a right-side portion of the battery holder 23.

Specifically, the grip portion 22 includes the left grip portion 22L and the right grip portion 22R divided in the left-right direction intersecting the rotation axis AX. The battery holder 23 includes a left battery holder 23L integrally formed with the left grip portion 22L and a right battery holder 23R integrally formed with the right grip portion 22R.

The left housing 2L and the right housing 2R are fixed to each other. The left housing 2L and the right housing 2R are connected by the screws 2S extending in the left-right direction at the grip portion 22 and the battery holder 23. The screws 2S pass through screw insertion holes of the right housing 2R from the right side of the right housing 2R and are attached to screw holes of the left housing 2L. The screw holes are holes in which female screws meshing with male screws are formed. For example, the screw 2S is a tapping screw, and a female screw is formed in a pilot hole by the screw 2S by fastening the screw 2S to the pilot hole formed in the left housing 2L. The screw insertion hole and the screw hole are provided at two positions near the upper end of the grip portion 22, two positions at a middle position of the grip portion 22 in the up-down direction, and two positions of the battery holder 23.

The cylindrical case holder 24 that covers the circumference of the hammer case 4 is integrally formed with either the left housing 2L or the right housing 2R such that the anvil (output portion) 10 protrudes forward. That is, the case holder 24 is integrally formed with either the left grip portion 22L or the right grip portion 22R. In the embodiment, the case holder 24 is formed in the left housing 2L (left grip portion 22L). The case holder 24 may be formed in the right housing 2R (right grip portion 22R).

The case holder 24 does not have a left-right split structure, and the entire cylindrical shape is integrally formed with the left housing 2L. The case holder 24 is not formed in the right housing 2R. That is, the left housing 2L (left grip portion 22L) and the right housing 2R (right grip portion 22R) have the left-right split structure, whereas the case holder 24 has a non-split structure and is formed on either the left side or the right side. The case holder 24 is connected to an upper end of the grip portion 22. A lower end of the case holder 24 is continuous with the upper end of the left grip portion 22L of the grip portion 22.

Therefore, the left housing 2L includes the case holder 24, the left grip portion 22L of the grip portion 22, and the left battery holder 23L of the battery holder 23. The case holder 24, the left grip portion 22L of the grip portion 22, and the left battery holder 23L of the battery holder 23 are integrally formed with the left housing 2L. The right housing 2R includes the right grip portion 22R of the grip portion 22 and the right battery holder 23R of the battery holder 23. The right grip portion 22R of the grip portion 22 and the right battery holder 23R of the battery holder 23 are integrally formed with the right housing 2R.

The trigger lever 14 is provided on the front side of the grip portion 22. The forward/reverse switching lever 15 is provided above the grip portion 22. The grip portion 22 having the left-right split structure facilitates assembly and wiring processing of the trigger lever 14 and the forward/reverse switching lever 15.

The rear case 2B is disposed over the left housing 2L and the right housing 2R. The rear case 2B is connected to each of the left housing 2L and the right housing 2R by screws 93L and 93R. The circumferential surface portion 21A of the rear case 2B does not have a perfect cylindrical shape but has an arc shape in which a lower portion is cut out. The left end of the arc-shaped circumferential surface portion 21A is connected with the upper end of the left housing 2L, and the right end of the arc-shaped circumferential surface portion 21A is connected with the upper end of the right housing 2R.

Two boss portions 90L and 90R through which the screws 93L and 93R are inserted in the front-rear direction are provided to a lower portion of the rear surface portion 21B of the rear case 2B. The boss portion 90L is disposed on the left side of the lower portion of the rear surface portion 21B and faces the boss portion 91L of the left housing 2L in the front-rear direction. The boss portion 91L is provided at the upper end of the left grip portion 22L. The other boss portion 90R is disposed on the right side of the lower portion of the rear surface portion 21B and faces the boss portion 91R of the right housing 2R in the front-rear direction. The boss portion 91R is provided at the upper end of the right grip portion 22R. A screw hole is formed in each of the boss portion 91L and the boss portion 91R. The screws 93L and 93R that have passed through the boss portions 90L and 90R are attached to the boss portions 91L and 91R, respectively.

In this manner, the rear case 2B is connected to the left housing 2L by the screw 93L at the upper end of the left-side portion of the grip portion 22. The rear case 2B is connected with the right housing 2R by the screw 93R at the upper end of the right-side portion of the grip portion 22. As a result, the motor housing 21 formed in the rear case 2B is connected to the upper end of the left grip portion 22L and the upper end of the right grip portion 22R by the screws 93L and 93R.

The case holder 24 has a front opening 24A and a rear opening 24B. The case holder 24 holds the outer circumference of the hammer case 4 with the hammer case 4 inserted from the rear opening 24B toward the front opening 24A. On the inner circumferential surface of the case holder 24, recesses 24C to be engaged with protrusions 4C provided on the outer circumferential surface of the hammer case 4 are formed. The protrusions 4C are formed at a plurality of places in the circumferential direction of the hammer case 4. The recesses 24C of the case holder 24 are formed at a plurality of places in the circumferential direction of the case holder 24 in a manner to correspond to the protrusions 4C. With the protrusions 4C and the recesses 24C engaged with each other, the hammer case 4 and the case holder 24 are engaged with each other in the rotation direction, and positional deviation of the hammer case 4 in the rotation direction is suppressed.

As described above, the rear case 2B is connected to the rear portion of the hammer case 4 by the screws (screw members 4S) extending in the axial direction along the rotation axis AX. The rear case 2B is fixed to the hammer case 4 together with the bearing holding member 5 by the four screw members 4S.

The hammer case 4 is fixed to the housing 2 via connection members 95. The hammer case 4 is connected to the left grip portion 22L and the right grip portion 22R via the connection members 95 extending in the left-right direction. In the embodiment, the connection members 95 are cylindrical pin members. The connection members 95 are made of metal.

Connection boss portions 4D, through which connection members 95 extending in the left-right direction are inserted, are provided on the outer circumference of the hammer case 4. One (first) connection boss portion 4D (first connection boss portion) is provided at a front portion of the lower surface of the hammer case 4, and another one (second) connection boss portion 4D is provided at a rear portion of the lower surface of the hammer case 4. Each of the connection boss portions 4D has a through hole in the left-right direction through which the corresponding connection member 95 is inserted. A first end and a second end of each of the connection members 95 inserted through the corresponding connection boss portion 4D protrude to the left side and the right side of the connection boss portion 4D, respectively. One (first) connection boss portion 4D and one (first) connection member 95 are arranged at the front portion of the hammer case 4, and another one (second) connection boss portion 4D and another one (second) connection member 95 are arranged at the rear portion of the hammer case 4.

The first end and the second end of each of the connection members 95 inserted into the corresponding connection boss portion 4D are connected to the left grip portion 22L and the right grip portion 22R, respectively. The left housing 2L has left-side support portions 96L. Each of the left-side support portions 96L supports the first end of the corresponding connection member 95 inserted into the corresponding connection boss portion 4D. The left-side support portion 96L is a cylindrical portion that receive the corresponding connection member 95. Two left-side support portions 96L are provided to the left housing 2L corresponding to the two connection members 95. The left-side support portions 96L are provided at an upper portion of the left grip portion 22L. The right housing 2R has right-side support portions 96R. Each of the right-side support portions 96R supports the second end of the corresponding connection member 95 inserted into the corresponding connection boss portion 4D. The right-side support portion 96R is a cylindrical portion that receives the corresponding connection member 95. Two right-side support portions 96R are provided to the right housing 2R corresponding to the two connection members 95. The right-side support portions 96R are provided at an upper portion of the right grip portion 22R. Therefore, the left housing 2L and the right housing 2R are connected to the hammer case 4 via the connection members 95 extending in the left-right direction.

In this manner, the outer circumference of the hammer case 4 is held by the case holder 24 surrounding the circumference of the hammer case 4. The rear end of the hammer case 4 is held by the rear case 2B connected by four screw members 4S. The lower portion of the hammer case 4 is held by the left housing 2L and the right housing 2R connected by the two connection members 95. The case holder 24 prevents positional displacement of the hammer case 4 in the radial direction and the rotation direction with respect to the housing 2. The two connection members 95 prevent positional displacement of the hammer case 4 in the front-rear direction with respect to the housing 2. The two connection members 95 and two connection boss portions 4D prevent positional displacement of the hammer case 4 in the rotation direction with respect to the housing 2.

Since the case holder 24 does not have a half-split structure, it is not necessary to arrange screws in the left-right direction between the hammer case 4 and the motor 6. Since the components such as the motor 6, the bearing holding member 5, the speed reducing mechanism 7, and the impacting mechanism 9 are arranged in the axial direction, it is necessary to increase the distance in the axial direction between the components to secure a space for passing the screws in order to arrange the screws in the left-right direction. As a result, in a case where the space through which the screws pass is secured, the axial dimensions of installation spaces of the components may increase. In the embodiment, since it is not necessary to arrange screws in the left-right direction between the hammer case 4 and the motor 6, the axial dimensions of the installation spaces of the components are reduced accordingly.

In addition, at the time of assembly, the components such as the motor 6 and the fan 12 are stacked in the rear case 2B in the axial direction, the rotation mechanism 3 is housed in the hammer case 4, the bearing holding member 5 is fitted to the rear portion of the hammer case 4, and the rear case 2B and the hammer case 4 are coupled by the screw members 4S. The sub assembly of the rear case 2B and the hammer case 4 is inserted into the case holder 24 from the rear. As a result, the upper portion of the power tool 1 can be assembled. In a case where the case holder 24 has a left-right split structure, the case holder 24 is assembled in the left-right direction between the rear case 2B and the hammer case 4 in which the components are arranged in the axial direction, and thus the direction of the assembly work is changed by 90 degrees. In the embodiment, since the assembly work can be throughout performed in the same direction (axial direction), the assembling workability is improved.

Dimensions and Specifications of Power Tool

Figure 29:
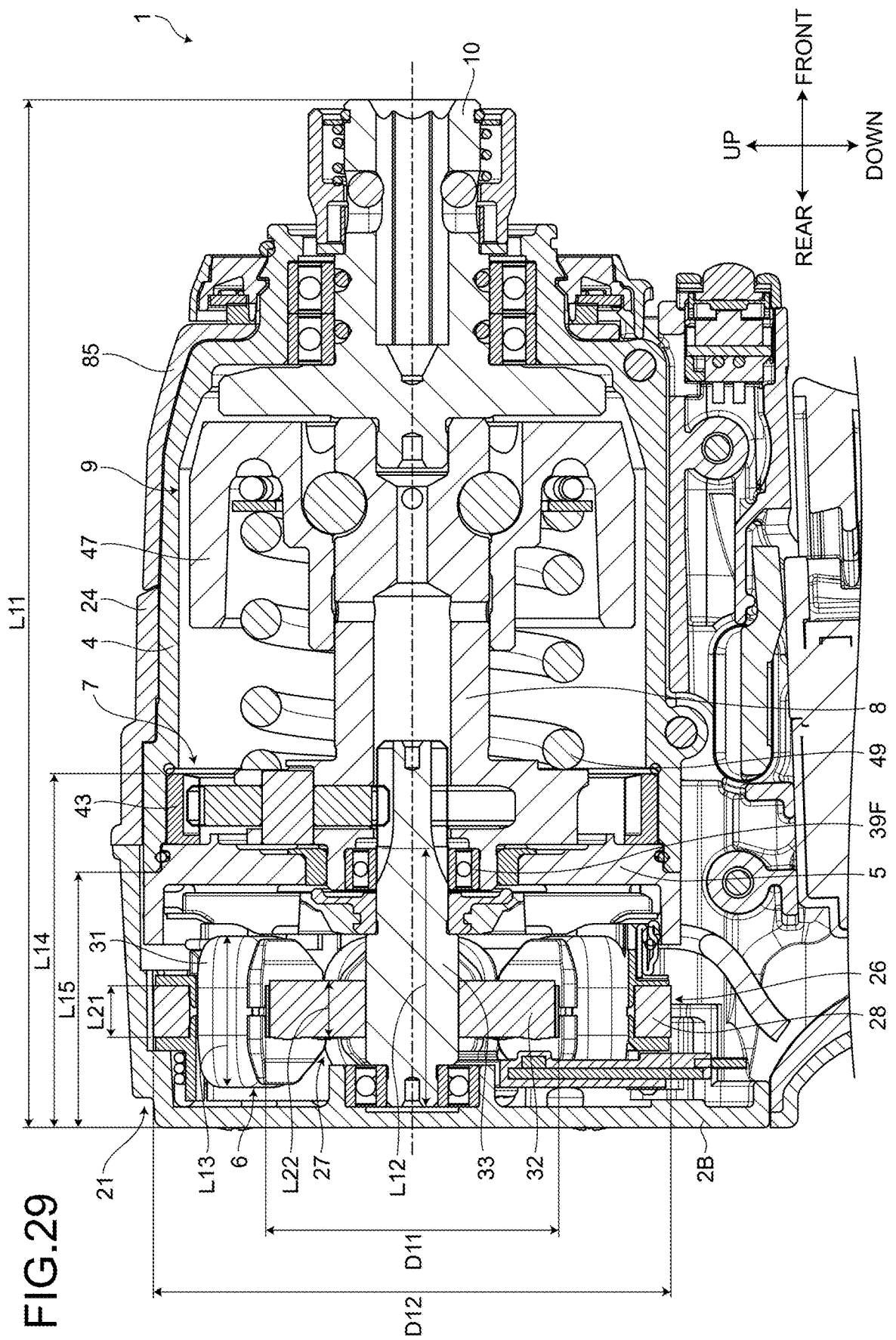
FIG. 29 is a longitudinal sectional view for explaining dimensions of each part of the power tool of the embodiment.

Next, an example of dimensions and specifications of each part of the power tool 1 will be described. FIG. 29 is a longitudinal sectional view for explaining dimensions of each part of the power tool 1 of the embodiment. FIG. 29 illustrates a longitudinal cross section of the upper portion of the power tool 1 similarly to FIG. 4.

As illustrated in FIG. 29, the power tool 1 of the embodiment has a head total length L11. The head total length L11 is a distance in the front-rear direction between the tip of the anvil 10 and the rear surface of the upper portion of the power tool 1 (the rear surface of the rear case 2B). The head total length L11 is, for example, equal to or less than 115 mm, preferably equal to or less than 110 mm, and more preferably equal to or less than 105 mm. In the example illustrated in the embodiment, the head total length L11 is 102.9 mm.

The maximum fastening torque of the power tool 1 is, for example, equal to or greater than 225 N·m, preferably equal to or greater than 230 N·m, and more preferably, equal to or greater than 235 N·m. The maximum fastening torque refers to the torque when a fastening member is tightened and generally refers to the torque measured using a further fastening (tightening) torque method with respect to a fastening member to be fastened (tightened) after it has been fastened (tightened). The further fastening (tightening) torque method is a method of further fastening a fastening member after it has been fastened, and measuring the torque when the fastening member starts to rotate again. It is noted that it is not a method in which measuring is performed by loosening a nut or a bolt. In the example shown in the embodiment, the maximum fastening torque is 230 N·m.

The power tool 1 has a motor bearing distance L12. The motor bearing distance L12 refers to a distance in the front-rear direction between the rear surface of the rotor shaft 33 and the front surface of the rotor bearing 39F. The motor bearing distance L12 is, for example, equal to or less than 35 mm, preferably equal to or less than 30 mm, and more preferably equal to or less than 25 mm. In the example illustrated in the embodiment, the motor bearing distance L12 is 27.95 mm.

The power tool 1 has a motor thickness (motor stack thickness) L13. The motor thickness L13 is a distance in the front-rear direction between the foremost surface and the rearmost surface of the motor 6 excluding the rotor shaft 33. The motor thickness L13 is, for example, equal to or less than 22 mm, preferably equal to or less than 20 mm, and more preferably equal to or less than 18 mm. In the example illustrated in the embodiment, the motor thickness L13 is 17.6 mm.

A stator stacking thickness L21 of the motor 6 is, for example, equal to or less than 10 mm, preferably equal to or less than 8 mm, and more preferably equal to or less than 6 mm. The stator stacking thickness L21 is a distance (thickness) between the front surface and the rear surface of the stator core 28. In the example illustrated in the embodiment, the stator stacking thickness L21 is 5.0 mm.

A rotor length L22 of the motor 6 is, for example, equal to or less than 12 mm, preferably equal to or less than 10 mm, and more preferably equal to or less than 8 mm. The rotor length L22 is a length between the front surface and the rear surface of the rotor core portion 32. In the example illustrated in the embodiment, the rotor length L22 is 5.5 mm.

In addition, a rotor core outer diameter D11 of the motor 6 is, for example, equal to or greater than 22 mm, preferably equal to or greater than 24 mm, and more preferably equal to or greater than 26 mm. The rotor core outer diameter D11 is the dimension of the outer diameter of the rotor core portion 32. In the example illustrated in the embodiment, the rotor core outer diameter D11 is 27.5 mm.

A stator outer diameter D12 of the motor 6 is, for example, equal to or greater than 45 mm, preferably equal to or greater than 47 mm, and more preferably equal to or greater than 49 mm. The stator outer diameter D12 is the outer diameter dimension of the stator 26 and is equal to the outer dimension of the stator core 28 in the embodiment. In the example illustrated in the embodiment, the stator outer diameter D12 is 50 mm.

A core inner diameter of the motor 6 is, for example, equal to or greater than 39 mm, preferably equal to or greater than 41 mm, and more preferably equal to or greater than 43 mm. The core inner diameter is an inner diameter dimension of a core portion of the stator core 28 excluding the teeth. In the example illustrated in the embodiment, the core inner diameter is 43 mm.

A teeth inner diameter of the motor 6 is, for example, equal to or greater than 22 mm, preferably equal to or greater than 25 mm, and more preferably equal to or greater than 28 mm. The teeth inner diameter is an inner diameter dimension of the teeth portion of the stator core 28. In the example illustrated in the embodiment, the teeth inner diameter is 28.5 mm.

In the example illustrated in the embodiment, the output shaft rotation speed of the power tool 1 is 3700 rpm at the maximum. In the example illustrated in the embodiment, the total length of the spindle 8 is 45.65 mm.

In the power tool 1, a distance L14 from the rear surface of the upper portion of the power tool 1 (the rear surface of the rear case 2B) to the front surface of the internal gear 43 is, for example, equal to or less than 42 mm, preferably equal to or less than 40 mm, and more preferably equal to or less than 38 mm. In the example illustrated in the embodiment, the distance L14 is 35.1 mm.

In the power tool 1, a distance L15 from the rear surface of the upper portion of the power tool 1 (the rear surface of the rear case 2B) to the rear end of the hammer case 4 is, for example, equal to or less than 35 mm, preferably equal to or less than 30 mm, and more preferably equal to or less than 25 mm. In the example illustrated in the embodiment, the distance L15 is 25.1 mm.

A gear outer diameter of the speed reducing mechanism 7 is, for example, equal to or greater than 47.5 mm, preferably equal to or greater than 47.75 mm, and more preferably equal to or greater than 48 mm. The gear outer diameter is an outer diameter dimension of the internal gear 43. In the example illustrated in the embodiment, the gear outer diameter is 47.5 mm. In the example illustrated in the embodiment, the gear ratio of the speed reducing mechanism 7 is 9.

The moment of inertia of the hammer 47 of the power tool 1 is, for example, equal to or greater than 34 Kg/mm², preferably equal to or greater than 35 Kg/mm², and more preferably equal to or greater than 36 Kg/mm². In the example illustrated in the embodiment, the moment of inertia of the hammer 47 is 34.1 Kg/mm². In the example illustrated in the embodiment, the outer diameter of the hammer 47 is 43 mm.

A hammer stroke amount of the power tool 1 is, for example, equal to or greater than 9 mm, preferably equal to or greater than 9.5 mm, and more preferably equal to or greater than 10 mm. The hammer stroke amount is a distance in the front-rear direction between the advancement limit position and the retraction limit position of the hammer 47. In the example illustrated in the embodiment, the hammer stroke amount is 9.11 mm.

A set load of the coil spring 49 of the power tool 1 is, for example, equal to or less than 115 N, preferably equal to or less than 110 N, and more preferably equal to or less than 105 N. The set load is the magnitude of the elastic force of the coil spring 49 when the hammer 47 is at the advancement limit position. Note that the set load is not a load required for assembling the coil spring 49. In the example illustrated in the embodiment, the set load is 120 N.

A full stroke load of the coil spring 49 of the power tool 1 is, for example, equal to or less than 480 N, preferably equal to or less than 470 N, and more preferably equal to or less than 460 N. The full stroke load is the magnitude of the elastic force of the coil spring 49 when the hammer 47 is at the retraction limit position. In the example illustrated in the embodiment, the full stroke load is 448 N.

The spring constant of the coil spring 49 is, for example, equal to or less than 36 N/mm, preferably equal to or less than 35 N/mm, and more preferably equal to or less than 34 N/mm. In a case where the spring constant varies within the range of the hammer stroke, the spring constant is defined as the minimum value within the range of the hammer stroke. In the example illustrated in the embodiment, the spring constant of the coil spring 49 is 36 N/mm.

In the example illustrated in the embodiment, the maximum number of times of impacts of the power tool 1 is 4600 (times/minute).

As illustrated in FIG. 20, in the embodiment, the outer circumferential surface of the stator core 28 overlaps the heads of the screw members 4S in the front-rear direction. The outer circumferential surface of the stator core 28 and the heads of the screw members 4S overlap each other in a range of a radial length L16 of the screw members 4S. That is, the length L16 is a distance between the outer circumferential portion of the stator core 28 and the outer circumferential surface of the head of a screw member 4S in the radial direction of the screw member 4S. The length L16 is, for example, equal to or greater than 0 mm, preferably equal to or greater than 0.5 mm, and more preferably equal to or greater than 1 mm. In the present specification, a case where the length L16=0, namely, a case where the outer circumferential surface of the stator core 28 and the outer circumferential surface of the head of a screw member 4S are in contact with each other at one point when viewed from the front-rear direction is also regarded as overlapping each other. In the example illustrated in the embodiment, the length L16 is 1.4 mm.

As described above, the embodiment discloses the impact driver in which the head total length L11 is equal to or less than 115 mm and the maximum fastening torque is equal to or greater than 225 N·m. In addition, the embodiment discloses the impact driver including a flattened rotor 27 having a length (rotor length L22) equal to or less than 10 mm and a diameter (rotor core outer diameter D11) equal to or greater than 25 mm. In addition, the embodiment discloses the impact driver including the flattened annular stator 26 having a length (stator stacking thickness L21) equal to or less than 10 mm and a diameter (stator outer diameter D12) equal to or greater than 45 mm.

Operation of Power Tool

Next, the operation of the power tool 1 will be described.

When performing screw fastening work on a work target, a tool accessory (driver bit) used for the screw fastening work is inserted into the tool hole 10A of the anvil 10. The tool accessory inserted into the tool hole 10A is held by the tool holding mechanism 11. After the tool accessory is attached to the anvil 10, an operator grips the grip portion 22 with, for example, the right hand to pull the trigger lever 14. When the trigger lever 14 is pulled, power is supplied from the battery pack 25 to the motor 6, the motor 6 is activated, and at the same time, the light assembly 18 is turned on. With the motor 6 started, the rotor shaft 33 of the rotor 27 rotates. When the rotor shaft 33 rotates, the rotational force of the rotor shaft 33 is transmitted to the planetary gears 42 via the pinion gear 41. The planetary gears 42 revolve around the pinion gear 41 while rotating in a state of being meshed with the internal teeth of the internal gear 43. The planetary gears 42 are rotatably supported by the spindle 8 via the respective pins 42P. Due to the revolution of the planetary gears 42, the spindle 8 rotates at a rotation speed lower than the rotation speed of the rotor shaft 33.

When the spindle 8 rotates in a state where the hammer 47 and the anvil protruding portion 10D are in contact with each other, the anvil 10 rotates together with the hammer 47 and the spindle 8. As the anvil 10 rotates, the screw fastening work proceeds. The rotational force of the spindle 8 is transmitted to the hammer 47 via the balls 48. In a case where the spindle 8 and the hammer 47 rotate together, the balls 48 are arranged on the front side of the respective spindle grooves 8D.

In a case where load torque equal to or greater than a predetermined value acts on the anvil 10 from a screw as screw fastening work proceeds, the rotation of the anvil 10 and the hammer 47 temporarily stops. The spindle 8 continues to be rotated by the motor 6. The spindle 8 continues to be rotated in the state in which the rotation of the hammer 47 has temporarily stopped, the hammer 47 moves rearward with respect to the spindle 8. That is, the balls 48 are caused to move rearward along the respective spindle grooves 8D, and the hammer 47 moves rearward as the balls 48 move.

When the hammer 47 moves rearward with respect to the spindle 8, the contact between the hammer 47 and the anvil protruding portions 10D is released. After the contact between the hammer 47 and the anvil protruding portions 10D is released, the hammer 47 moved rearward stops moving rearward by the forward biasing force of the coil spring 49. The stopped hammer 47 moves forward by the forward biasing force of the coil spring 49 while being rotated. When the hammer 47 moves forward with respect to the spindle 8, the balls 48 move forward along the respective spindle grooves 8D.

When the hammer 47 moves forward while rotating, the anvil 10 is impacted in the rotation direction by the hammer 47. As a result, the anvil 10 can be rotated about the rotation axis AX with higher torque. Therefore, the screw is fastened to the work target with higher torque.

Effects

As described above, in the embodiment, the power tool 1 includes: the motor 6; the rotation mechanism 3 disposed forward of the motor 6 and including the anvil (output portion) 10 that is rotated about the rotation axis AX by the motor 6; the hammer case (rotation mechanism case) 4 that houses at least a part of the rotation mechanism 3; the case holder 24 having a cylindrical shape and covering the circumference of the hammer case 4 such that the anvil 10 protrudes forward; and the grip portion 22 to be gripped by an operator. The grip portion 22 includes the left grip portion 22L and the right grip portion 22R that are divided in the left-right direction. The case holder 24 is integrally formed with either the left grip portion 22L or the right grip portion 22R.

In the above structure, the cylindrical case holder 24, which covers the circumference of the hammer case 4 such that the anvil 10 protrudes forward, is integrally formed with either the left grip portion 22L or the right grip portion 22R. As a result, in the assembly of the rotation mechanism 3, the motor 6 and the rotation mechanism 3 are assembled in the front-rear direction along the rotation axis AX, which can be directly assembled to the case holder 24 along the rotation axis AX. Further, since the grip portion 22 is divided in the left-right direction, assembly work can be easily performed in the left-right direction by arranging switches and wiring on either the left grip portion 22L or the right grip portion 22R and covering them with the other. Therefore, since high workability can be ensured in both the assembly of the rotation mechanism 3 and the assembly of the grip portion 22, the assembly workability of the power tool 1 can be improved.

In the embodiment, the power tool 1 includes the battery holder 23 which is connected to the grip portion 22 and to which the battery pack 25 is detachably attached. The battery holder 23 includes a left battery holder 23L integrally formed with the left grip portion 22L and a right battery holder 23R integrally formed with the right grip portion 22R.

In the above structure, since the left battery holder 23L is integrally formed with the left grip portion 22L and the right battery holder 23R is integrally formed with the right grip portion 22R, it is easy to perform wiring processing for connecting the switches of the grip portion 22 to the battery or a circuit. In addition, the number of parts and assembly man-hours are reduced as compared with a case where the grip portion 22 and the battery holder 23 are separately provided and connected by screws or the like.

In the embodiment, the power tool 1 includes a motor housing 21 that is disposed rearward of the hammer case (rotation mechanism case) 4 and houses the motor 6. The motor housing 21 is connected with the upper end of the left grip portion 22L and the upper end of the right grip portion 22R by screws 93L and 93R, respectively.

In the above structure, a portion that houses the motor 6 and the rotation mechanism 3 can be divided in the front-rear direction (axial direction) into the motor housing 21 and the case holder 24. This facilitates the assembly work of the motor 6 and the rotation mechanism 3. Since the motor housing 21 is connected to each of the left grip portion 22L and the right grip portion 22R divided into the left and right portions, the motor housing 21 is firmly fixed.

In the embodiment, the hammer case (rotation mechanism case) 4 is made of metal. The motor housing 21 is connected to the rear portion of the hammer case 4 by the screw members 4S extending in the axial direction along the rotation axis AX.

In the above structure, since the motor housing 21 is connected to the rear portion of the hammer case 4 made of metal, the motor housing 21 housing the motor 6 is easily and firmly fixed.

In the embodiment, the hammer case (rotation mechanism case) 4 is connected to the left grip portion 22L and the right grip portion 22R via the connection members 95 extending in the left-right direction.

In the above structure, since the hammer case 4 is not only housed in the case holder 24 but also connected to the left grip portion 22L and the right grip portion 22R, the hammer case 4, the case holder 24, and the grip portion 22 can be fixed to each other.

In the embodiment, the connection boss portions 4D, through which the connection members 95 are inserted, are provided on the outer circumference of the hammer case (rotation mechanism case) 4. The first end and the second end of each of the connection members 95 inserted into the corresponding connection boss portion 4D are connected to the left grip portion 22L and the right grip portion 22R, respectively.

In the above structure, since the connection boss portions 4D of the hammer case 4 are fixed to the left grip portion 22L and the right grip portion 22R via the connection members 95, it is possible to stably support the axial force and the rotational force about the rotation axis AX acting on the hammer case 4 when the power tool 1 is in use.

In the embodiment, the connection boss portions 4D includes two (first and second) connection boss portions, and the connection member 95 includes two (first and second) connection members. One (first) connection boss portion 4D and one (first) connection member 95 are arranged on a front portion of the rotation mechanism case, and another one (second) connection boss portion 4D and another one (second) connection member 95 are arranged on a rear portion of the rotation mechanism case (rotation mechanism case) 4.

In the above structure, since the front portion and the rear portion of the hammer case 4 are fixed to the left grip portion 22L and the right grip portion 22R, the hammer case 4 is more reliably held.

In the embodiment, the power tool 1 includes the trigger lever 14 provided on the front side of the grip portion 22 and operated to activate the motor 6.

In the above structure, for example, as compared with a case where the grip portion 22 has a front-rear divided structure, an operator can easily assemble the trigger lever 14 to the grip portion 22 of the left-right split structure.

In the embodiment, the power tool 1 includes the forward/reverse switching lever 15 provided on the grip portion 22 and operated to change the rotation direction of the motor 6.

In the above structure, for example, as compared with the case where the grip portion 22 has a front-rear divided structure, an operator can easily assemble the forward/reverse switching lever 15 to the grip portion 22 of the left-right split structure.

In the embodiment, the rotation mechanism 3 includes the hammer 47 rotated by the motor 6. The output portion is the anvil 10 that is impacted in the rotation direction by the hammer 47.

In the above structure, the power tool 1 is configured as an impact tool that generates a stronger fastening force by an impact by the hammer 47. With the hammer 47 provided, assembly workability is effectively improved in the impact tool in which the number of parts of the rotation mechanism 3 is likely to be increased and assembly man-hours are likely to be increased.

In the embodiment, the power tool 1 includes: the motor 6; the rotation mechanism 3 disposed forward of the motor 6 and including the anvil (output portion) 10 that is rotated about the rotation axis AX by the motor 6; the hammer case (rotation mechanism case) 4 that houses at least a part of the rotation mechanism 3; and the housing 2 to which the motor 6 and the hammer case 4 are assembled. The housing 2 includes the left housing 2L and the right housing 2R divided in the left-right direction intersecting the rotation axis AX. The case holder 24 is integrally formed with either the left housing 2L or the right housing 2R. The case holder 24 has a cylindrical shape and covers the circumference of the hammer case 4 such that the anvil 10 protrudes forward.

In the above structure, the cylindrical case holder 24, which covers the circumference of the hammer case 4 such that the anvil 10 protrudes forward, is integrally formed with either the left housing 2L or the right housing 2R. As a result, in the assembly of the rotation mechanism 3, the motor 6 and the rotation mechanism 3 are assembled in the front-rear direction along the rotation axis AX, which can be directly assembled to the case holder 24 along the rotation axis AX. Further, since the housing 2 is divided in the left-right direction in a portion other than the rotation mechanism 3, it is possible to easily perform assembly work in the left-right direction by arranging switches and wiring in either the left housing 2L or the right housing 2R and covering with the other. Therefore, since high workability can be ensured in both the assembly of the rotation mechanism 3 and assembly of parts other than those of the rotation mechanism 3, the assembly workability of the power tool 1 can be improved.

In the embodiment, the housing 2 includes: a grip portion 22 connected to the case holder 24; and a battery holder 23 connected to the grip portion 22 and to which the battery pack 25 is detachably attached. The left housing 2L has a left-side portion of the grip portion 22 and a left-side portion of the battery holder 23. The right housing 2R has a right-side portion of the grip portion 22 and a right-side portion of the battery holder 23.

In the above structure, since the grip portion 22 and the battery holder 23 can have the left-right split structure, an operator can easily assemble switches and perform wiring processing.

In the embodiment, the housing 2 includes the rear case 2B that houses the motor 6 and that is disposed rearward of the left housing 2L and the right housing 2R. The rear case 2B is connected to each of the left housing 2L and the right housing 2R by screws 93L and 93R, respectively.

In the above structure, the rear case 2B housing the motor 6 is provided separately from the left housing 2L and the right housing 2R that are divided into the left and right. Since the rear case 2B and the cylindrical case holder 24 can be arranged in the front-rear direction, an operator can easily assemble the motor 6 and the rotation mechanism 3.

In the embodiment, the rear case 2B is connected to the left housing 2L by the screw 93L at the upper end of the left-side portion of the grip portion 22 and is connected to the right housing 2R by the screw 93R at the upper end of the right-side portion of the grip portion 22.

In the above structure, since the rear case 2B is connected to each of the left housing 2L and the right housing 2R, the rear case 2B can be firmly fixed.

In the embodiment, the left housing 2L and the right housing 2R are connected to each other by the screws 2S extending in the left-right direction in the grip portion 22 and the battery holder 23.

In the above structure, the left housing 2L and the right housing 2R can be easily fixed.

In the embodiment, the hammer case (rotation mechanism case) 4 is made of metal. The rear case 2B is connected to the rear portion of the hammer case 4 by the screw members 4S extending in the axial direction along the rotation axis AX.

In the above structure, since the motor housing 21 is connected to the rear portion of the hammer case 4 made of metal, the motor housing 21 housing the motor 6 is easily and firmly fixed.

In the embodiment, the left housing 2L and the right housing 2R are connected to the hammer case (rotation mechanism case) 4 via the connection members 95 extending in the left-right direction.

In the above structure, since the hammer case 4 is not only housed in the case holder 24 but also connected to the left housing 2L and the right housing 2R, the hammer case 4 is firmly fixed to the housing 2.

In the embodiment, the connection boss portions 4D, through which the connection members 95 are inserted, are provided on the outer circumference of the hammer case (rotation mechanism case) 4. The left housing 2L has left-side support portions 96L each of which supports the first end of the corresponding connection member 95 inserted into the corresponding connection boss portion 4D. The right housing 2R has right-side support portions 96R each of which supports the second end of the corresponding connection member 95 inserted into the corresponding connection boss portion 4D.

In the above structure, the connection boss portions 4D of the hammer case 4 are held from the left and right sides by the left housing 2L and the right housing 2R. It is possible to more effectively support, by the housing 2, the axial force and the rotational force about the rotation axis AX acting on the hammer case 4 when the power tool 1 is in use.

In the embodiment, the power tool 1 includes the trigger lever 14 provided on the front side of the grip portion 22 and operated to activate the motor 6.

In the above structure, for example, as compared with a case where the housing 2 has a front-rear split structure, an operator can easily assemble the trigger lever 14 to the grip portion 22 of the left-right split structure.

In the embodiment, the power tool 1 includes the forward/reverse switching lever 15 provided on the grip portion 22 and operated to change the rotation direction of the motor 6.

In the above structure, for example, as compared with a case where the housing 2 has a front-rear split structure, an operator can easily assemble the forward/reverse switching lever 15 to the grip portion 22 of the left-right split structure.

OTHER EMBODIMENTS

Figure 30:
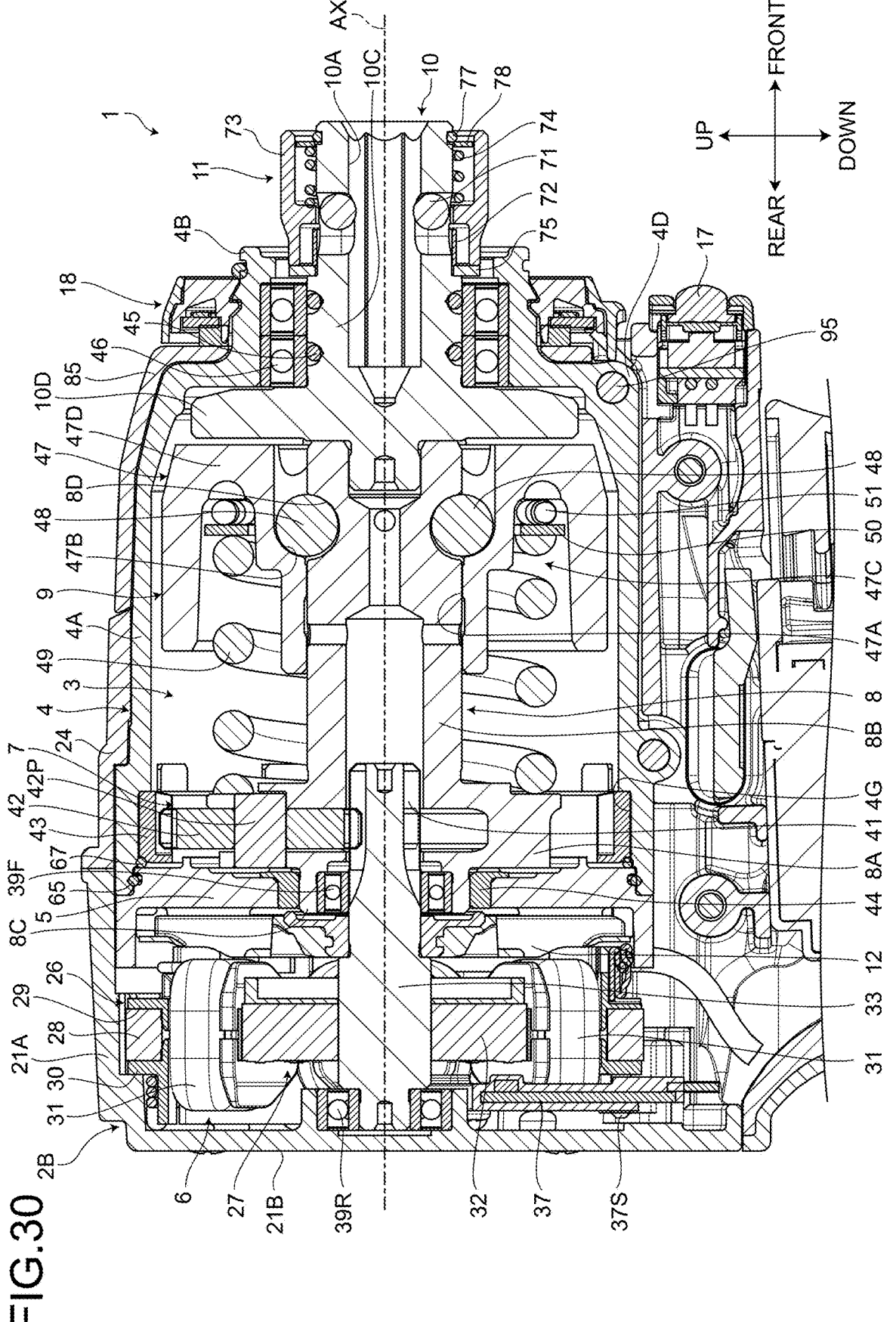
FIG. 30 is a longitudinal sectional view illustrating an upper portion of a power tool according to another embodiment.
Figure 31:
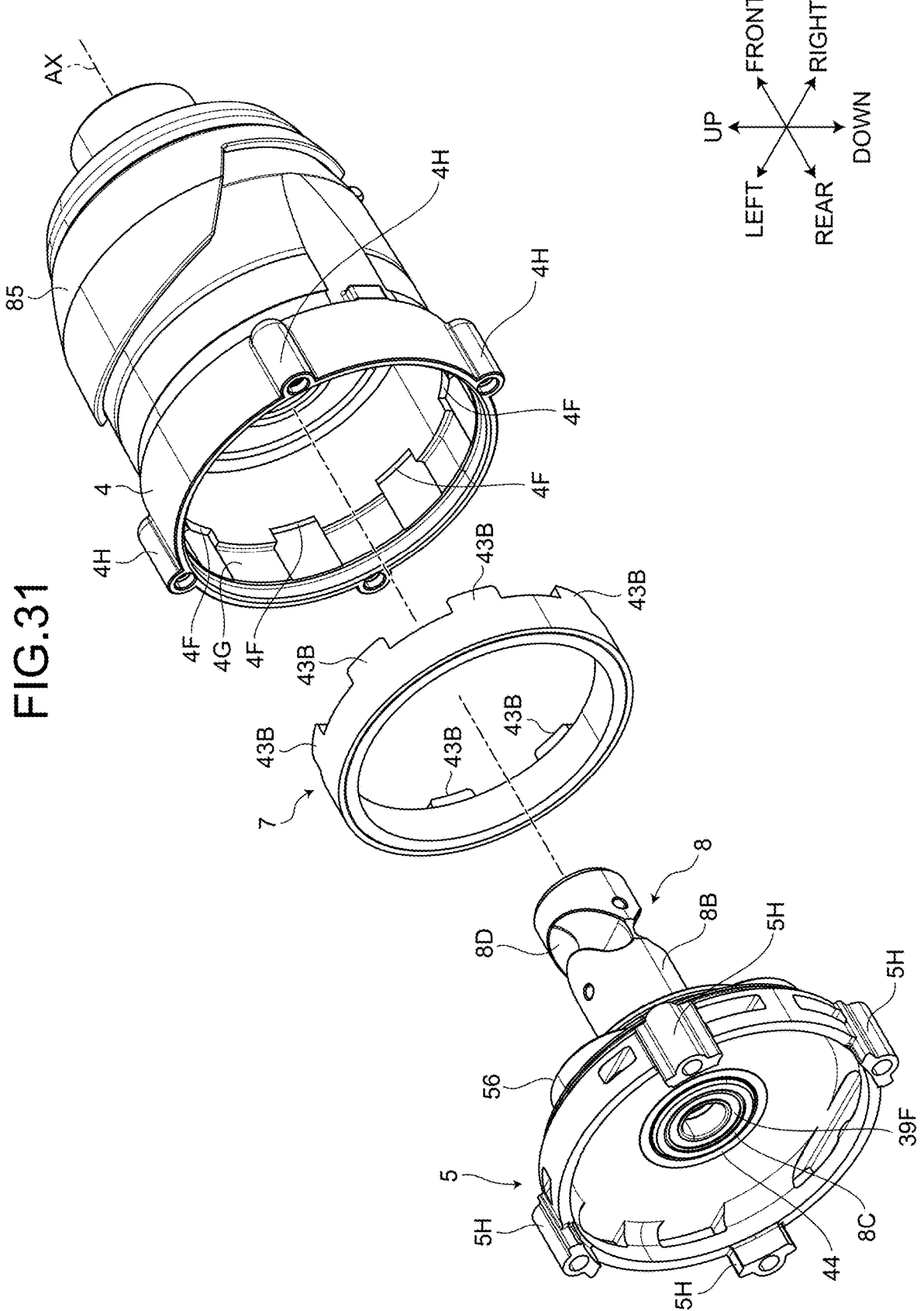
FIG. 31 is an exploded perspective view illustrating a bearing holding member, an internal gear, and a hammer case according to another embodiment as viewed from the rear.

In the above-described embodiment, the internal gear 43 is positioned and fixed in the rotation direction with the engagement protrusions 43A protruding rearward provided on the rear end surface of the internal gear 43 (see FIG. 12) and the engagement protrusions 43A fitted to the engagement recesses 55B of the bearing holding member 5. The internal gear 43 may be positioned and fixed in the rotation direction by engagement with the hammer case 4 instead of the bearing holding member 5. FIG. 30 is a longitudinal sectional view illustrating an upper portion of a power tool 1 according to another embodiment. FIG. 31 is an exploded perspective view illustrating a bearing holding member, an internal gear, and a hammer case according to the other embodiment as viewed from the rear.

In the example illustrated in FIGS. 30 and 31, an internal gear 43 is fitted to a first cylindrical portion 4A of a hammer case 4 from the rear. A stepped portion 4G in which the internal gear 43 is disposed is provided at a rear portion of the inner circumferential surface of the first cylindrical portion 4A. The stepped portion 4G is a step recessed radially outward on the inner circumferential surface of the first cylindrical portion 4A. As illustrated in FIG. 31, the internal gear 43 has engagement protrusions 43B protruding forward from the front end surface of the internal gear 43. Engagement recesses 4F to which engagement protrusions 43B are fitted are formed in the stepped portion 4G of the hammer case 4. The engagement protrusions 43B are formed at intervals in the circumferential direction of the internal gear 43. The engagement recesses 4F are formed at intervals in the circumferential direction of the hammer case 4. The engagement protrusions 43B and the engagement recesses 4F are formed at the same positions in the circumferential direction and face each other in the front-rear direction. With the engagement protrusions 43B fitted into the respective engagement recesses 4F, the internal gear 43 is positioned and fixed in the rotation direction. As illustrated in FIG. 30, in the front-rear direction, the internal gear 43 is disposed between a wall at the front end of the stepped portion 4G and a bearing holding member 5. An O-ring 67 is provided at the rear end of the internal gear 43. The O-ring 67 seals between the internal gear 43 and the hammer case 4. The O-ring 67 also functions as a damper that eliminates backlash in the front-rear direction between the internal gear 43 and the bearing holding member 5 by elastic deformation and alleviates impact.

Figure 32:
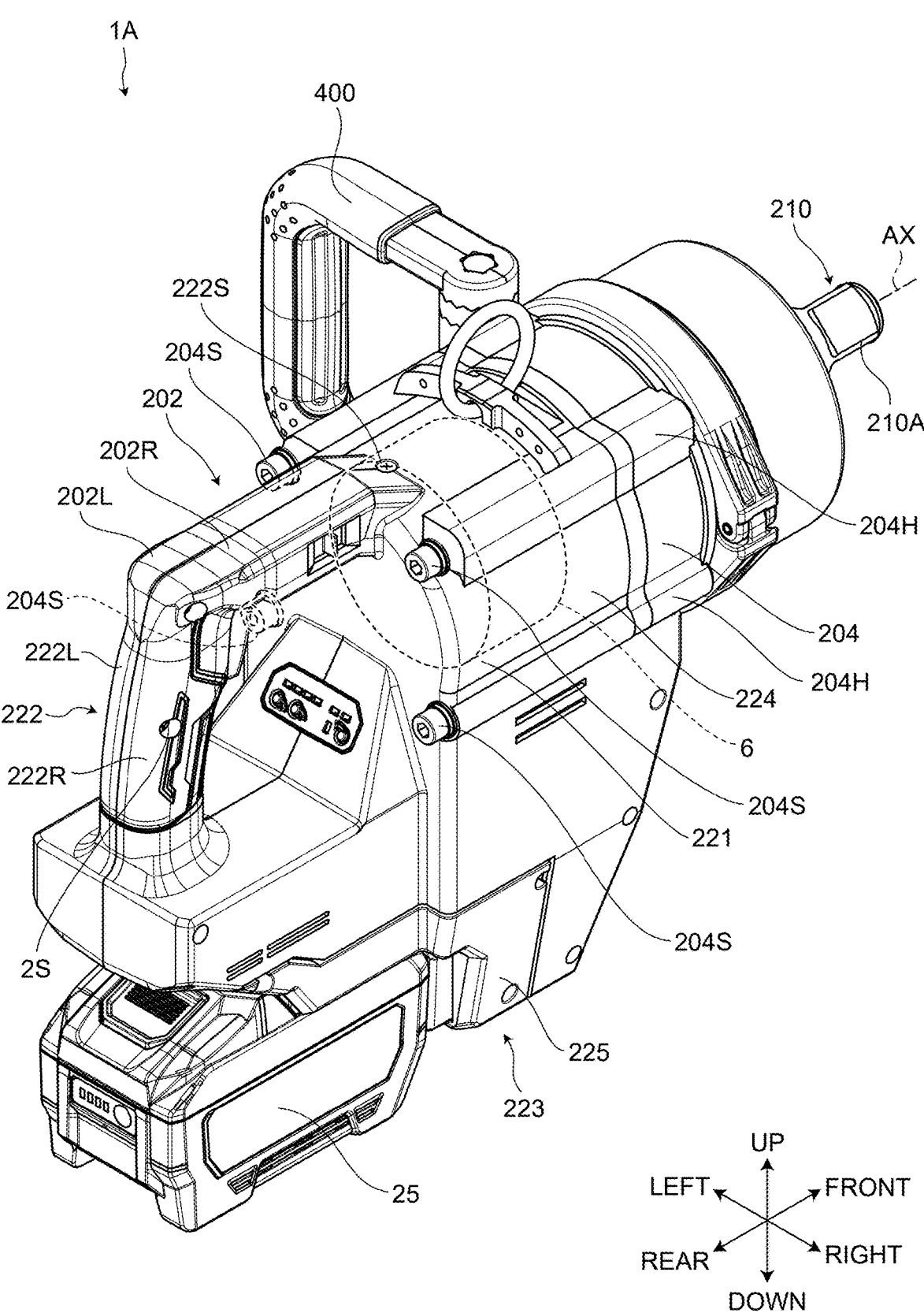
FIG. 32 is a perspective view illustrating a power tool according to another embodiment as viewed from the rear.

In the embodiment described above, the power tool 1 is an impact driver. The power tool 1 may be an impact wrench. FIG. 32 is a perspective view illustrating a power tool 1A according to another embodiment as viewed from the rear. The power tool 1A in FIG. 32 is an impact wrench which is a type of impact tools. An anvil (output portion) 210 of the power tool 1A includes an anvil shaft 210A to which a tool accessory is attached. The anvil shaft 210A is disposed at the front portion of the anvil 210. The anvil shaft 210A protrudes more forward than a case holder 224 having a cylindrical shape. A housing 202 includes a motor housing 221, a grip portion 222, and a case holder 224 having a cylindrical shape. The housing 202 is divided into a left housing 202L and a right housing 202R. In the left housing 202L, a case holder 224 having a cylindrical shape, a motor housing 221, and a left-side portion (left grip portion 222L) of the grip portion 222 are integrally formed. A right-side portion (right grip portion 222R) of the grip portion 222 is integrally formed with the right housing 202R. The left housing 202L and the right housing 202R are fixed to each other at a plurality of positions by screws 2S extending in the left-right direction. The right housing 202R is fixed to the motor housing 221 by a screw 222S provided at a front portion of the upper surface of the right grip portion 222R. In the example of FIG. 32, a battery holder 223 is provided in a battery housing 225 separate from the housing 202. The battery housing 225 is fixed to the housing 202 by a screw.

A hammer case (rotation mechanism case) 204 is inserted into the case holder 224 from the front. The case holder 224 has a cylindrical shape and has a front portion opened and a rear portion connected to the motor housing 221. The motor housing 221 houses a motor 6. Screw members 204S extending in the axial direction are inserted from the rear side of the motor housing 221. The screw members 204S reach the hammer case 204. The screw members 204S mesh with screw holes formed in boss portions 204H of the hammer case 204. The motor 6 is fixed together with the motor housing 221 and the hammer case 204 by the screw members 204S. The power tool 1A is a large-sized impact wrench in which a side handle 400 is detachable.

Figure 33:
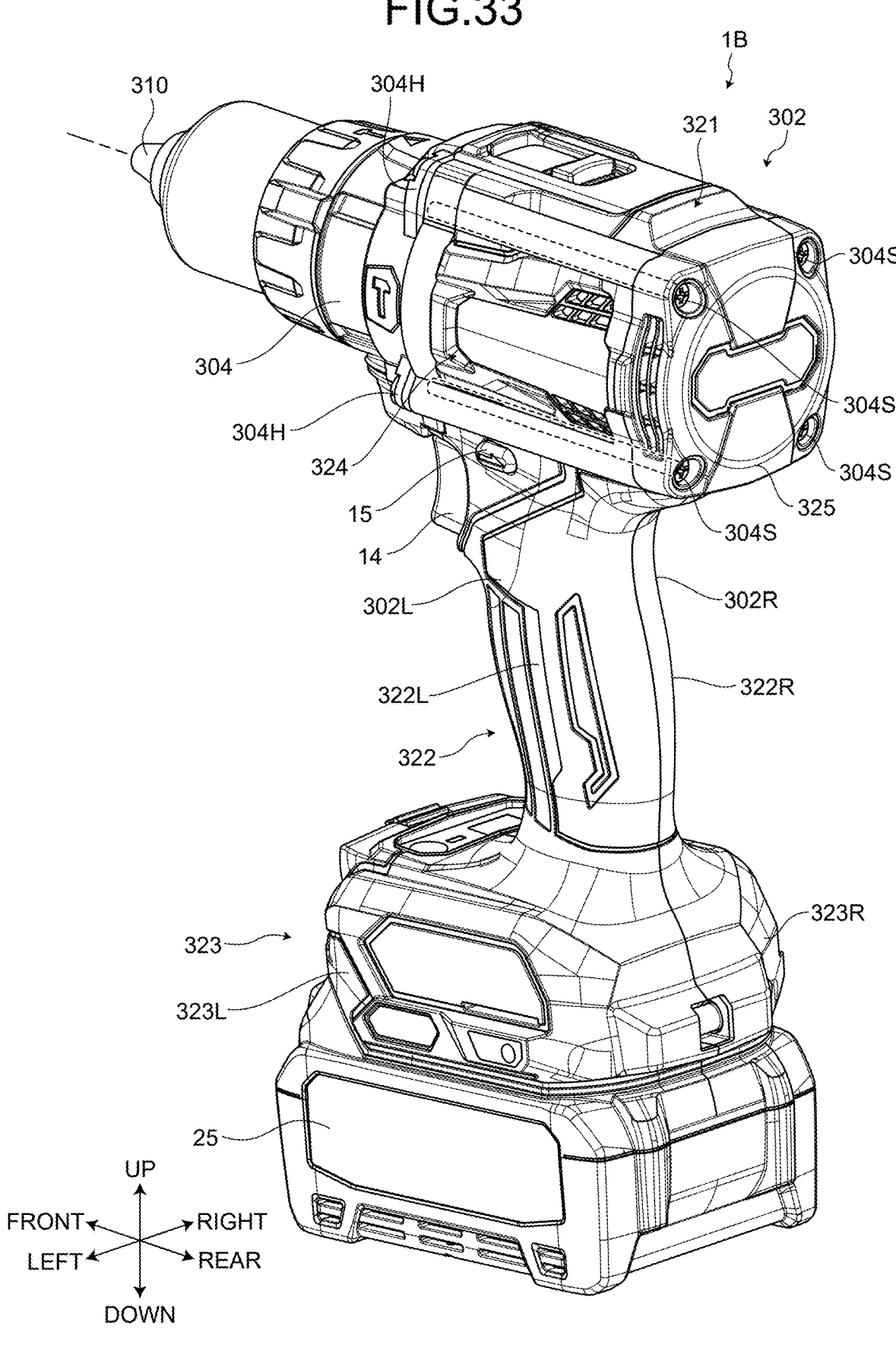
FIG. 33 is a perspective view illustrating a power tool according to another embodiment as viewed from the rear.

In the embodiment described above, the power tool 1 is an impact tool. The power tool 1 may be a power tool other than the impact tool. FIG. 33 is a perspective view illustrating a power tool 1B according to another embodiment as viewed from the rear. The power tool 1B in FIG. 33 is a driver drill which is a type of drilling work machines. The power tool 1B includes a motor, a motor housing 321 that houses the motor, a rotation mechanism that is disposed on the front side of the motor and includes an output portion 310 that rotates based on a rotational force of the motor, and a rotation mechanism case 304 that is disposed forward of the motor housing 321 and houses at least a part of the rotation mechanism.

The output portion 310 is disposed forward of the motor. The output portion 310 is rotated by the rotational force of the motor. The output portion 310 rotates in a state where a tool accessory is attached. The rotation mechanism includes a speed reducing mechanism and a vibration mechanism. At least a part of the speed reducing mechanism is housed in the rotation mechanism case 304. At least a part of the vibration mechanism is housed in the rotation mechanism case 304. The speed reducing mechanism decelerates the rotation transmitted from the motor (rotor shaft) and rotates the output portion 310 at a rotational speed lower than that of a rotor shaft. The vibration mechanism vibrates the output portion 310 in the axial direction. The vibration mechanism includes a plurality of cams that rotates based on the rotational force of the motor and converts rotation of the cams into reciprocating motions in the axial direction. The vibration mechanism vibrates the output portion 310 in the axial direction based on the reciprocating motion of the cams in the axial direction.

A housing 302 includes the motor housing 321, a grip portion 322, a battery holder 323, and a case holder 324 having a cylindrical shape. The housing 302 is divided into a left housing 302L and a right housing 302R. In the left housing 302L, a cylindrical case holder 324, a motor housing 321, a left-side portion (left grip portion 322L) of the grip portion 322, and a left-side portion (left battery holder 323L) of the battery holder 323 are integrally formed. In the right housing 302R, a right-side portion of the grip portion 322 (right grip portion 322R) and a right-side portion of the battery holder 323 (right battery holder 323R) are integrally formed. The left housing 302L and the right housing 302R are fixed to each other at a plurality of positions by screws in the left-right direction.

The case holder 324 has a cylindrical shape and has a front portion opened and a rear portion connected to the motor housing 321. The motor housing 321 has a cylindrical shape, and a rear portion thereof is covered with a rear cover 325. The rotation mechanism case 304 is inserted into the case holder 324 from the front. The motor housing 321 houses the motor. Screw members 304S extending in the axial direction are inserted from the rear side of the motor housing 321. The screw members 304S reach the rotation mechanism case 304 from screw insertion holes formed in the rear cover 325 through the motor housing 321. The screw members 304S mesh with screw holes formed in boss portions 304H of the rotation mechanism case 304. The motor housed in the motor housing 321 is fixed together with the motor housing 321 and the rotation mechanism case 304 by the screw members 304S.

In the above-described embodiments, the power supply of the power tool 1 may not be the battery pack 25 and may be a commercial power supply (AC power supply). The commercial power supply inputs a voltage equal to or greater than 18 V to the motor 6.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power tool comprising:
a motor;
a rotation mechanism disposed forward of the motor and including an output portion that is rotated about a rotation axis by the motor;
a rotation mechanism case that houses at least a part of the rotation mechanism;
a case holder having a cylindrical shape and covering a circumference of the rotation mechanism case such that the output portion protrudes forward; and
a grip portion to be gripped by an operator, wherein
the grip portion has a left-right split structure, which includes a left grip portion and a right grip portion that are divided in a left-right direction,
the case holder has a non-split structure that is not divided in the left-right direction, and
the case holder as a whole is integrally formed with only one of the left grip portion or the right grip portion.

2. The power tool according to claim 1, further comprising:
a battery holder that is connected to the grip portion and to which a battery pack is detachably attached, wherein
the battery holder includes a left battery holder integrally formed with the left grip portion and a right battery holder integrally formed with the right grip portion.

3. The power tool according to claim 2, further comprising:
a motor housing that houses the motor, the motor housing disposed rearward of the rotation mechanism case, wherein
the motor housing is connected to an upper end of the left grip portion and an upper end of the right grip portion by screws.

4. The power tool according to claim 3, wherein
the rotation mechanism case is made of metal, and
the motor housing is connected to a rear portion of the rotation mechanism case by a screw member extending in an axial direction along the rotation axis.

5. The power tool according to claim 1, wherein
the rotation mechanism case is connected to the left grip portion and the right grip portion via a connection member extending in the left-right direction.

6. The power tool according to claim 5, wherein
a connection boss portion, through which the connection member is inserted, is provided on an outer circumference of the rotation mechanism case, and
a first end and a second end of the connection member inserted into the connection boss portion are connected to the left grip portion and the right grip portion, respectively.

7. The power tool according to claim 6, wherein
the connection boss portion includes a first connection boss portion and a second connection boss portion,
the connection member includes a first connection member and a second connection member,
the first connection boss portion and the first connection member are arranged on a front portion of the rotation mechanism case, and
the second connection boss portion and the second connection member are arranged on a rear portion of the rotation mechanism case.

8. The power tool according to claim 1, further comprising:
a trigger lever provided on a front side of the grip portion and operated to activate the motor.

9. The power tool according to claim 1, further comprising:
a forward/reverse switching lever provided on the grip portion and operated to change a rotation direction of the motor.

10. The power tool according to claim 1, wherein
the rotation mechanism includes a hammer rotated by the motor, and
the output portion is an anvil that is impacted in a rotation direction by the hammer.

11. A power tool comprising:
a motor;
a rotation mechanism disposed forward of the motor and including an output portion that is rotated about a rotation axis by the motor;
a rotation mechanism case that houses at least a part of the rotation mechanism; and
a housing to which the motor and the rotation mechanism case are assembled, wherein
the housing has a left-right split structure, which includes a left housing and a right housing divided in a left-right direction intersecting with the rotation axis, and
a case holder as a whole is integrally formed with only one of the left housing or the right housing, the case holder having a cylindrical shape and covering a circumference of the rotation mechanism case such that the output portion protrudes forward, and the case holder having a non-split structure that is not divided in the left-right direction.

12. The power tool according to claim 11, wherein
the housing includes:
a grip portion connected to the case holder; and
a battery holder that is connected to the grip portion and to which a battery pack is detachably attached,
the left housing has a left-side portion of the grip portion and a left-side portion of the battery holder, and
the right housing has a right-side portion of the grip portion and a right-side portion of the battery holder.

13. The power tool according to claim 12, wherein
the left housing and the right housing are connected to each other by screws extending in the left-right direction in the grip portion and the battery holder.

14. The power tool according to claim 12, further comprising:
a trigger lever provided on a front side of the grip portion and operated to activate the motor.

15. The power tool according to claim 12, further comprising:
a forward/reverse switching lever provided on the grip portion and operated to change a rotation direction of the motor.

16. The power tool according to claim 12, wherein
the housing further includes a rear case that houses the
motor, the rear case being disposed rearward of the left
housing and the right housing, and
the rear case is connected to each of the left housing and
the right housing by screws.

17. The power tool according to claim 16, wherein
the rear case is connected to:
the left housing by a screw at an upper end of the left-side
portion of the grip portion; and
the right housing by a screw at an upper end of the
right-side portion of the grip portion.

18. The power tool according to claim 16, wherein
the rotation mechanism case is made of metal, and
the rear case is connected to a rear portion of the rotation
mechanism case by a screw member extending in an
axial direction along the rotation axis.

19. The power tool according to claim 11, wherein
the left housing and the right housing are connected to the
rotation mechanism case via a connection member
extending in the left-right direction.

20. The power tool according to claim 19, wherein
a connection boss portion, through which the connection
member is inserted, is provided on an outer circumfer-
ence of the rotation mechanism case,
the left housing has a left-side support portion that sup-
ports a first end of the connection member inserted into
the connection boss portion, and
the right housing has a right-side support portion that
supports a second end of the connection member
inserted into the connection boss portion.

* * * * *